US012649234B2

(12) United States Patent
Shin et al.

(10) Patent No.: US 12,649,234 B2
(45) Date of Patent: Jun. 9, 2026

(54) WALKING CONTROL METHOD

(71) Applicant: HONDA MOTOR CO., LTD., Tokyo (JP)

(72) Inventors: Hirofumi Shin, Wako (JP); Takumi Kamioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 520 days.

(21) Appl. No.: 18/127,691

(22) Filed: Mar. 29, 2023

(65) Prior Publication Data

US 2023/0311318 A1 Oct. 5, 2023

(30) Foreign Application Priority Data

| Mar. 31, 2022 | (JP) | ............................... | 2022-060882 |
| Feb. 8, 2023 | (JP) | ............................... | 2023-017599 |
| Feb. 8, 2023 | (JP) | ............................... | 2023-017600 |
| Feb. 8, 2023 | (JP) | ............................... | 2023-017601 |

(51) Int. Cl.
B25J 9/16 (2006.01)
B25J 5/00 (2006.01)

(52) U.S. Cl.
CPC ............... B25J 9/1664 (2013.01); B25J 5/00 (2013.01); B25J 9/1607 (2013.01); B25J 9/163 (2013.01)

(58) Field of Classification Search
CPC . B25J 9/1664; B25J 5/00; B25J 9/1607; B25J 9/163; B62D 57/032
See application file for complete search history.

(56) References Cited

U.S. PATENT DOCUMENTS

| 4,834,200 | A | * | 5/1989 | Kajita | .................... | B62D 57/02 |
| | | | | | | 901/1 |
| 5,369,346 | A | * | 11/1994 | Takahashi | ............ | B62D 57/032 |
| | | | | | | 318/568.17 |
| 5,426,586 | A | * | 6/1995 | Ozawa | ................. | B62D 57/032 |
| | | | | | | 414/730 |
| 2005/0033475 | A1 | * | 2/2005 | Kuroki | ................. | B62D 57/032 |
| | | | | | | 318/568.12 |
| 2007/0241713 | A1 | * | 10/2007 | Yamamoto | ........... | B62D 57/032 |
| | | | | | | 901/1 |
| 2022/0226996 | A1 | * | 7/2022 | Ishizuka | ................ | B25J 9/1664 |

OTHER PUBLICATIONS

Raibert, "Legged Robots That Balance (Artificial Intelligence)", MIT Press, 1986.

(Continued)

*Primary Examiner* — Wade Miles
*Assistant Examiner* — James Brian Chin
(74) *Attorney, Agent, or Firm* — Amin, Turocy & Watson, LLP

(57) ABSTRACT

A walking control method of an embodiment includes decomposing a mobile device with legs into a plurality of mass points, decomposing the plurality of decomposed mass points into a first interest mass point and mass points other than the first interest mass point, making a length between the first interest mass point and a contact point on a walking plane constant, making the mass points other than the first interest mass point constrained to an affine-transformed position of the first interest mass point, and generating a constraint trajectory of the mass points other than the first interest mass point in accordance with the constraint when the first interest mass point is moved.

14 Claims, 32 Drawing Sheets

A1

(56) References Cited

OTHER PUBLICATIONS

Hodgins, "Biped gait transitions," in Proc. IEEE Int. Conf. Robot. Autom, 1991, pp. 2092-2097.

Kajita, et al. "Dynamic walk control of a biped robot along the potential energy conserving orbit", International Workshop on Intelligent Robots and Systems, IROS 1990: 789-794.

\* cited by examiner

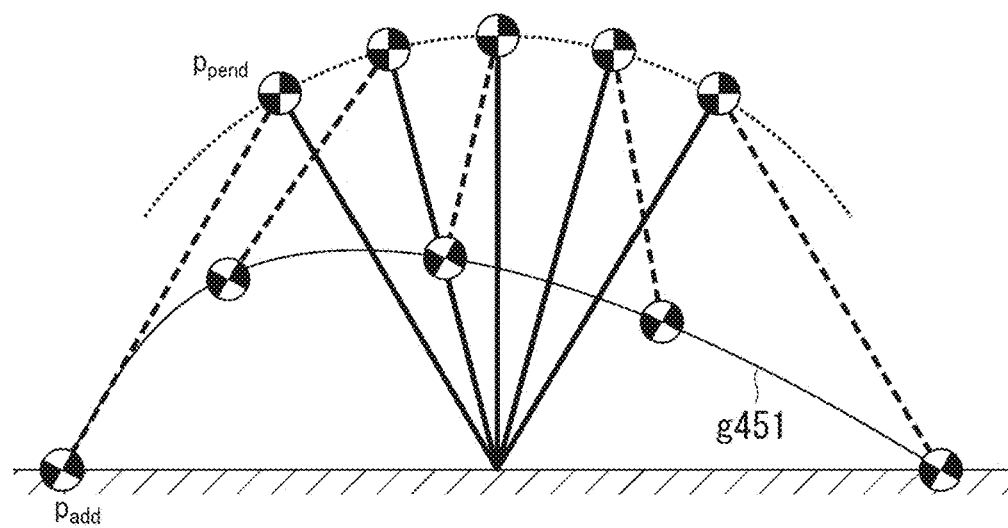

FIG. 52

```
                    ┌─────────┐
                    │  START  │
                    └─────────┘
                         │
                         ▼
┌──────────────────────────────────────────────────────────┐
│      DECOMPOSITION INTO PLURALITY OF MASS POINTS           │─ S_C-101
└──────────────────────────────────────────────────────────┘
                         │
                         ▼
┌──────────────────────────────────────────────────────────┐
│ DECOMPOSITION INTO FIRST INTEREST MASS POINT AND OTHER MASS POINTS │─ S_C-102
└──────────────────────────────────────────────────────────┘
                         │
                         ▼
┌──────────────────────────────────────────────────────────┐
│         MAKE LENGTH BETWEEN FIRST INTEREST MASS POINT      │─ S_C-103
│          AND CONTACT POINT ON WALKING PLANE CONSTANT       │
└──────────────────────────────────────────────────────────┘
                         │
                         ▼
┌──────────────────────────────────────────────────────────┐
│    ASSUME THAT MASS POINTS OTHER THAN FIRST INTEREST MASS  │
│    POINT ARE CONSTRAINED TO AFFINE-TRANSFORMED POSITION OF │
│    FIRST INTEREST MASS POINT FOR SEING LEG AND ASSUME THAT │─ S_C-104
│      ACTUAL CENTER-OF-GRAVITY POSITION OF SUPPORT LEG IS   │
│  CONSTRAINED TO AFFINE-TRANSFORMED TRAJECTORY FOR SUPPORT LEG │
└──────────────────────────────────────────────────────────┘
                         │
                         ▼
┌──────────────────────────────────────────────────────────┐
│ GENERATE CONSTRAINT TRAJECTORY OF MASS POINTS OTHER THAN FIRST │─ S_C-105
│  INTEREST MASS POINT IN ACCORDANCE WITH CONSTRAINT CONDITION  │
└──────────────────────────────────────────────────────────┘
                         │
                         ▼
┌──────────────────────────────────────────────────────────┐
│          SET ENTIRE SYSTEM TO BE CONSERVATIVE             │─ S_C-106
│       SYSTEM BY GIVING CONSTRAINT CONDITION               │
└──────────────────────────────────────────────────────────┘
                         │
                         ▼
┌──────────────────────────────────────────────────────────┐
│   SET FIRST INTEREST MASS POINT TO BE R IDEAL MASS POINT AND │
│      SET IDEAL MASS POINT AND VIRTUAL MASS POINT SUCH        │─ S_C-107
│   THAT CENTER OF GRAVITY OF EACH OF IDEAL MASS POINT AND     │
│      VIRTUAL MASS POINT IS ACTUAL MASS POINT OF ROBOT        │
└──────────────────────────────────────────────────────────┘
                         │
                         ▼
┌──────────────────────────────────────────────────────────┐
│          OPERATE SUPPORT LEG AND SWING LEG                │─ S_C-108
└──────────────────────────────────────────────────────────┘
                         │
                         ▼
                    ┌─────────┐
                    │   END   │
                    └─────────┘
```

WALKING CONTROL METHOD

CROSS-REFERENCE TO RELATED APPLICATION

This application is based upon and claims the benefit of priority from Japanese Patent Application No. 2022-060882, filed Mar. 31, 2022, Japanese Patent Application No. 2023-017599, filed Feb. 8, 2023, Japanese Patent Application No. 2023-017600, filed Feb. 8, 2023, and Japanese Patent Application No. 2023-017601, filed Feb. 8, 2023, the entire contents of which is incorporated herein by reference.

BACKGROUND

Field of the Invention

The present invention relates to a walking control method.

Description of Related Art

In recent years, research on bipedal walking robots has been carried out. In order for robots to walk like humans, their functions are not sufficient, especially in terms of failure tolerance and efficiency. For bipedal walking robots, adding softness improves the failure tolerance of the robots, and robots capable of torque control of joints are also being developed.

A single-mass point model has been used in a model for trajectory generation at the highest level in generating the walking of a robot. Furthermore, in order to be able to uniquely determine the motion of the single-mass point model, the motion is often described by a conservative system. A single-mass point model is a model in which the motion of a swing leg mass is not considered. When there is an attempt to reproduce the motion of a single-mass point model including the motion of a swing leg mass point, a device capable of generating a moment in the single-mass point (pendulum mass) (body motion may also be applicable), such as a flywheel, a device (ankle) that separately generates a translational force, and the like are required.

FIG. 1 to FIG. 6 are an example of a model of which the motion is described by a conservative system. In the generation of a robot's walking according to the related art, the entire motion can be controlled arbitrarily by adjusting the amount of energy in a specific period by utilizing the dynamics of a single-mass point model in FIG. 1 to FIG. 6. In addition, Raibert et al. realized running by decomposing running control into three elements (see Non-Patent Document 1), and Hodgins et al. extended it to walking and controlled the walking by adjusting only kicking in a double-leg support phase (see Non-Patent Document 2). A control method proposed by Raibert et al. is referred to as Raibert's control.

Furthermore, Kajita et al. made it possible to control walking by adjusting trajectory energy by using a linear inverted pendulum (LIP) model (see Non-Patent Document 3). These controls are models that are controlled by setting a swing leg mass to zero in a single-mass point model. Note that, in the following description, these controls are referred to as intermittent control (intermittently controlled).

Furthermore, examples of a walking control method of a legged robot having elasticity include a control method for realizing walking by decomposing control into three elements (body posture control, kick control, and ground contact position control) focusing on the macroscopic motion of walking, and the like.

For example, in Raibert's control (see Non-Patent Document 1), elements of walking are decomposed into macroscopic actions focusing on a human walking action. The elements are three active elements: kick, swing and stride, and state posture maintenance.

The three-division control performed by Hodgins consists of three independent control laws: stride control, height control, and posture control. In the stride control, a stride is controlled such that a horizontal speed follows a target value. However, the stride control is unnecessary for normal walking. In the height control, energy is applied by kicking of a rear leg so as to satisfy a target height of a body in a next single-leg support phase when a swing leg lands on the ground. In the posture control, feedback control is performed to maintain the posture of the body vertically.

[Non-Patent Document 1] Marc H. Raibert, "Legged Robots That Balance (Artificial Intelligence)", MIT Press, 1986

[Non-Patent Document 2] J. K. Hodgins, "Biped gait transitions," in Proc. IEEE Int. Conf. Robot. Autom, 1991, pp. 2092-2097.

[Non-Patent Document 3] S. Kajita, Tomio Yamaura, and Akira Kobayashi, "Dynamic walk control of a biped robot along the potential energy conserving orbit", IROS 1990: 789-794

SUMMARY

However, in the control of Raibert and Hodgins of the related art, there was a problem in speed following when the mass of legs is not negligible as illustrated in FIG. 1 to FIG. 7. FIG. 1 to FIG. 7 are a diagram illustrating an example of speed following when ratios of a body mass of a walking device to a leg mass are different. A drawing indicated by a symbol g911 illustrates a case where a ratio of a body mass to a leg mass is 10:0, and a drawing indicated by a symbol g912 illustrates a case where a ratio of a body mass to a leg mass is 10:1. In the diagrams indicated by the symbols g911 and g912, a horizontal axis represents a speed of a target attention point Target x·pend (m/s), and a vertical axis represents a speed of an action attention point Act x·pend speed (m/s). For this reason, in the related art, it is not possible to perform intermittent control and follow a walking speed.

Furthermore, in the related art, a situation when a swing leg comes into contact with the ground in a situation where a disturbance occurs, and a robot may fall over depending on the way of coming into contact with the ground. That is, in the related art, in some cases, a robot cannot continue walking robustly in a situation where a disturbance occurs.

One aspect of the present invention has been made in view of the above-mentioned problems, and an object thereof is to provide a walking control method by which (i) it is possible to realize intermittent walking control capable of controlling a walking speed by adjusting motion only in a specific period during walking and (ii) it is possible to continue walking robustly even when a disturbance occurs.

(A-1) A first aspect of the present invention provides a walking control method including decomposing a mobile device with legs into a plurality of mass points, decomposing the plurality of decomposed mass points into a first interest mass point and mass points other than the first interest mass point, making a length between the first interest mass point and a contact point on a walking plane constant, making the mass points other than the first interest mass point constrained to an affine-transformed position of the first interest mass point, and generating a constraint trajectory of the mass points other than the first interest mass point in accordance with the constraint when the first interest mass point is moved.

(A-2) In a second aspect of the present invention according to the walking control method of the first aspect, an entire system is set to be a conservative system by giving a constraint trajectory in which a center of gravity $p_{add}$ of additional mass related to a swing leg motion is a linear function of a center-of-gravity position $p_{pend}$ of the additional mass to a single-mass point model satisfying the conservative system by using a multi-mass point model obtained by adding the additional mass.

(A-3) In a third aspect of the present invention according to the walking control method of the second aspect, energy is added to the system in order to make an indefinite integral obtained for a term for which a time-independent indefinite integral is not able to be obtained in an equation representing energy for an external force of a single-mass point.

(A-4) In a fourth aspect of the present invention according to the walking control method of the third aspect, regarding conditions for representing an indefinite integral by a time-independent function, the center of gravity $p_{add}$ of the additional mass is expressed by the following equation,

[Equation. 1]

$$p_{add} = C_{add} p_{pend} + B_{add} = \begin{bmatrix} c_1 & c_2 \\ c_3 & c_4 \end{bmatrix} p_{pend} + \begin{bmatrix} b_x \\ b_z \end{bmatrix}$$

$C_{add}$ and $B_{add}$ are constant matrices, energy $E_{add}$ of the following equation is given to the additional mass,

[Equation. 2]

$$E_{react} = E_{mod} + E_{add}$$

$E_{react}$ is other energy, $E_{mod}$ is other energy that cannot be obtained as an indefinite integral, and the energy $E_{add}$ is expressed by the following equation,

[Equation. 3]

$$E_{add} = A m_{add} \int (B_{add} \times \ddot{p}_{pend}) \dot{\theta} dt + (A+1) m_{add} \int (B_{add} \times \dot{p}_{pend}) \ddot{\theta} dt$$

in the equation of $E_{add}$, $\theta$ is an angle between the mass point and a ground contact position of the leg, $m_{add}$ is a weight of the leg, a superscript "·" represents a first-order differential, a superscript "··" represents a second-order differential, A is a variable, and the other energy $E_{react}$ is expressed by the following equation,

[Equation. 4]

$$E_{react} = (A+1) m_{add} (B_{add} \times \dot{p}_{add}) \dot{\theta}$$

a total energy $E_{all}$ is expressed by the following equation using kinetic energy $E_{kinetic}$, potential energy $E_{potential}$, and the other energy $E_{react}$, and

[Equation. 5]

$$F_{all} = E_{kinetic} + E_{potential} \int + E_{react}$$

a target walking speed is followed by intermittent walking control in which conserved energy of the total energy $E_{all}$ before a turning leg action has been adjusted.

(A-5) In a fifth aspect of the present invention according to the walking control method of the fourth aspect, in the equation of $E_{add}$, the other energy approximates $E_{react}$ by the following equation by assuming that $bx \approx 0$ and $\theta \approx 0$.

[Equation. 6]

$$E_{react} \simeq -\frac{1}{2} m_{add} (B_{add} \times \dot{p}_{add}) \dot{\theta}$$

(B-1) A sixth aspect of the present invention provides a walking control method including decomposing a mobile device with legs into a plurality of mass points, decomposing the plurality of decomposed mass points into a first mass point, which is one mass point to be noted, and second mass points, which are the remaining mass points except for the first mass point, making a length of a straight line connecting the first mass point and a contact point on a walking plane constant, making the second mass points constrained to an affine-transformed position of the first mass point, generating a constraint trajectory of the second mass points in accordance with the constraint when the first mass point is moved, giving a constraint trajectory of a center of gravity of an additional mass point related to a motion of a swing leg such that the center of gravity of the additional mass point is an affine-transformed center-of-gravity position of the additional mass point to a single-mass point by using a multi-mass point model obtained by adding the additional mass point, and shifting an expected peak position of the center of gravity of the additional mass point to a position rotated by a predetermined angle with the contact point on the walking plane as an origin.

(B-2) In a seventh aspect of the present invention according to the walking control method of the sixth aspect, the predetermined angle is an angle according to a position of a support leg when the swing leg starts swinging.

(B-3) In an eighth aspect of the present invention according to the walking control method of the sixth aspect, when the predetermined angle is $\gamma$, $\gamma$ is expressed by Equation (B-15) to be described later. Here, $\alpha_{gb}$ is an angle formed by the support leg and the walking plane when the swing leg is separated from the walking plane, $\alpha_{fc}$ is an angle formed by the center-of-gravity position of the additional mass point at the end of swinging of the swing leg and the-center-of-gravity position of the additional mass point when the swing leg comes into contact with the walking plane, $\alpha_{bp}$ is an angle formed by $(P_{pend})^{begin}$ and $(P_{pend})^{peak}$, $(P_{pend})^{begin}$ is a position of the first mass point at a point in time when a motion of the swing leg is started when the contact point on the walking plane is an origin, $(P_{pend})^{peak}$ is a position of the first mass point when the contact point on the walking plane is the origin, and the first mass point arrives directly above the origin, and $\alpha_{pf}$ is an angle formed by $(P_{pend})^{peak}$ and the center-of-gravity position of the additional mass point at a point in time when the motion of the swing leg ends.

(C-1) A ninth aspect of the present invention provides a walking control method including decomposing a mobile device with legs into a plurality of mass points, decomposing the plurality of decomposed mass points into a first interest mass point and mass points other than the first interest mass point, making a length between the first interest mass point and a contact point on a walking plane constant, making the mass points other than the first interest mass point constrained to an affine-transformed position of the first interest mass point, generating a constraint trajectory of the mass points other than the first interest mass point in accordance with the constraint when the first interest mass point is moved, setting an entire system to be a conservative system by giving a constraint trajectory such that a center of gravity ($p_{add}$) of an additional mass point related to a motion of a swing leg is an affine-transformed center-of-gravity position ($p_{add}$ before decomposition) of the additional mass point to a single-mass point by using a multi-mass point model obtained by adding the additional mass point, setting the first interest mass point to be an ideal mass point ($p_{pend}$ after decomposition), and setting a virtual mass point and the ideal mass point so that a center of gravity of each of the ideal mass point ($p_{pend}$) and the virtual mass point ($p_{impend}$) is an actual mass point ($p_{hip}$) of the mobile device.

(C-2) In a tenth aspect of the present invention according to the walking control method of the ninth aspect, it is assumed that a length of the ideal mass point ($p_{pend}$) is constant.

(C-3) In an eleventh aspect of the present invention according to the walking control method of the ninth aspect or the tenth aspect, a position of the actual mass point ($p_{hip}$) is a center-of-gravity position of a support leg of the leg included in the mobile device.

(C-4) In a twelfth aspect of the present invention according to the walking control method according to any one of the ninth to eleventh aspects, the position of the actual mass point ($p_{hip}$), the position of the ideal mass point ($p_{pend}$), and the position of the virtual mass point ($p_{impend}$) at the start of walking of the mobile device are the same.

(C-5) In a thirteenth aspect of the present invention according to the walking control method according to any one of the ninth to twelfth aspects, while the mobile device is moving, a trajectory of the actual mass point ($p_{hip}$) during movement is expressed by the following equation, and

[Equation. 7]

$$p_{hip} = c_{hip} p_{pend} + b_{hip}$$

$c_{hip}$ is a parameter for each state of single leg support during movement, $p_{pend}$ is an ideal mass point, and $b_{hip}$ is a parameter for each state of single leg support during movement.

(C-6) In a fourteenth aspect of the present invention according to the walking control method according to any one of the ninth to thirteenth aspects, while the mobile device is moving, a trajectory of the swing leg of the leg included in the mobile device is expressed by the following equation, and

[Equation. 8]

$$p_{swg} = c_{swg} R_\gamma p_{pend} + b_{swg} + c_{hip} p_{pend} + b_{hip} - p_{pend}$$

$c_{swg}$ is a parameter of a swing leg trajectory during movement, $R_\gamma$ is a rotation matrix represented by cos and sin, $b_{swg}$ is a parameter of the swing leg trajectory during movement, and $b_{hip}$ is a parameter for each state of single leg support during movement.

According to any one of the first to fifth aspects, it is possible to realize intermittent walking control capable of controlling a walking speed by adjusting a motion only in a specific period during walking.

According to any one of the sixth to fourteenth aspects, it is possible to continue walking robustly even when a disturbance occurs.

BRIEF DESCRIPTION OF THE DRAWINGS

FIG. 38 is a diagram illustrating a definition of a leg.

FIG. 51 is a diagram illustrating a conservative system model in the third embodiment.

FIG. 52 is a diagram illustrating an example of a processing procedure of a walking control method performed by a walking control device according to the third embodiment.

DETAILED DESCRIPTION

Figure 1:
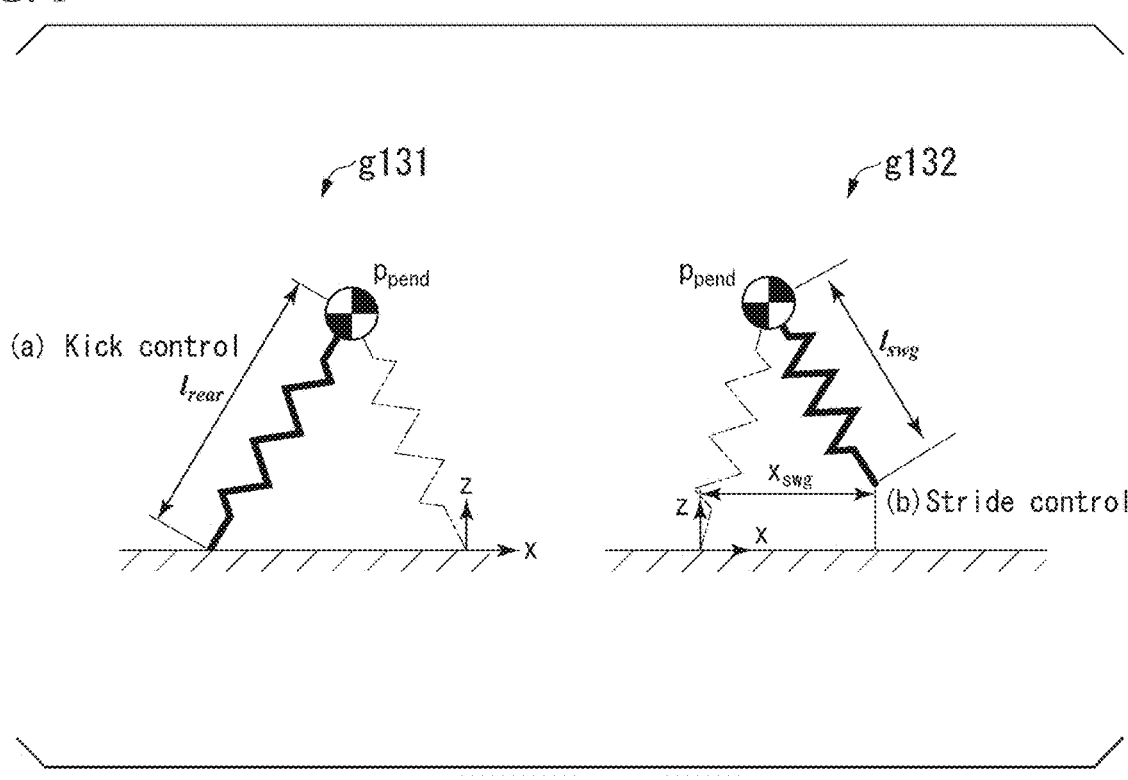
FIG. 1 is a diagram of a planar bipedal walking model showing variables used for Hodgins's control which is a conventional method.

Hereinafter, several embodiments of the present invention will be described with reference to the drawings. Note that, in the drawings used for the following description, the scale of each member is appropriately changed in order to make the size of each member recognizable.

Note that, in all drawings for describing the embodiments, those having the same functions are denoted by the same reference numerals and signs, and repeated descriptions are omitted.

In addition, "based on XX" as used in this application means "based on at least XX", and also includes cases based on other elements in addition to XX. Further, "based on XX" is not limited to direct use of XX, and also includes cases based on XX having been subjected to computation and processing. "XX" is an arbitrary element (for example, arbitrary information).

(Conventional Method, Problems)

First, the outline and problems of a conventional method are described.

In the related art, as illustrated in FIG. 1 to FIG. 6, single-mass point models such as a linear inverted pendulum (LIP) model (g912), an IP model (g913), and a spring-loaded inverted pendulum (SLIP) model (g914) have been used as a model for walking generation of a bipedal walking robot. These models impose a force constraint between the center of gravity (CoG) and a ground point as indicated by a symbol g111, and the force constraint is a function related to the position of the CoG. As a result, these dynamic systems become conservative systems with conservative quantities. In the following embodiments, conservative quantities are defined as conserved energy.

In a case where there is no additional force other than $f(p_{pend})$, a behavior of the conservative system can be uniquely determined by conserved energy that does not depend on time, as indicated by a symbol g911.

Further, in such a single-mass point model, a support leg action based on gravity and a passive motion generated by the model can be described by giving a constraint force for explaining a macroscopic motion of a walking action to a mass point. Note that, in a single-mass point model, it is possible to explain continuous walking only by correcting a timing of switching of a support leg and the amount of applied energy. However, since a leg motion generating large angular momentum has a nonnegligible error in the dynamics of the whole body, it is difficult to continue targeted walking by control using only the single-mass point model.

In order to solve these problems, an approach using momentum control and anticipation control, and an approach for solving a zero-moment point (ZMP) equation in discrete time in order to generate an upper body motion for compensating for dynamics errors have been proposed. In order to reduce computational costs of these methods, a method of predicting a dynamics error in advance by using a model for walking generation, the model being a model in which the whole-body motion approximates to a plurality of mass points, has also been proposed.

FIG. 1 is a diagram of a planar bipedal walking model showing variables used for Hodgins's control which is a conventional method. A drawing indicated by a symbol g131 illustrates a model for kick control in which a rear leg kicks a floor in a double-leg support (DS) period. A drawing indicated by a symbol g132 illustrates a model for stride control during single-leg swing in a single-leg support (SS) period. Note that, in FIG. 1, a horizontal direction with respect to the floor is set to be an x-axis, and a height direction is set to be a z-axis. In addition, $l_{rear}$ represents a link length of a rear leg, $l_{swag}$ represents a link length of a swing leg, $p_{pend}$ represents a center of gravity (CoG) position, and $x_{swg}$ represents a distance in an x-direction between the rear leg and the swing leg.

Hodgins's control can be decomposed into the following three actions.

(a) Kicking the floor with the rear leg to switch from the DS phase to the SS phase.

(b) Adjusting the stride of the foot to control the horizontal speed in the SS phase.

(c) Adjusting body rotation in the DS and SS phases.

In Hodgins' control, the height of a robot is controlled by a kicking action (a), and a running speed of the robot is controlled by stride adjustment (b). Assuming that walking in the SS phase is similar to that of the IP model, and the height at a peak position is constant, a movement speed in the SS phase (a horizontal speed at the peak position) is uniquely determined only by mechanical energy and a standing leg angle. In this manner, in the Hodgins' control, a walking action is realized by giving a certain target stride in each SS phase, but controlling only a kicking action in the DS phase.

Here, $h_{ref}$ represents a target height of the center of gravity at the peak position, and $v_{ref}$ is a target speed of the center of gravity.

In addition, a command speed for leg length control in the kicking action in the DS phase is defined as in the following Equation (A-1). Note that, in the present embodiment, a superscript "·" represents a first-order differential, and a superscript "··" represents a second-order differential.

[Equation. 9]

$$\dot{l}_{rear}^{cmd} = K_{kick}\left(E\left(h^{ref}, v^{ref}\right) - E(e, v)\right) \qquad (A\text{-}1)$$

In Equation (A-1), E(h, v) is the following Equation (A-2).

[Equation. 10]

$$E(h, v) = \frac{1}{2}mv^T v + mgh \qquad (A\text{-}2)$$

In Equations (A-1) and (A-2), $K_{kick}$ is a gain, g is a gravitational acceleration constant, and m is the total weight of the robot.

Since negative energy is not generated in the kicking action, $(l_{rear})^{cmd}=0$ when Equation (A-1) is negative.

In the SS phase, the support leg is passively moved while the natural length of the spring is fixed.

In the swing leg (FIG. 1, the drawing indicated by a symbol g132), trajectories $(x_{swg})^{cmd}$ and $(l_{swg})^{cmd}$ for reaching a target foot position in a certain posture of the support leg are given.

In this manner, in the Hodgins's control, energy in the DS phase according to a kicking action is adjusted with reference to mechanical energy (conserved energy) to cause the robot to follow a target movement speed (horizontal speed).

Raibert's control and Hodgins' control, which are conventional methods, take only the dynamics of the center of gravity of a single-mass point model into consideration.

Figure 17:
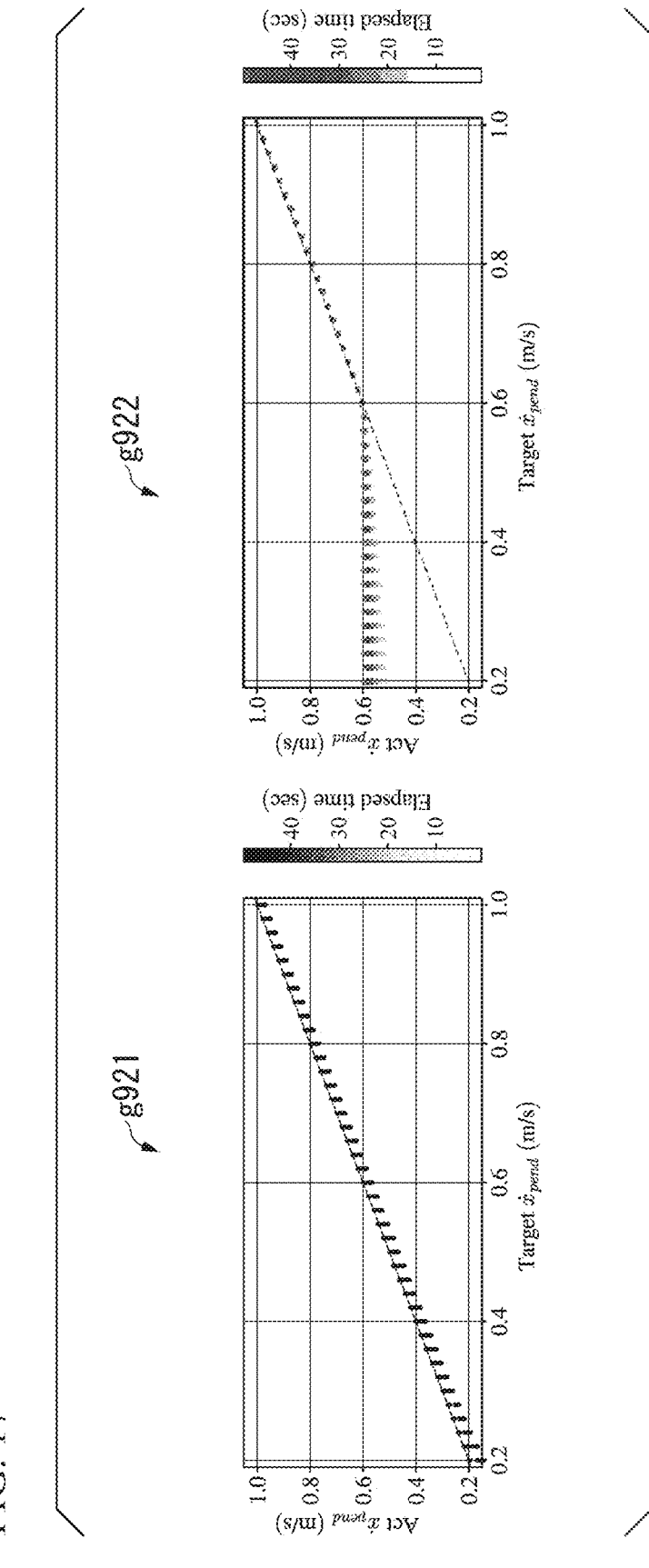
FIG. 17 is a diagram illustrating an example of speed following when a ratio of a body mass to a leg mass of a walking device is different.

However, in an actual robot, mass is distributed to each link, and thus angular momentum is generated in a high-speed motion such as a swing motion. Even when the mass of a legs is sufficiently smaller than the mass of the whole body (for example, total mass:leg mass=10:1), angular momentum according to the swing motion of the leg is not negligible. For this reason, in walking control for expressing the dynamics of the whole body with a single-mass point model, such as in Hodgins's control which is a conventional method, an error larger than expected occurs. Due to this error, in these control methods of the conventional methods, walking in accordance with a target movement speed cannot be performed as illustrated in FIG. 17. These control methods of the conventional methods have a problem in following a target speed when the mass of a leg is not negligible.

The reason for this is that the energy calculated by the above-described equation is not conserved energy, and thus cannot be used as an appropriate amount of feedback.

When negative energy can be given by kicking in the DS phase, a model follows a target speed, but negative energy cannot be generated by kicking. Thus, when the mass of a swing leg is given to the model in these conventional methods, it is not possible to perform control so that the robot follows the target speed even when energy is adjusted in intermittent control with a single-mass point model.

This problem is caused by a dynamics model deviating from the conservative system when a dynamics model of a control unit that controls the robot is extended to approach the actual robot.

Here, when there is a situation in which a motion in the SS phase including the movement of a turning leg is uniform with respect to time, that is, there is some kind of conservation law, a system of a multi-mass point model such as Hodgins' control with the mass of the turning leg can be intermittently controlled by adjusting energy, and a motion can be defined before the SS phase is started. For this reason, conditions of a conservative system of a multi-mass point model including the mass of the swing leg are derived, and the conditions are used for the trajectory and kick control of the swing leg, thereby realizing a conserved energy-based control framework that can follow a target speed with a passive behavior in the SS phase.

First Embodiment

Method of First Embodiment

Hereinafter, a method of deriving conserved energy from a constraint trajectory of a leg and using a motion in an SS phase as a conservative system will be described.

First, the conservative system of a single-mass point model will be described, and conditions under which a dynamic system of the model is the conservative system will be introduced.

A model used in a first embodiment will be described.

Figure 2:
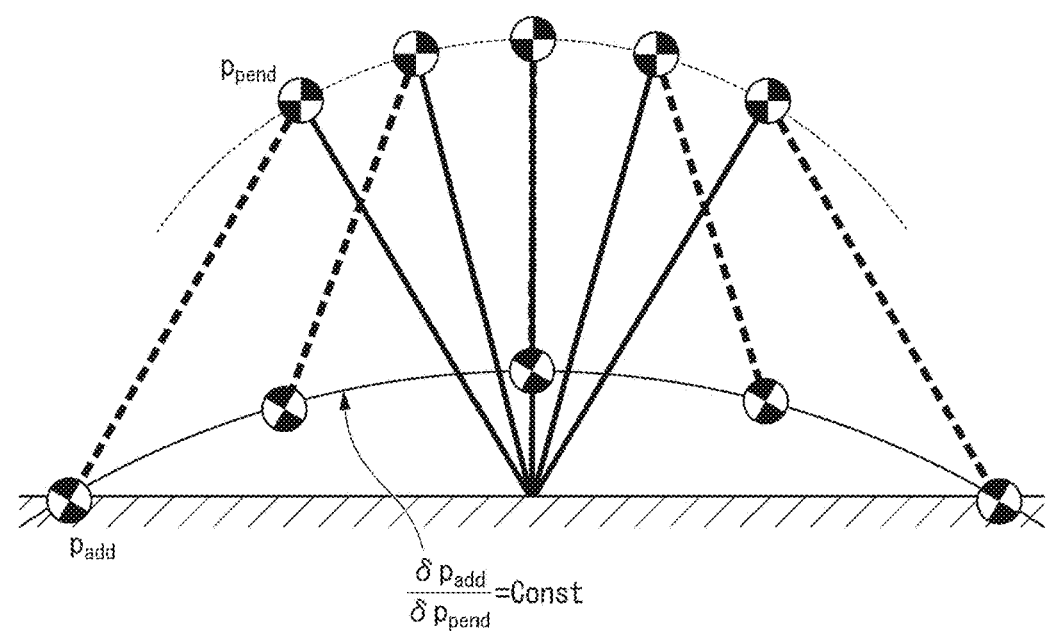
FIG. 2 is a diagram illustrating a model used in a first embodiment.
Figure 3:
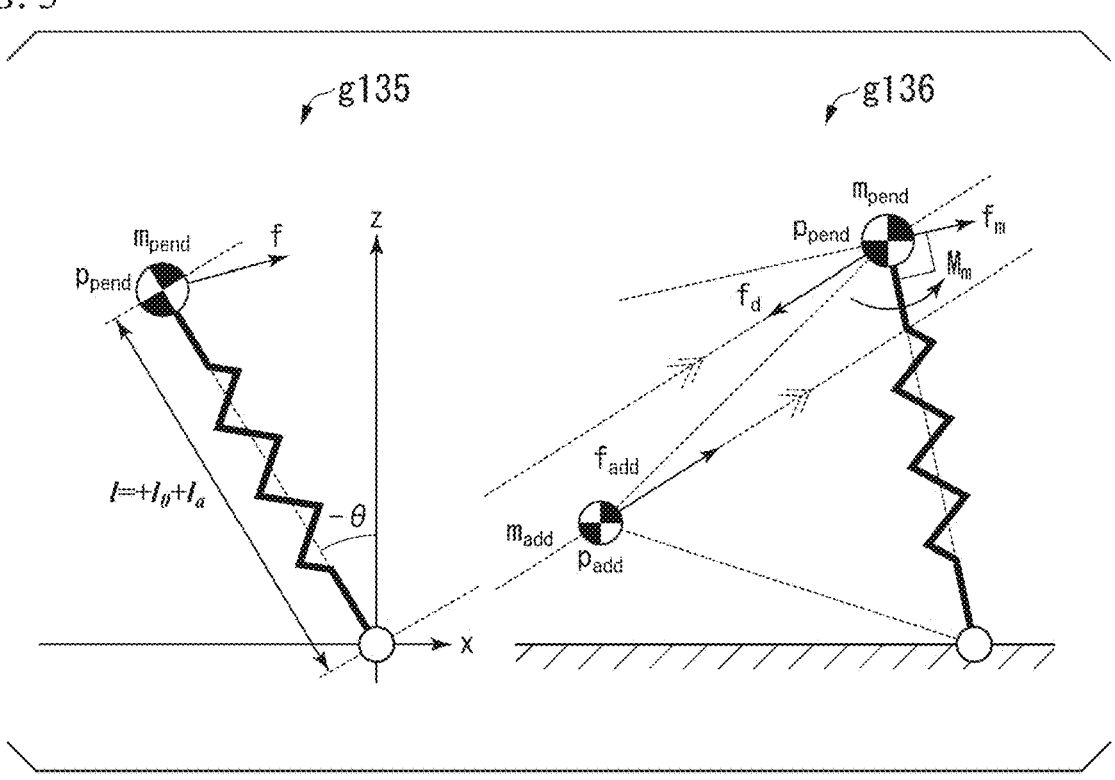
FIG. 3 is a diagram illustrating a multi-mass point model.

FIG. 2 is a diagram illustrating a model used in the first embodiment. In the first embodiment, as illustrated in FIG. 2, a multi-mass point model obtained by adding an additional mass related to a swing leg motion to a single-mass point model based on SLIP is used. Note that, in the following description, the center of gravity (CoM) of a single-mass point model is indicated by $p_{pend}$ In addition, the center of gravity of the additional mass for the swing leg motion is set to be $p_{add}$ In the first embodiment, the entire system can be a conservative system by giving a constraint trajectory such that $p_{add}$ is a linear function of $p_{pend}$ FIG. 3 is a diagram illustrating a multi-mass point model.

The drawing indicated by a symbol g135 illustrates a single-mass point model, and the drawing indicated by a symbol g136 illustrates a multi-mass point model. As illustrated in the drawing indicated by the symbol g135, when the mass of a single-mass point is impend and the position (target point) is $p_{pend}(=\{x_{pend}, x_{pend}\}^T)$, an equation of motion of a model in which an external force is applied to the single-mass point is expressed as the following Equation (A-3), where T represents transposition.

[Equation. 11]

$$m_{pend} \ddot{p}_{pend} = -k p_{pend} - mg[0, 1]^T + f \qquad (A\text{-}3)$$

In Equation (A-3), k is the following Equation (A-4).

[Equation. 12]

$$k = \begin{cases} 0 & (|p_{pend}| \geq l) \\ k_0 \left(1 - \dfrac{l}{|p_{pend}|}\right) & (|p_{pend}| < l) \end{cases} \qquad (A\text{-}4)$$

In Equation (A-4), $l = l_0 + l_a$. $l_0$ indicates a natural length of a spring, $l_a$ indicates a displacement input of the spring, and f indicates an external force generated in the system. A spring force can be adjusted by the displacement of the natural length $l_a$ of the spring shown in Equation (A-4). In this model, a kick control unit adds energy by adjusting the displacement $l_a$ of the spring.

Here, assuming that the external force f generated in the system can be designed arbitrarily, Equation (A-3) can express an equation of motion of an arbitrary single-mass point model.

Hereinafter, in order to determine whether a dynamic system of the single-mass point model is a conservative system, it is determined whether an integrated value of a motion can be obtained.

When the equation of motion of Equation (A-3) is multiplied by $(p_{pend})$, a time integration amount thereof is energy. When an analysis solution of energy is a function that does not depend on time, the amount thereof is an integral of a motion and becomes a conserved amount. That is, the dynamic system of this model is a conservative system.

First, the equation of motion of Equation (A-3) is transformed into the following Equation (A-5).

[Equation. 13]

$$\int m_{pend} \dot{p}_{pend}^T \ddot{p}_{pend} dt = \frac{1}{2} m_{pend} \dot{p}_{pend}^T \dot{p}_{pend} = \qquad (A\text{-}5)$$

$$- \frac{k^2 p_{pend}^T p_{pend}}{2 k_0} - m_{pend} g z_{pend} + \int f^T \dot{p}_{pend} dt + Const$$

In Equation (A-5), Const is a mechanical energy of the system when f=0. Since f is unknown, Equation (A-5) has a time-dependent term. When this term can be solved in a time-independent manner, a motion integral of Equation (A-5) can be obtained.

Even in a model that generates an external force by itself, when $\int f(p\cdot)_{pend} dt$ is expressed in a definite integrable form, the motion thereof becomes a conservative system, and the uniformity of time is guaranteed. For example, a function $g(\cdot)$, its time integral function $G(\cdot)$, and an external force $f = g(p_{pend})$ are given, a motion integral of a dynamic system to which the external force is applied is obtained as the following Equation (A-6) as a function of $p_{pend}$.

[Equation. 14]

$$\int f^T \dot{p}_{pend} dt = G(p_{pend}) + Const \qquad (A\text{-}6)$$

Equation (A-6) has a constant term, which depends on time. The sum of the values of Const shown in Equations (A-5) and (A-6) is a kind of conserved energy. As long as the dynamic system is a conservative system, a motion is uniquely determined by the amount of conserved energy.

For this reason, in the first embodiment, as an example of a dynamic model for walking control, a model was created from conditions of a conservative system.

In control using the trajectory energy of the LIP model shown in image g135 of FIG. 3, conditions as expressed by the following Equation (A-7) are given.

[Equation. 15]

$$k_o = 0$$

$$f = \frac{(m_{pend} g |p_{pend}|)}{(e_z \cdot p_{pend})} \qquad (A\text{-}7)$$

$$z_{pend} = Const$$

In Equation (A-7), z is a unit vector in a z-direction.

Since f depends on a position $p_{pend}$, the dynamic system is a conservative system even when an external force is generated on the leg. Note that, in Non-Patent Document 3, conserved energy is defined as trajectory energy, and a walking speed of a robot is controlled by comparing a difference between the current trajectory energy and target trajectory energy. In this manner, by appropriately designing a force generated in the model, the dynamic system for a specific motion has uniformity in time and becomes a conservative system.

The motion of the robot can be uniquely determined by referring to the current conserved energy and the target conserved energy.

(Conservative System in Multi-Mass)

Next, conditions under which the system becomes a conservative system using a constraint trajectory when mass is added to a single-mass point model will be described. Note that the mass obtained by adding mass is referred to as pendulum mass. In a case where additional mass $m_{add}$ is added, and the position of the added mass is $p_{add} = \{x_{add}, z_{add}\}^T$ as shown in the image g136 of FIG. 3, a force and a moment are expressed by the following Equations (A-8) to (A-11).

[Equation. 16]

$$f = f_d + f_m \qquad (A\text{-}8)$$

[Equation. 17]

$$f_{add} = \begin{bmatrix} m_{add} \ddot{x}_{add} \\ m_{add}(\ddot{z}_{add} + g) \end{bmatrix} \qquad (A\text{-}9)$$

[Equation. 18]

$$M_m = -(p_{pend} - p_{add}) \times f_{add} \qquad (A\text{-}10)$$

-continued

[Equation. 19]

$$f_d = -f_{add} \tag{A-11}$$

Note that $f_m$ is the following Equation (A-12), and 1 in Equation (A-12) is the following Equation (A-13). In addition, $M_m$ is a moment generated in $p_{pend}$ by $f_{add}$.

[Equation. 20]

$$f_m = \frac{1}{l^2}(M_m z_{pend}, M_m x_{pend})^T \tag{A-12}$$

[Equation. 21]

$$l = \sqrt{p_{pend}^T p_{pend}} \tag{A-13}$$

In addition, energy for an external force is calculated as expressed by the following Equation (A-14). In addition, $\theta$ is an angle between the leg and the z-axis as shown in the drawing indicated by the symbol g135.

[Equation. 22]

$$\int f^T p_{pend} dt = \tag{A-14}$$
$$-\int f_d^T p_{pend} dt + \int f_m^T p_{pend} dt - \int f_d^T p_{pend} dt + \int M_m \dot{\theta} dt$$

The system is a conservative system when a primitive function that is not a time-dependent function is obtained in the integration of both a term related to a translational force and a moment in Equation (A-14) (an integral of a motion is obtained).

In the following description, an operation of obtaining an indefinite integral that does not depend on time is abbreviated as simply obtaining an indefinite integral.

For example, an integral of this motion can be obtained by satisfying conditions of both the following Equations (A-15) and (A-16). Note that $h_{d1}$, $h_{d2}$, $h_{m1}$, and $h_{m2}$ are coefficients in Equations (A-15) and (A-16).

[Equation. 23]

$$f_d = h_{d1}(\dot{p}_{pend}) + h_{d2}(p_{pend}) \tag{A-15}$$

[Equation. 24]

$$M_m = h_{m1}(\ddot{\theta}) + h_{m2}(\theta) \tag{A-16}$$

When $(p_{add})\ddot{}$ satisfying both Equations (A-10) and (A-11) can be derived under the conditions of Equations (A-15) and (A-16), a motion integral of a multi-mass point model is obtained, and the dynamic system thereof becomes a conservative system.

Figure 4:
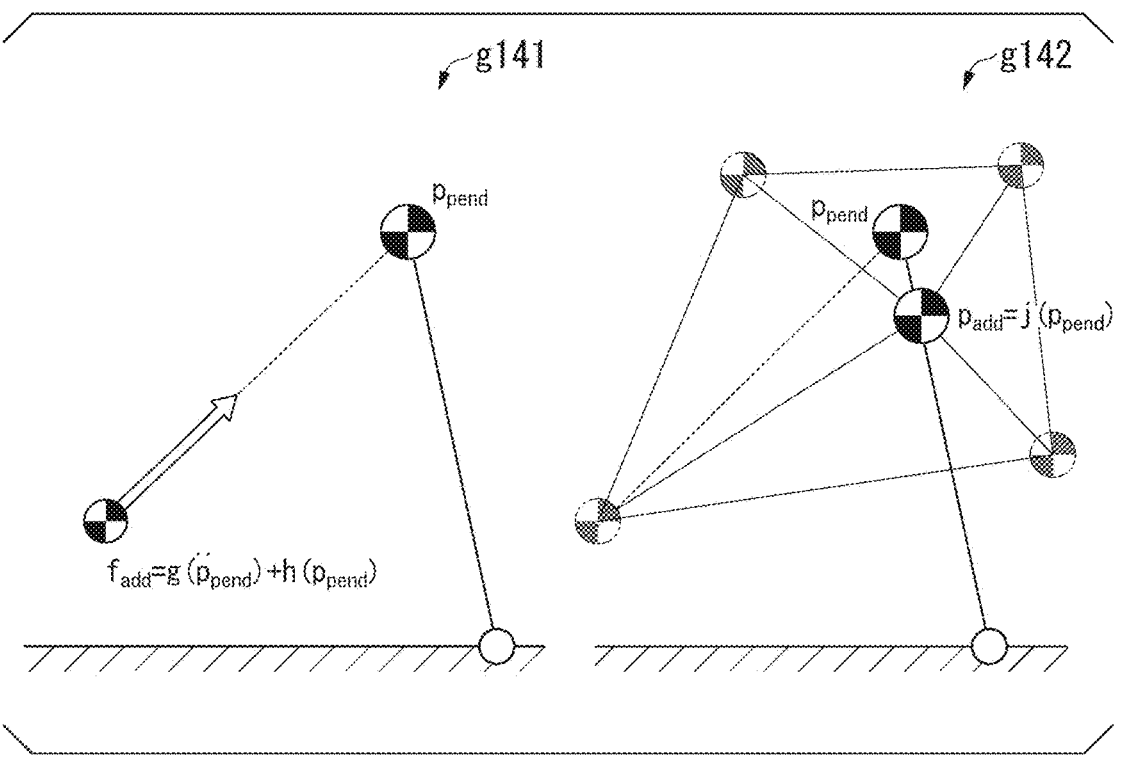
FIG. 4 is a diagram illustrating conditions under which a conservative system is established.

FIG. 4 is a diagram illustrating conditions under which the conservative system is established. The drawing indicated by a symbol g141 is a diagram illustrating forced constraints ignoring a moment. The drawing indicated by a symbol g142 is a diagram illustrating constraints of a position.

In the case of the symbol g141, a force from added mass is generated in the direction of the pendulum-mass point $p_{pend}$ so as to eliminate a moment component of Equation (A-16). As a result, it is possible satisfy the above-described conditions of the conservative system by setting a force to be a function of $p_{pend}$ or $(p_{add})\ddot{}$.

In the case of the symbol g142, when the center-of-gravity position (vector line $p_{pend}$–$\{0, 0\}^T$) of all added mass expected from the pendulum mass placed on the support leg axis and a $p_{pend}$-dependent constraint trajectory or a $p_{pend}$-dependent constraint force as illustrated in FIG. 17 are given, it is possible to remove a moment component and satisfy the above-described conditions of the conservative system.

Note that it is necessary to prevent a moment from being generated in the $p_{add}$ itself by a motion of a multi-mass point model.

As in the example of FIG. 4, it is possible to derive a simple condition for setting a motion of a model to be a conservative system. However, particularly in a swing leg motion during walking, it is necessary to bring the foot to a specific position in a specific body posture and a specific support leg posture in order to bring the foot into contact with the ground with stable walking. For this reason, a constraint of a position being a conservative system is preferable rather than a constraint of a force. Note that, in the following description, swing leg mass is treated as added mass.

(Derivation of Conserved Energy)

Next, conditions for a conservative system taking a swing leg motion into consideration by putting some assumptions and the derivation of conserved energy will be described.

In the case of walking, the foot is required to come into contact with the ground in a specific posture at the time of termination of the SS phase. That is, it is necessary to give a positional constraint condition to $p_{add}$ so that the foot reaches a specific position in a specific posture of the robot. For this reason, in the first embodiment, a position constraint condition such as in the following Equation (A-17) is given such that the position of the swing leg can be adjusted arbitrarily to some extent. Note that "c" having a subscript attached thereto is a parameter. In addition, $b_{add}$ is an offset.

[Equation. 25]

$$p_{add} = c_{add} p_{pend} + b_{add} \tag{A-17}$$
$$= \begin{bmatrix} c_x & 0 \\ 0 & c_z \end{bmatrix} p_{pend} + \begin{bmatrix} b_x \\ b_z \end{bmatrix}$$

Thereby, the following Equation (A-18) is obtained.

[Equation. 26]

$$\ddot{p}_{dd} = c_{dd} \ddot{p}_{pend} \tag{A-18}$$

In addition, an external force is expressed by Equation (A-15). In addition, an indefinite integral is obtained for a term related to a translational force of the energy of the external force in Equation (A-14).

On the other hand, regarding an external moment term in Equation (A-14), an indefinite integral cannot be obtained as it is.

For this reason, a motion of $p_{pend}$ in the SS phase is assumed to be similar to that of an inverted pendulum, and the following first assumption is made.

First Assumption: The Length of the Support Leg is Constant in the SS Phase.

Thereby, most of the indefinite integrals can be obtained for the moment term in Equation (A-14). At this time, when the total energy calculated from Equation (A-5) is set to be $E_{all}$, kinetic energy $E_{kinetic}$ and positional energy $E_{potential}$, and other energy $E_{mod}$ are expressed as the following Equations (A-19) to (A-22).

[Equation. 27]

$$E_{all} = E_{kinetic} + E_{potential} + E_{mod} \quad (A-19)$$

[Equation. 28]

$$E_{kinetic} = \frac{1}{2} m_{pend} \dot{p}_{pend}^T \dot{p}_{pend} + \frac{1}{2} m_{add} c_x c_z \dot{p}_{pend}^T \dot{p}_{pend} \quad (A-20)$$

[Equation. 29]

$$E_{potential} = \frac{k^2 \dot{p}_{pend}^T \dot{p}_{pend}}{2k_0} + m_{pend} g z_{pend} + m_{add} g c_x z_{pend} - m_{add} b_x g\theta \quad (A-21)$$

[Equation. 30]

$$E_{mod} = -\int \left( m_{add} b_{add} \times c_{add} \dot{p}_{pend} \right) \dot{\theta} dt$$

$$= \int M_{rem} \dot{\theta} dt \quad (A-22)$$

Figure 5:
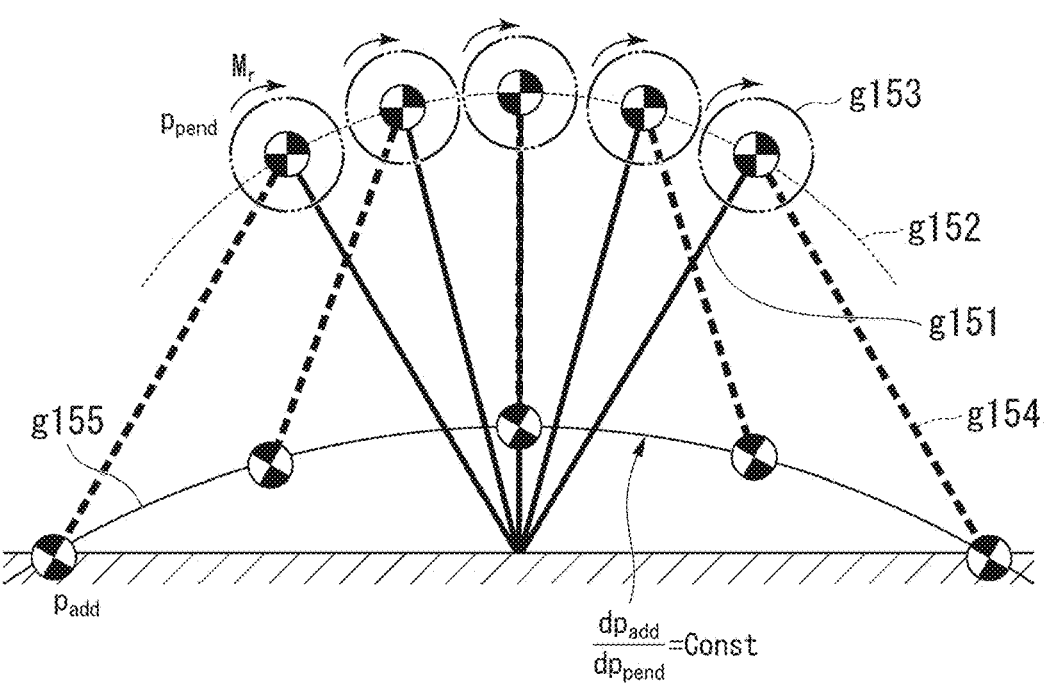
FIG. 5 is a diagram illustrating an example in which a flywheel is added.

A separate moment is generated for the term for which an indefinite integral cannot be obtained, thereby making it possible to obtain an integral as a resultant force. As illustrated in FIG. 5, a moment (flywheel) $M_r$ near $p_{pend}$ that does not depend on $m_{pend}$ and $m_{add}$ is added. FIG. 5 is a diagram illustrating an example in which a flywheel is added. Note that the mass of a position trajectory constraint of the swing leg is set to be a conservative system. A solid line g151 represents the support leg. A dashed line g152 represents the position of the mass of the swing leg. A circle g153 represents the flywheel. A dashed line g154 and a curve g155 represent pendulum mass and a pendulum leg.

In order to derive additional energy for obtaining an indefinite integral for Equation (A-22), Equation (A-22) can be expanded to derive additional energy as expressed by the following Equations (A-23) and (A-24).

[Equation. 31]

$$E_{mod} = E_{non} + m_{add} l \dot{\theta}^2 (c_x b_x l \sin\theta + c_x b_z \cos\theta) \quad (A-23)$$

[Equation. 32]

$$E_{non} = -m_{add} l \int (c_x b_x l \sin\theta + c_x b_z \cos\theta) \dot{\theta} \ddot{\theta} dt \quad (A-24)$$

Finally, a term $E_{non}$ (Equation (A-24)) that cannot be integrated remains.

In order for this model to be a conservative system, a moment $M_r$ for obtaining an indefinite integral of the following energy Equation (A-25) is required to be generated by the flywheel.

[Equation. 33]

$$E_{react} = E_{mod} + \int M_r \dot{\theta} dt$$

$$= \int (M_{rem} + M_r) \dot{\theta} dt \quad (A-25)$$

When the energy from the flywheel is calculated by any one of terms in the following Equation (A-26), an indefinite integral of the energy calculated by Equation (A-25) is obtained as expressed by the following Equation (A-27). Note that, here, $m_{add}$ is the mass of the center of gravity of the leg.

[Equation. 34]

$$\int M_r \dot{\theta} dt = \begin{cases} -E_{mod} \\ -E_{non} \\ -\frac{1}{2} m_{add} l \int c_z b_x \cos\theta + c_x b_z \sin\theta) \dot{\theta}^3 dt \end{cases} \quad (A-26)$$

[Equation. 35]

$$E_{react} = \begin{cases} 0 \\ m_{add} l (c_z b_x \cos\theta + c_x b_z \cos\theta) \dot{\theta}^2 \\ \frac{1}{2} m_{add} l (c_z b_x \cos\theta + c_x b_z \cos\theta) \dot{\theta}^2 \end{cases} \quad (A-27)$$

Here, the total energy $E_{all}$ is expressed by the following Equation (A-28).

[Equation. 36]

$$E_{all} = E_{kinetic} + E_{potential} + E_{react} \quad (A-28)$$

Here, the terms on the right side in Equation (A-27) correspond to the terms on the right side in Equation (A-25) from above. In these cases, a moment that has to be generated by the flywheel is any one of the terms in the following Equation (A-29).

[Equation. 37]

$$M_r = \begin{cases} -M_{add} \\ m_{add} l (c_z b_x \sin\theta + c_x b_z \cos\theta) \dot{\theta}^2 \\ -\frac{1}{2} l (c_z b_x \cos\theta - c_x b_z \sin\theta) \dot{\theta}^2 \end{cases} \quad (A-29)$$

Here, the terms on the right side in Equation (A-29) also correspond to the terms on the right side in Equation (A-25) from above. In this manner, by giving a constraint position trajectory (Equation (A-17)) to a turning leg trajectory and giving a constraint moment (Equation (A-29)) to the flywheel, it is possible to make the robot follow a target walking speed by intermittent walking control in which the conserved energy (Equation (A-28)) before the turning leg action has been adjusted.

In the first embodiment, the target walking speed is set to be a horizontal speed of pendulum mass at a peak position during a phase, and target conserved energy is uniquely determined from the first assumption and the target speed. In addition, the current conserved energy during the DS phase is calculated by $c_{add}$ and $b_{add}$, which are calculated from both a target peak position and the current position, and state quantities (position and speed) of pendulum mass during the DS phase.

(Approximate Conservative System with Constrained Position Trajectory)

A moment in Equation (A-29) is a term that represents a small part of the total swing leg energy for which an indefinite integral cannot be obtained, and is much smaller than a moment that is generated directly by the swing leg. A moment (Equation (A-26)) that has to be generated by the flywheel is infinitesimal under some assumptions, and it is possible to obtain an approximate value of conserved energy without implementing the flywheel. For this reason, hereinafter, some assumptions are put while particularly focusing on a moment shown by the third equation in Equation (A-29).

$b_x$ in the first term of the third equation in Equation (A-29) with $p_{end}$ is a distance between a pendulum mass position $p_{pend}$ when the pendulum mass is at the peak position and an x-axis of the added mass position $p_{add}$ As a setting range, it is necessary to set a value smaller than a stride, and the value is often much smaller than $c_x$, $c_z$, and $b_z$. Thus, the value is basically 0 or an extremely small value, and a second assumption is used as follows.

Second Assumption; bx≈0

Using this assumption, the first term in the third equation can be approximated as zero.

In addition, since a stride during walking is shorter than the leg length, a third assumption is used as follows.

Third Assumption; θ≈0

From these assumptions, the second term in the third equation can be approximated as zero. As a result, the moment Mr≈0 under these assumptions, and a flywheel moment becomes unnecessary. Thereby, a dynamic system becomes an approximate conservative system, and energy $E_{react}$ can be approximated as the following Equation (A-30).

[Equation. 38]

$$E_{react} \simeq \frac{1}{2} m_{add} c_x b_z l \dot{\theta}^2 \qquad (A-30)$$
$$= \frac{1}{2l} m_{add} c_x b_z p_{pend}^2$$

Thereby, walking control is performed by using the approximate conserved energy $E_{all}$ (Equation A-28) calculated from $E_{kinetic}$ (Equation A-20), $E_{potential}$ (Equation A-21), and $E_{react}$ (Equation A-30).

Implementation Example

Next, an implementation example of the walking control method will be described.

The walking control method of the first embodiment is based on the position-constrained swing leg trajectory (Equation (A-17)) and the conserved energy of kicking which is calculated by Equations (A-17) and (A-28) by using Hodgins's control. The conserved energy and the kicking energy depend on the state quantities and the parameters $b_{add}$ and $c_{add}$. The constraint trajectory determines these parameters.

Figure 6:
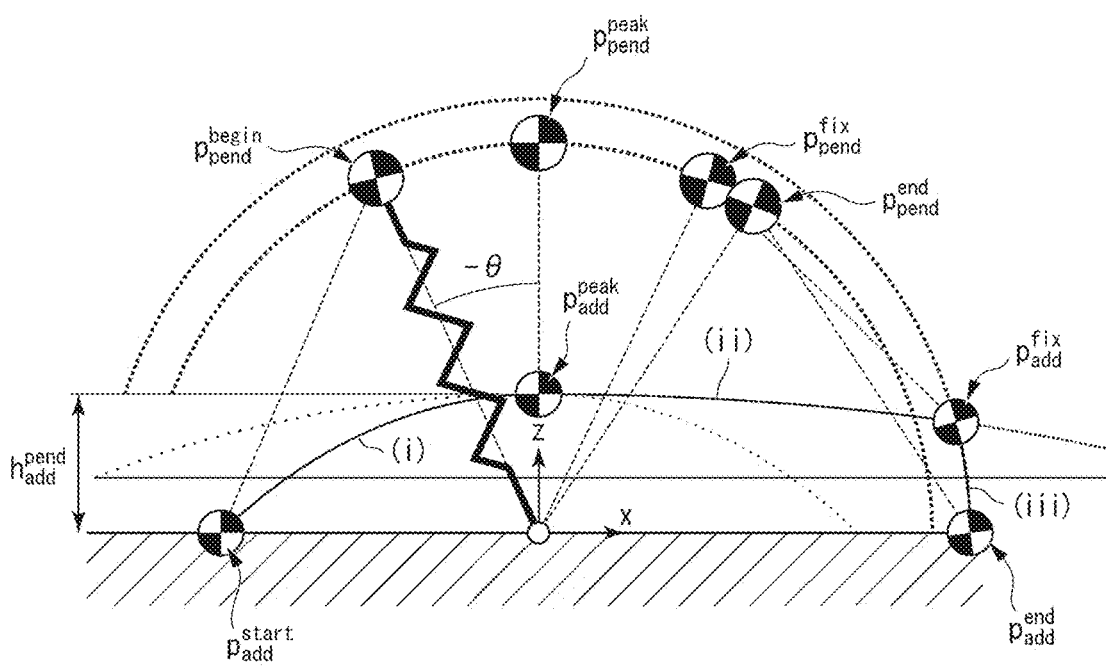
FIG. 6 is a diagram illustrating three phases of a motion in a swing leg.

First, a method of determining a constraint trajectory (Equation (A-17)) and a method of calculating conserved energy (Equation (A-28)) will be described. In actual robots, a swing leg trajectory in which an interval between a stride or a foot and the ground is changed in an SS phase during walking in many cases. For this reason, as illustrated in FIG. 6, a constraint swing leg trajectory that is decomposed into three swing leg phases is implemented. FIG. 6 is a diagram illustrating three phases of a motion in a swing leg. This decomposition allows a clearance with respect to the ground (or floor) and a stride to be adjusted.

In a phase (i), a trajectory of the swing leg is calculated from a target maximum height of a mass position of the swing leg.

In phases (ii) and (iii), two parameters, that is, a final clearance $(h_{cle})^{pend}$ and a stride length $(l_{stride})^{end}$, are introduced.

Note that a length between the pendulum mass position and the swing leg mass position is maximum when the z-axis position of the swing leg mass position reaches the final clearance $(h_{cle})^{pend}$. In addition, the maximum length is the same as the support leg length in the SS phase.

These trajectories are determined by the parameters $b_{add}$ and $c_{add}$.

The parameters $b_{add}$ and $c_{add}$ in each phase are derived by obtaining pendulum mass and swing leg mass positions $X=\{p_{pend}, p_{add}\}$ at the start and end of each swing leg phase and solving a simultaneous equation using Equation (A-17). In addition, as illustrated in FIG. 6, start and end positions of swinging phases (i), (ii), and (iii) are set to be $X^{start}$, $X^{peak}$, $X^{end}$, and $X^{atk}$.

First, each position at the end of the SS and DS phases, which is the beginning of the phase (i), is set to be $X^{start}$, and each position of the peak position (θ=0) is set to be $X^{peak}$. A z component of $(p_{pend})^{peak}$ is a target height at the peak position and is the same as the leg length in the SS phase. A z component of $(p_{peak})^{add}$ a maximum leg clearance, and this value is arbitrarily set as a target parameter.

Figure 7:
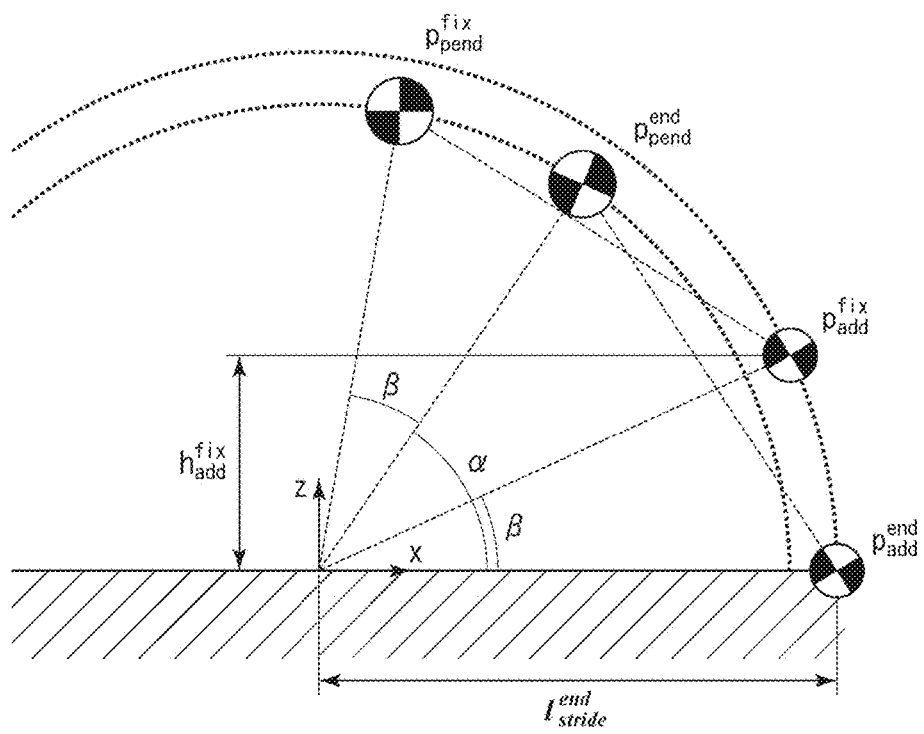
FIG. 7 is a diagram illustrating variables at an end of a swing action.

FIG. 7 is a diagram illustrating variables at an end of a swing action. As illustrated in FIG. 7, each position when the swing leg mass position reaches a target final clearance huddle is set to be $X^{end}$ (phase (i)), and each position when the foot is brought into contact with the ground is set to be $X^{atk}$ (phase (iii)). The values of $X^{end}$ and $X^{atk}$ are calculated from a target stride $(l_{stride})^{tar}$ and a target final clearance $(h_{cle})^{add}$ as expressed by the following Equation (A-31). Note that $l_{sup}$ is a support leg length, and a is an angle between $(p_{pend})^{atk}$ and $(p_{add})^{atk}$.

[Equation. 39]

$$p_{add}^{atk} = \begin{bmatrix} l_{stride}^{tar} \\ 0 \end{bmatrix} \qquad (A-31)$$
$$p_{pend}^{atk} = \begin{bmatrix} l_{sup}\cos\alpha \\ l_{sup}\sin\alpha \end{bmatrix}$$

From the first assumption, it is assumed that a length between a pendulum mass position and a pendulum leg mass position when the leg comes into contact with the ground is the same as $l_{sup}$ at the peak position. Then, $(p_{add})^{end}$ is obtained as the following Equation (A-32).

[Equation. 40]

$$p_{add}^{end} = \begin{bmatrix} \sqrt{(l_{stride}^{tar})^2 + (h_{cle}^{tar})^2} \\ h_{cle}^{tar} \end{bmatrix} \qquad (A-32)$$

Then, an angle (α+β) between $(p_{add})^{end}$ and $(p_{add})^{atk}$ is obtained, and $(p_{pend})^{end}$ is derived as expressed by the following Equation (A-33).

[Equation. 41]

$$p_{add}^{end} = \begin{bmatrix} \cos\beta & -\sin\beta \\ \sin\beta & \cos\beta \end{bmatrix} p_{pend}^{atk} \qquad (A\text{-}33)$$

Note that the conserved energy calculated by Equation (A-28) in the phase (iii) is mechanical energy because it is fixed in the coordinate system with the position of the pendulum mass as the origin. Thus, parameters $b_{add}$ and $c_{add}$ can be obtained by setting $(p_{pend})^{peak}$, $(p_{add})^{peak}$, $(l_{stride})^{tar}$, and $(h_{cle})^{tar}$. A constrained swing leg trajectory and its conserved energy can be calculated so that the SS phase becomes an approximate conservative system from these parameters.

(Target Conserved Energy and Applied Energy)

Approximate conserved energy $E_{all}$ is given by a function of the following Equation (A-34).

[Equation. 42]

$$E_{all} = E(p_{pend}, \dot{p}_{pend}, b_{add}, c_{add}) \qquad (A\text{-}34)$$

A target energy value is defined from a target speed at the peak position in the SS phase and the parameters $b_{add}$ and $c_{add}$. Here, the target speed at the peak position is set to be $(\dot{x}_{pend})^{tar}$. Since the height of the peak position is 1 from the first assumption, target values of respective state quantities are $(p_{pend})^{tar}=\{0, 1\}^T$, $(\dot{p}_{pend})^{tar}=\{(\dot{x}_{pend})^{tar}, 0\}^T$. Target energy is calculated from these parameters.

In addition, the current energy in the DS phase is calculated from the target position $X^{pend}$, the current position $X^{act}$, and the current state quantities $(p_{pend})^{act}$ and $(\dot{p}_{pend})^{act}$. An energy error is calculated from a difference between the current energy and the target energy, and is converted into a kicking action by Equation (A-1). Note that, in the DS phase, the current energy and the energy error are updated until the foot leaves the ground and the walking phase shifts from the DS phase to the SS phase.

(First Verification)

By using a simulation model, it was verified that the walking control method described above could allow a robot to follow a target speed only by controlling a kicking action even in a robot model based on a multi-mass point model. Verification conditions are as follows: a final clearance of $(h_{cle})^{tar}$ is 0.0122 m, a spring natural length $l_0$=0.5 m, a mass $m_{pend}$=10 kg, $m_{swg}$=1 kg, a spring constant $k_0$=10,000 N/m, and a damper constant $c_0$=500 Ns/m.

First, it can be understood that the conserved energy (Equation (A-28)) is substantially conserved in the SS phase. In addition, the target speed is given as the initial speed, and it was examined whether a walking speed converged to the target speed.

Figure 8:
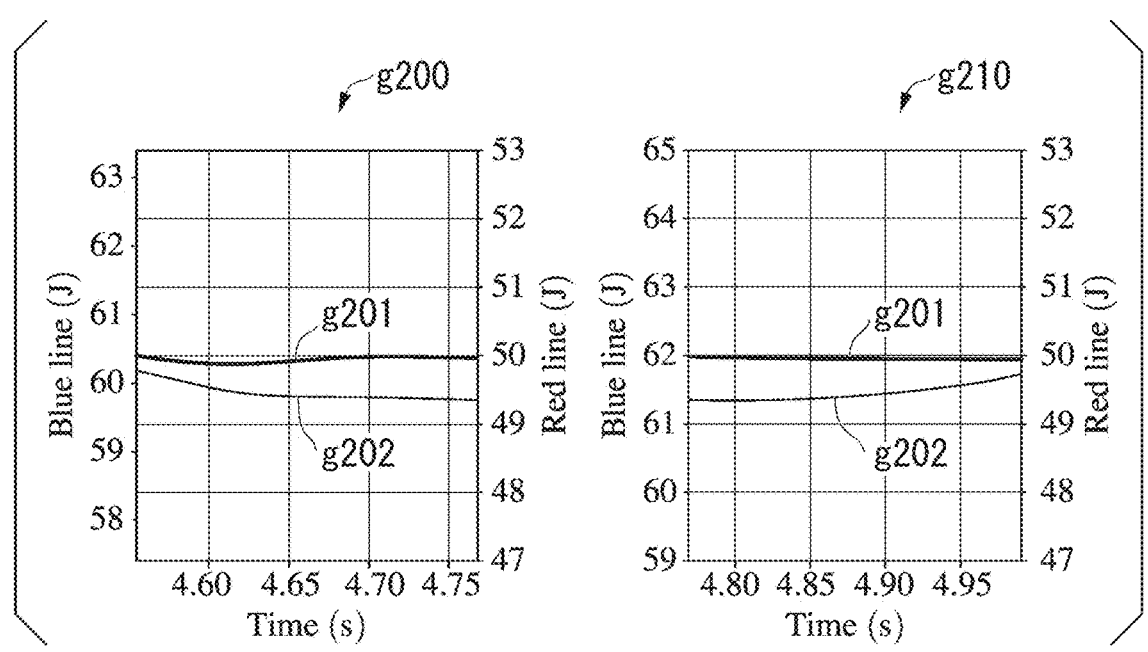
FIG. 8 illustrates pendulum-mass conserved energy and pendulum-mass mechanical energy when a target speed is 0.2 m/s.

FIG. 8 illustrates pendulum-mass conserved energy (Equation (A-28)) and pendulum-mass mechanical energy (phase (i), phase (ii)) when a target speed is 0.2 m/s. In FIG. 8, a graph g200 shows a first half of the SS phase, and a graph g210 shows a second half of the SS phase. In the graphs g200 and g210, a line g201 indicates conserved energy, and a line g202 indicates $p_{end}$ kinetic energy. Further, in the graphs g200 and g210, a horizontal axis represents time, a left vertical axis represents conserved energy with respect to the line g201, and a right vertical axis represents kinetic energy with respect to the line g202. Note that the phase (iii) is not illustrated in FIG. 8 because it has a short period and is clearly conserved as mechanical energy.

Here, mechanical energy of the pendulum-mass $m_{pend}$ is calculated as expressed by the following Equation (A-35).

[Equation. 43]

$$E_{pend} = \frac{1}{2} m_{pend} \dot{p}_{pend}^T \dot{p}_{pend} + m_{pend} g z_{pend} \qquad (A\text{-}35)$$

When the center of gravity of the entire model behaves like an inverted pendulum, the mechanical energy is constant, but when swinging mass generates an external force, the mechanical energy is not constant. In addition, actually, the mechanical energy of the pendulum mass is not a constant value, as illustrated in FIG. 8. In other words, the mechanical energy is not an integral of a motion (conserved energy), but is a time-dependent function, and cannot be used as a target quantity. A difference between the maximum energy and the minimum energy is 0.426 J in the first half of the SS phase as shown in the graph g200 and is 0.384 J in the latter half of the SS phase as shown in the graph g210.

On the other hand, the derived conserved energy (Equation (A-28)) is substantially constant, as shown in the graphs g200 and g210. A difference between the maximum energy value and the minimum energy value is 0.125 J in the first half of the SS phase as shown in the graph g200 and is 0.045 J in the latter half of the SS phase as shown in the graph g210. As a whole, compared with the mechanical energy, the energy calculated by Equation (A-28) does not change greatly and can be sufficiently utilized as conserved energy.

Figure 9:
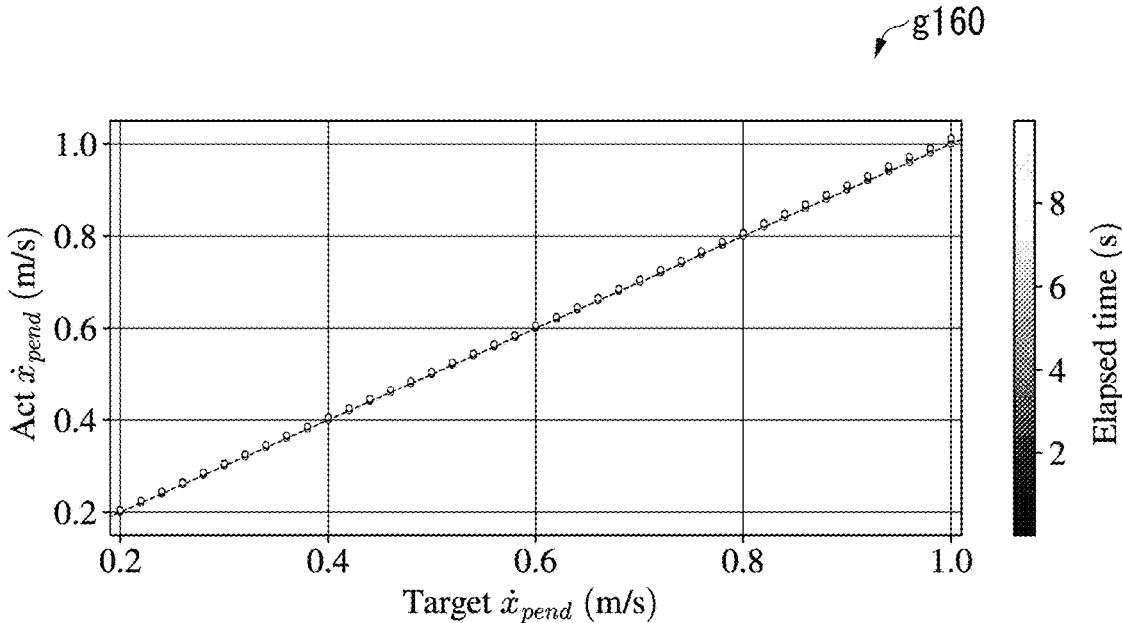
FIG. 9 is a diagram illustrating results of confirming speed following performance.

FIG. 9 is a diagram illustrating results of confirming speed following performance. A horizontal axis represents a target speed, and a vertical axis represents the speed at the peak position. The speed performance shows the speed at the peak position. From FIG. 9, it can be understood that the speed at the peak position is followed even when the target speed changes.

As shown in the verification results of FIGS. 8 and 9, it is verified that motion integration is possible by the obtained approximate conserved energy and constrained swing/mass trajectory as a result of the simulation, and it is confirmed that a dynamic system is an approximate conservative system. In addition, the target speed in the SS phase can be controlled by adjusting energy in the DS phase by using this result. In this manner, it is confirmed and established that the walking control method in the first embodiment is an intermittent control method capable of controlling a target walking action by controlling an amount before the target walking action.

(Second Verification)

Figure 10:
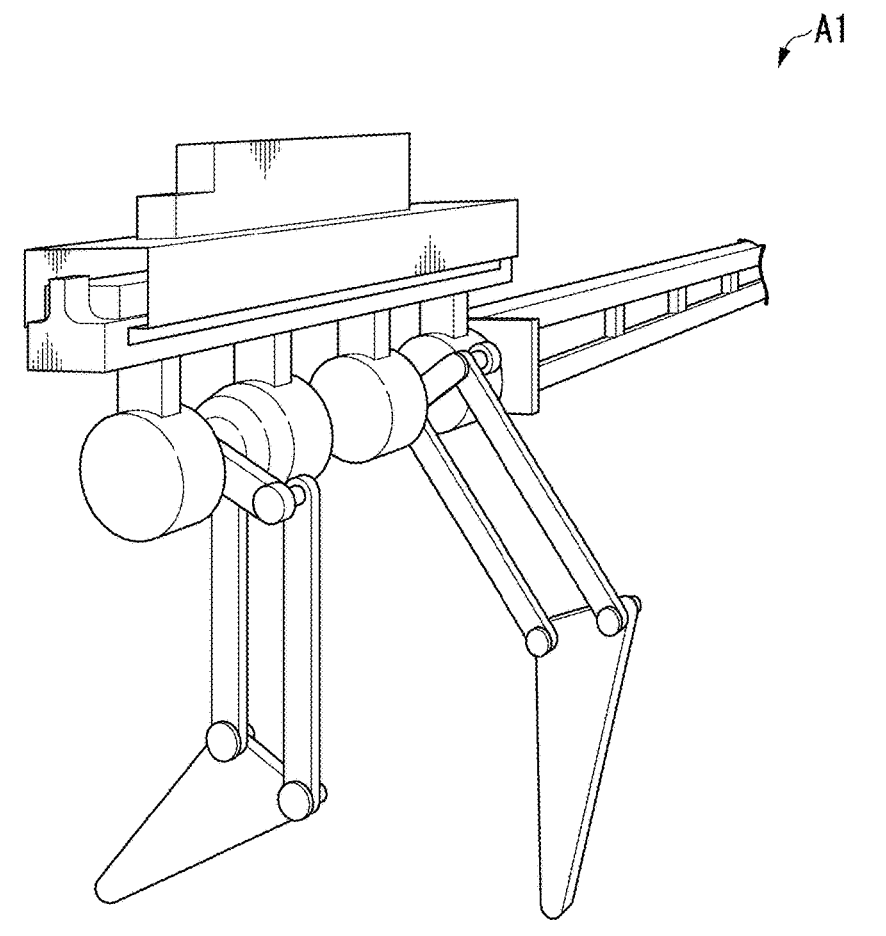
FIG. 10 is a diagram illustrating a bipedal walking robot used for verification.
Figure 11:
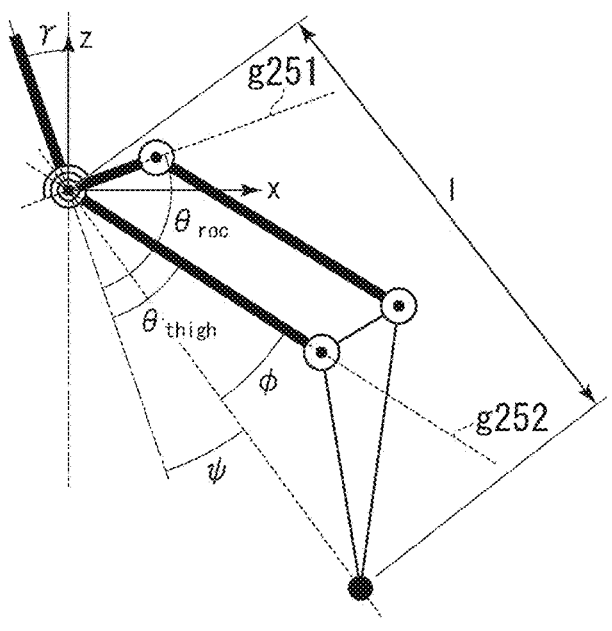
FIG. 11 is a diagram illustrating a definition of coordinates in the bipedal walking robot used for verification.
Figure 12:
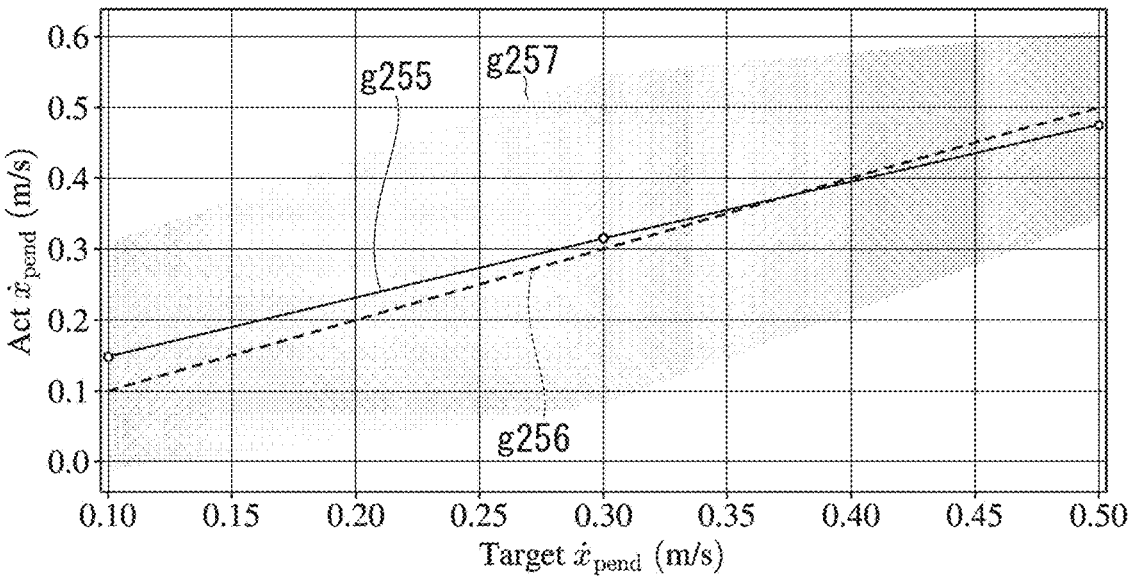
FIG. 12 is a diagram illustrating an example of verification results of walking.

Next, results of verifying the walking control method in the first embodiment by using a bipedal walking robot A1 (also referred to as a robot A1) as illustrated in FIG. will be described. FIG. 10 is a diagram illustrating the bipedal walking robot used for the verification. FIG. 11 is a diagram illustrating a definition of coordinates in the bipedal walking robot used for the verification. As illustrated in FIGS. 10 and 12, the bipedal walking robot A1 for verification constrains four degrees of freedom on a two-dimensional plane.

When the moment of the flywheel $M_r$=0, the posture of the upper body is kept upright with respect to the ground, and the leg length of the support leg is constant in the SS phase. In the verification, the bipedal walking robot A1 was made to walk 6.5 m at each target speed, and data was measured. Further, in this verification, three target speeds, that is, 0.10 m/s, 0.30 m/s, and 0.50 m/s, were given to the bipedal walking robot A1.

In the verification, an average speed at the peak position ($|\theta|<0.005$ rad) of a hip joint position was measured as a walking speed for each step. In the verification, the position of the hip joint was used as a pendulum mass position. The number of walking steps for each verification is approximately 20.

FIG. 12 is a diagram illustrating an example of verification results of walking. A horizontal axis represents a target speed, and a vertical axis represents the actual speed. In FIG. 12, an average speed with respect to a walking speed at the peak position is indicated by a dashed line g256, and a standard deviation is indicated by a band g257. In addition, a line g255 indicates a target speed.

From the results in FIG. 12, it can be understood that the average speed follows the target speed. In addition, from the verification results, it is confirmed from the experiment results that the walking speed was controlled.

In this manner, it is confirmed that it is possible to control a walking speed by kicking in the DS phase by the intermittent control method in the first embodiment.

(Configuration Example of Robot)

Here, a configuration example of the robot will be described.

Figure 13:
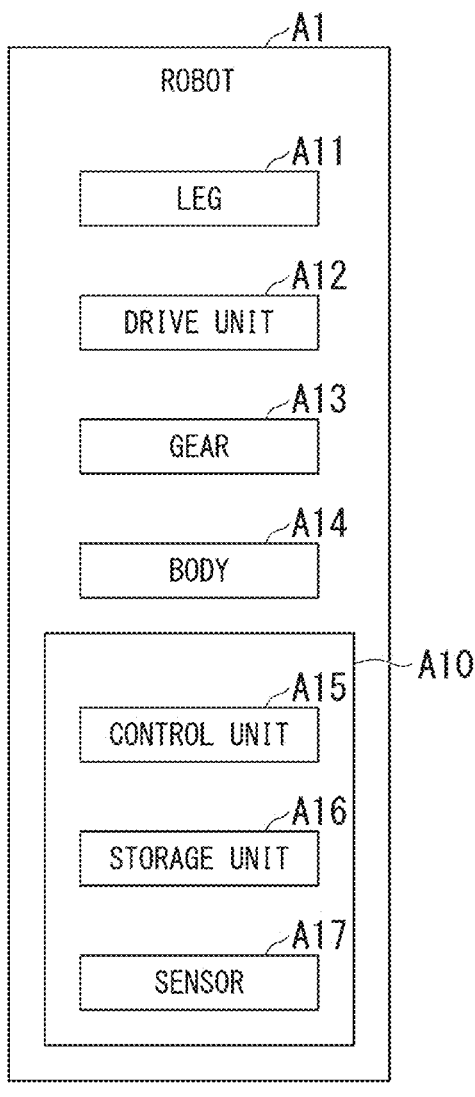
FIG. 13 is a diagram illustrating a configuration example of a robot according to the first embodiment.

FIG. 13 is a diagram illustrating a configuration example of the robot according to the first embodiment. Note that the configuration illustrated in FIG. 13 is an example and is not limited thereto.

As illustrated in FIG. 13, a robot A1 (walking device) includes, for example, a leg A11, a drive unit A12, a gear A13, a body A14, and a walking control device A10.

The walking control device A10 includes, for example, a control unit A15, a storage unit A16, and a sensor A17.

Note that the robot A1 may include an arm, a hand, a head, and the like. Note that at least two legs A11 are connected to the body A14. In addition, the control unit A15 and the storage unit A16 may be provided in an external device such as a robot control device.

The storage unit A16 stores parameters, equations, models, programs, and the like that are required for control. The storage unit A16 stores the weight of the robot A1, the length of the leg A11, and the like.

The sensor A17 is an inertial measuring unit that detects inertial momentum by using, for example, a force sensor or a torque sensor, a three-axis gyro sensor for knowing changes in rotation and direction, and a three-axis acceleration sensor for knowing changes in speed in an axial direction.

The control unit A15 performs control only by kicking by using conditions for becoming a conservative system in consideration of dynamics at the time of adding a mass point to a single-mass point model derived as described above, giving a swing leg constraint trajectory under the conditions, and using the entire system as the conservative system. Note that the walking control may be performed by controlling a motor provided in the drive unit A12 or may be performed by controlling a mechanical system.

(Processing Procedure)

Figure 14:
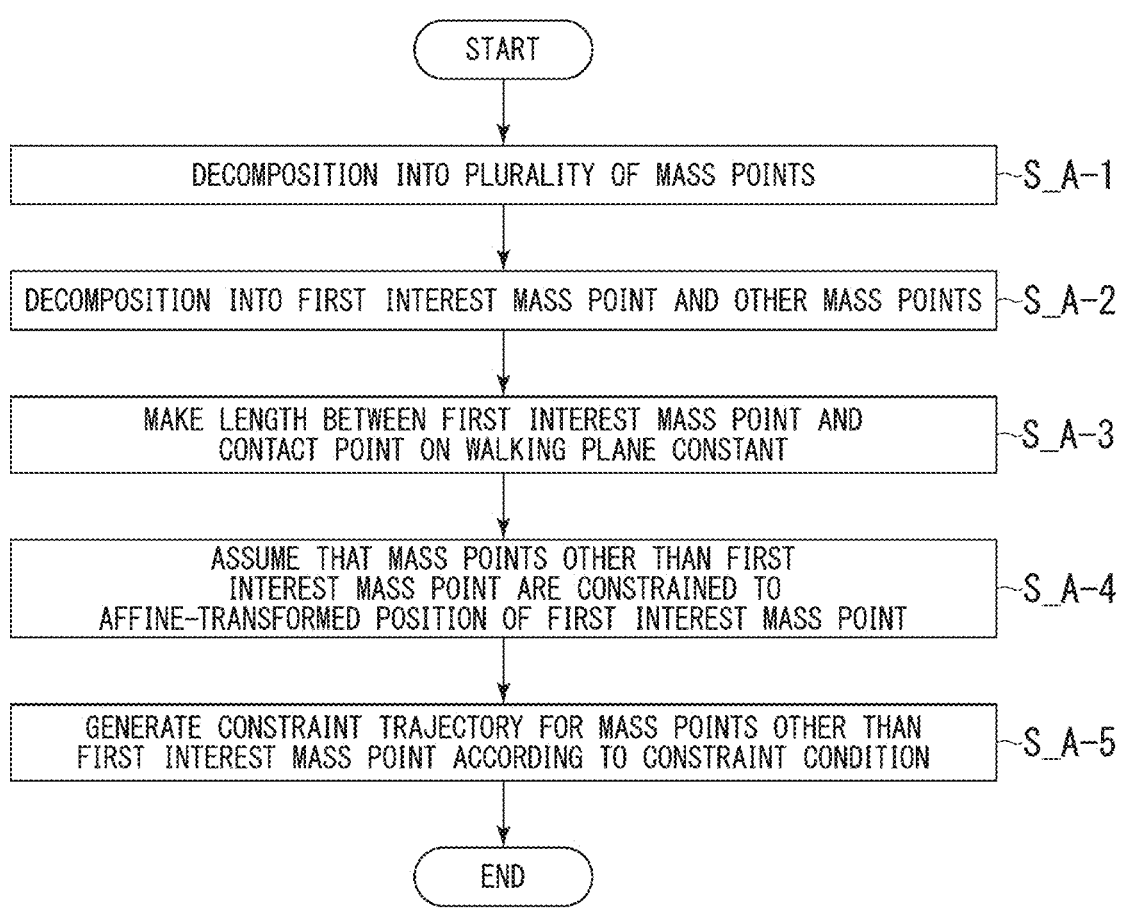
FIG. 14 is a diagram illustrating an example of a processing procedure of a walking control method performed by a walking control device according to the first embodiment.

Next, an example of a processing procedure of a walking control method performed by the walking control device A10 will be described. FIG. 14 is a diagram illustrating a processing procedure example of the walking control method performed by the walking control device A10 according to the first embodiment.

(Step S_A-1) First, a user such as a designer or a developer decomposes a mobile device (robot) having legs into a plurality of mass points.

(Step S_A-2) Next, the user decomposes the plurality of decomposed mass points into a first interest mass point (pendulum mass) and mass points other than the first interest mass point (second interest mass point, . . . ). The second interest mass point is, for example, additional mass or swing-leg mass.

(Step S_A-3) Next, the user assumes that a length between the first interest mass point and a contact point on a walking plane is constant.

(Step S_A-4) Next, the user assumes that mass points other than the first interest mass point are constrained to an affine-transformed (for example, Equation (A-17)) position of the first interest mass point. Note that the mass points other than the first interest mass point may be affine-transformed using an equation other than Equation (A-17).

(Step S_A-5) Next, when the first interest mass point is moved, the walking control device A10 generates a constraint trajectory for mass points other than the first interest mass point according to the constraint condition.

As described above, the walking control method in the first embodiment is an intermittent walking control method of controlling a walking speed by adjusting energy in the SS phase and giving a constrained swing leg trajectory. This method sets a motion of a multi-mass point model including turning leg mass to be a conservative system.

As a result of simulation, it can be understood that, according to the walking control method in the first embodiment, a dynamic system is substantially a conservative system and exhibits speed following performance. Further, from the results of verification using the bipedal walking robot A1, it is confirmed that the walking control method in the first embodiment follows a target walking speed. According to the walking control method in the first embodiment, any target speed can be followed by kicking a behavior including the swing mass in the SS phase, which is a passive motion, in the DS phase. These results show that a motion including a multi-mass point model can be quasi-passively and intermittently controlled by giving constraint conditions.

In addition, according to the first embodiment, as a result of simulation using two-mass point models, it is possible to obtain high following performance for a target speed by giving a constrained position trajectory of two mass positions using a flywheel ($M_r=0$). Further, in an actual robot, in order to reproduce motions of two-mass point models, a target speed can be followed as an average speed by giving a constraint motion to a support leg, a swing leg, and an upper body. Note that conditions under which a dynamic system of the whole body becomes a conservative system when the support leg, the swing leg, and the upper body are moving have not been derived in the related art. Further, in the case of a simple robot with less degree of freedom as illustrated in FIGS. 10 and 11, extension using two-mass point models can be used as it is.

On the other hand, in the case of a robot with several degrees of freedom in which a plurality of large masses generate different angular momentum, it is necessary to model motions of the plurality of masses and their coordinated motion. On the other hand, the walking control method in the first embodiment assumes a model in which added mass is added to pendulum mass, and thus it is possible to add a plurality of added masses. For this reason, when a plurality of motions are individually defined, there is a possibility that a model can be extended to include complex whole-body motions.

In addition, according to the first embodiment, the mass position of a pendulum can be given as a mass position other than the actual center of gravity of the whole body, and thus it is possible to extend models to various motions (models). In the above-described example, a constraint condition are given to the motion of the IP (or SLIP) model, but it is also possible to give a constraint condition to the motion of the LIP model. Note that, in order to set an SS motion of the LIP model to be a conservative system, the dynamics of the center of gravity as a whole-body motion needs to satisfy an LIP trajectory, and a dynamic system including a swing leg motion needs to be a conservative system. In this case, when the whole-body motion is divided into a pend portion related to the support leg and an add portion related to the swing leg, a condition for each of the portions to be a conservative system is only required to be derived. Thereby, the entire system becomes a conservative system.

Note that, although the pend portion needs to satisfy the first assumption, but the position of the pendulum mass $p_{pend}$ does not need to be the actual center-of-gravity position. In addition, a virtual weight can also be used as the mass position of the pendulum.

For example, it is assumed that a trajectory of the pend portion is an LIP trajectory. The LIP trajectory can be divided into $p_{pend}$ and $p_{impend}$. Note that the trajectory of $p_{pend}$ needs to satisfy the first assumption. Then, since $p_{impend}$ can be expressed in the same form as in Equation (A-17), $p'_{impend}$ can also be expressed in the same form as in Equation (A-18). In addition, the motion of the add portion can be a conservative system similar to the swing mass described above. In this manner, in the walking control method in the first embodiment, it is possible to extend motions to various motions using pendulum mass as virtual mass.

Further, in the first embodiment, in order to follow a target speed at the end of the phase (i) during swinging in the constrained swing leg trajectory, energy is adjusted with reference to the parameters $b_{add}$ and $c_{add}$ in the phase (i) during swinging that are known in advance in the DS phase. In the first embodiment, the state quantity at the end of the phase (i) is uniquely found from the conserved energy calculated from the state quantity at the start of the phase (i), and the state quantity is succeeded to the phase (ii) in the first embodiment to calculate the conserved energy in the phase (ii). Thus, when the parameters $b_{add}$ and $c_{add}$ in each phase are known in advance, the state quantity in any posture phase can be uniquely calculated. Note that it is assumed that the division illustrated in FIG. 6 is further subdivided and the subdivided trajectories are sequentially connected. After conserved energy in the SS phase is obtained, there is a possibility that the robot can be controlled with a more flexibly designed swing leg trajectory at a target walking speed by the walking control method in the first embodiment.

As described above, the walking control method in the first embodiment can be extended to support a multi-mass point model with two or more masses including large motions, complex motions including various swing leg trajectories, and various low-order models. With these extensions, the walking control method in the first embodiment can supplement various passively controlled motions before the passive motions are started.

APPENDIX

The derivation of the equations and the like used in the first embodiment will be described below.

(Derivation of Simulation Model)

Here, the derivation of a simulation model will be described.

As shown in the drawing indicated by the symbol g135 in FIG. 3, when the mass of a single-mass point model is $m_{pend}$ and the position is $p_{pend} = \{x_{pend}, z_{pend}\}^T$, the mass and position of the single-mass point model are $m_{pend}$ and $p_{pend}$, respectively. Then, an equation of motion of the two-mass point models is expressed as Equation (A-3). In Equation (A-3), k is Equation (A-4). When a force $f_{add}$ is applied to the added mass position $p_{add}$ (symbol g136 in FIG. 3), an external force f is calculated by a result of the two forces as in Equation (A-8). In addition, a moment $M_m$ and a force fa are calculated as shown in Equations (A-9) to (A-11). In addition, a translational force applied to the body by the moment is derived as shown in Equation (A-12).

Further, in order to add a damper parallel to a spring in the equation of motion (Equation (A-3)), the term of the following Equation (A-36) is added to the left side in Equation (A-3).

[Equation. 44]

$$C\left(p_{pend}, \dot{p}_{pend}\right) = \begin{cases} 0 & (|p_{pend}|) \geq l) \\ -c_0 \dfrac{p_{pend}^T \dot{p}_{pend}}{|p_{pend}|^2} & (|p_{pend}|) < l) \end{cases} \tag{A-36}$$

In this manner, the validation includes a small damper to stabilize the simulation. In addition, the Euler method is used for a dynamic simulation of a differential equation.

(Posture-Dependent Swing Leg Trajectory (with Clearance at the End of Swing))

In order to change a turning speed of the swing leg mass position in accordance with a walking speed even when a target walking speed changes, position-dependent constraints of the swing leg mass trajectory are given as the following Equations (A-37) and (A-38). Note that $K_{ratio}$ and $x_{val}$ are parameters for swing trajectory adjustment.

[Equation. 45]

$$x_{add}^{cmd} = (1 + K_{ratio})\left(x_{pend}^{act} - x_{pend}^{start}\right) + x_{add}^{start} \tag{A-37}$$

[Equation. 46]

$$l_{add}^{cmd} = \left(l_{add}^{max} - l_{add}^{min}\right)\left(\left\|\frac{x_{pend}^{act} - x_{pend}^{cmd}}{x_{pend}^{act} - x_{val}}\right\|\right) + l_{add}^{min} \tag{A-38}$$

However, when $(x_{add})^{cmd} \leq (x_{pend})^{act}$, $x_{val} = (x_{add})^{start}$. In addition, when $(x_{add})^{cmd} \geq (x_{pend})^{act}$, $x_{val} = (x_{add})^{tar}$. In the simulation, $(x_{add})^{tar} = (x_{pend})^{act} + 0.25$. Further, when $(x_{add})^{cmd} \geq (x_{pend})^{act}$ and $(l_{add})^{cmd} \geq (l_{add})^{max}$, $(l_{add})^{cmd} = (l_{add})^{max}$. For this reason, the leg length control stops when the leg length exceeds a maximum length (the natural length of the spring).

Figure 15:
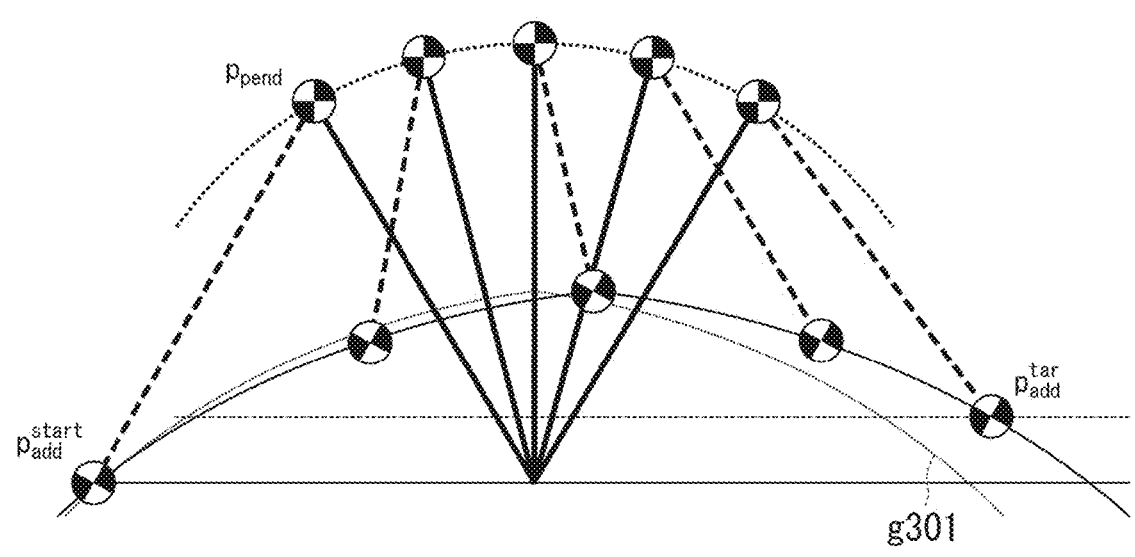
FIG. 15 is a diagram illustrating a position-dependent swing leg mass trajectory.
Figure 16:
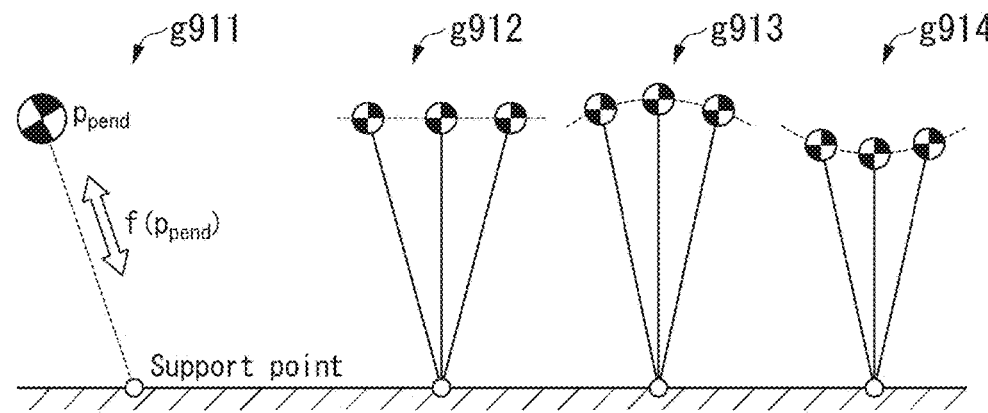
FIG. 16 illustrates an example of a model of which the motion is described by a conservative system.

FIG. 15 is a diagram illustrating a position-dependent swing leg mass trajectory. When $K_{ratio}$ is 1, the leg swing-leg trajectory is indicated by a dashed line g301 as illustrated in FIG. 15. By changing the value of $K_{ratio}$, a position at which the leg length control stops can be adjusted.

(Integral of Motion of Position-Dependent Function)

Here, it is assumed that a function g(c) is given as expressed by the following Equation (A-39).

[Equation. 47]

$$\int g(p)dp = G(p) \qquad (A\text{-}39)$$

A time differential of Equation (A-39) can be calculated as expressed by the following Equation (A-40).

[Equation. 48]

$$\frac{d}{dt}G(p) = g(p)\frac{d}{dt}p \qquad (A\text{-}40)$$

For this reason, the following integral is calculated as expressed by the following Equation (A-41).

[Equation. 49]

$$\int g(p)\frac{d}{dt}pdt = \int g(p)dp \qquad (A\text{-}41)$$
$$= G(p) + Const$$

(Transformation Based on Inverted Pendulum Assumption)
Assuming that the leg is an inverted pendulum (that is, the first assumption is established), a transformation such as the following Equation (A-42) is derived.

[Equation. 51]

$$\dot{x}_{pend} = l\cos\theta\dot{\theta} \qquad (A\text{-}43)$$
$$\dot{z}_{pend} = l\sin\theta\dot{\theta}$$

[Equation. 50]

$$x_{pend} = l\sin\theta \qquad (A\text{-}42)$$
$$z_{pend} = l\cos\theta$$

Regarding the above-described time differential (speed component), the following Equation (A-43) can be transformed into the following Equation (A-44).

[Equation. 52]

$$\dot{x}_{pend} = z_{pend}\dot{\theta} \qquad (A\text{-}44)$$
$$\dot{z}_{pend} = -x_{pend}\dot{\theta}$$

(Derivation of Energy: External Force Translational Component)
Assuming that a translational force (Equation (A-11)) is given, energy is calculated as expressed by the following Equation (A-45).

[Equation. 53]

$$\int f_d^T \dot{p}_{pend}dt = \int m_{add}\ddot{p}_{add}^T p_{add}dt + \int m_{add}[0, g]^T \dot{p}_{pend}dt \qquad (A\text{-}45)$$

Here, assuming that a constraint condition such as A in Equation (A-18) is given with respect to p add, an indefinite integral of the following Equation (A-46) is obtained.

[Equation. 54]

$$\int f_d^T \dot{p}_{pend}dt = \frac{1}{2}m_l c_{add}\dot{p}_{pend}^T \dot{p}_{pend} + m_{add}gz_{pend} \qquad (A\text{-}46)$$

(Derivation of Energy: External Moment Component)
Assuming that a moment (Equation (A-10)) is given, energy is calculated as expressed by the following Equation (A-47).

[Equation. 55]

$$\int M_m\dot{\theta}dt = -\frac{1}{l^4}\int (m_{add}l^2 p_{pend} \times \dot{p}_{pend})(p_{pend} \times \dot{p}_{pend})dt - \qquad (A\text{-}47)$$
$$\frac{1}{l^4}\int (m_{add}l^2 p_{pend} \times [0, g]^T)(p_{pend} \times \dot{p}_{pend})dt +$$
$$\frac{1}{l^4}\int (m_{add}l^2 p_{pend} \times \ddot{p}_{pend})(p_{pend} \times \dot{p}_{pend})dt +$$
$$\frac{1}{l^4}\int (m_{add}l^2 p_{pend} \times [0, g]^T)(p_{pend} \times \dot{p}_{pend})dt$$

When Equation (A-44) is used, a first term on the right side in Equation (A-47) is obtained as the following Equation (A-48).

[Equation. 56]

$$-\frac{1}{l^2}\int (m_{add}p_{pend} \times \ddot{p}_{pend})(p_{pend} \times \dot{p}_{pend})dt = \qquad (A\text{-}48)$$
$$m_{add}\int (c_x z_{pend}\ddot{x}_{pend} - c_x x_{pend}\ddot{z}_{pend})\dot{\theta}dt =$$
$$m_{add}\int (c_x z_{pend}\ddot{z}_{pend} + c_x x_{pend}\ddot{x}_{pend})dt = \frac{1}{2}m_l c_{add}\dot{p}_{pend}^2$$

A second term in Equation (A-47) is obtained as the following Equation (A-49).

[Equation. 57]

$$-\frac{1}{l^2}\int (m_{add}p_{pend} \times [0, g]^T)(p_{pend} \times \dot{p}_{pend})dt = +m_{add}gz_{pend} \qquad (A\text{-}49)$$

A third term in Equation (A-47) is obtained as the following Equation (A-50).

[Equation. 58]

$$\frac{1}{l^2}\int (m_{add}p_{add} \times \ddot{p}_{add}) \cdot (p_{pend} \times \dot{p}_{pend})dt = \qquad (A\text{-}50)$$
$$\int (m_{add}c_{add}p_{pend} \times c_{add}\ddot{p}_{pend})\dot{\theta}dt +$$
$$\int (m_{add}b_{add} \times c_{add}\ddot{p}_{pend})\dot{\theta}dt = -\frac{1}{2}m_l c_x c_z \dot{p}_{pend}^2 +$$
$$\int (m_{add}b_{add} \times c_{add}\ddot{p}_{pend})\dot{\theta}dt$$

Here, a term for which an indefinite integral cannot be obtained is written as $E_{mod}$ (Equation (A-22)).
In addition, a fourth term in Equation (A-47) is obtained as the following Equation (A-51).

[Equation. 59]

$$\frac{1}{l^2}\int (m_{add}p_{add}\times[0,\,g]^T)(p_{pend}\times\dot{p}_{pend})dt = \tag{A-51}$$

$$c_x\int(m_{add}p_{pend}\times[0,\,g]^T)(p_{pend}\times\dot{p}_{pend})dt +$$

$$\int\left(m_{add}\begin{bmatrix}b_x\\b_z\end{bmatrix}\times[0,\,g]^T\right)(p_{pend}\times\dot{p}_{pend})dt = -m_{add}gc_xz_{pend} +$$

$$m_{add}b_xg\theta$$

(Complete Conservative System Considering Additional Energy)

Further decomposition is performed on the terms in Equation (A-22) for which an indefinite integral cannot be obtained. When Equation (A-42) and two differentials thereof related to time are used, the non-integrable element and the moment are further expanded into the following Equation (A-52).

[Equation. 60]

$$E_{mod} = -\int(m_{add}b_{add}\times c_{add}\dot{p}_{pend})\dot{\theta}dt = \tag{A-52}$$

$$c_zb_xm_{add}l\int\left(\dot{\theta}^3\cos\theta + \dot{\theta}\ddot{\theta}\sin\theta\right)dt + c_zb_xm_{add}l\int\left(\dot{\theta}^3\sin\theta - \dot{\theta}\ddot{\theta}\sin\theta\right)dt$$

When transformation is performed such that an indefinite integral can be obtained, the following Equation (A-53) is obtained.

[Equation. 61]

$$E_{mod} = -c_zb_xm_{add}l\int\left(\dot{\theta}^3\cos\theta + 2\dot{\theta}\ddot{\theta}\sin\theta\right)dt + \tag{A-53}$$

$$c_xb_zm_{add}l\int\left(\dot{\theta}^3\sin\theta - 2\dot{\theta}\ddot{\theta}\cos\theta\right)dt + c_zb_xm_{add}l\int\dot{\theta}\ddot{\theta}\sin\theta dt +$$

$$c_xb_zm_{add}l\int\dot{\theta}\ddot{\theta}\cos\theta dt = -c_zb_xm_{add}l\dot{\theta}^2\sin\theta -$$

$$c_zb_xm_{add}l\dot{\theta}^2\cos\theta + m_{add}l\int(c_zb_x\sin\theta + c_xb_z\cos\theta)\dot{\theta}\ddot{\theta}dt$$

Finally, a term (the following Equation (A-54)) for which an indefinite integral cannot be obtained is obtained.

[Equation. 62]

$$E_{non} = m_{add}l\int(c_zb_x\sin\theta + c_xb_z\cos\theta)\dot{\theta}\ddot{\theta}dt \tag{A-54}$$

On the other hand, it is assumed that energy of the following Equation (A-55) is added by the flywheel.

[Equation. 63]

$$B_{remove} = \frac{1}{2}m_{add}l\int(c_zb_x\cos\theta - c_xb_z\sin\theta)\dot{\theta}^3\,dt \tag{A-55}$$

Although an indefinite integral of $E_{remove}$ itself cannot be obtained, an indefinite integral is obtained as expressed by the following Equation (A-56) with respect to $E_{non}+E_{remove}$.

[Equation. 64]

$$E_{non} + E_{remove} = -\frac{1}{2}m_{add}l(c_zb_z\sin\theta + c_zb_z\cos\theta)\dot{\theta}^2 \tag{A-56}$$

(Coordination and Motor Command)

In a coordinate space illustrated in FIG. 11, a motion space is defined as $\theta_M=\{\theta_{thigh},\,\theta_{rod}\}^T$, and the position of the foot in a task space $x=\{l_i,\,\Psi_i\}^T$ is defined as following Equations (A-57) to (A-59).

[Equation. 65]

$$\varphi_j = \frac{1}{2}(\theta_{thight,i} + \theta_{roc,i}) \tag{A-57}$$

[Equation. 66]

$$l_i = 2l_{link}f\cos\varphi_i \tag{A-58}$$

[Equation. 67]

$$\psi_i = \frac{1}{2}(\theta_{thigh,i} - \theta_{roc,i}) \tag{A-59}$$

Here, an index i indicates a front leg or a rear leg in the DS phase and indicates a support leg or a swing leg in the thin SS phase as illustrated in FIG. 11. In addition, $l_{link}$ is a link length of a thigh. $\varphi$ indicates an angle related to the link length, and $\Psi$ indicates a rotation angle of the leg.

A motor command is given as the following Equation (A-60) using a Jacobian matrix J.

[Equation. 68]

$$\dot{\theta}_M^{cmd} = J^{-1}\dot{x}^{cmd} \tag{A-60}$$

In Equation (A-49), $(\dot{x})^{cmd}$ represents a commanded speed in task space coordinates.

The center of gravity Jacobian of the leg is set to be $J_{cog}$, and $x^{\cdot cmd}$ is calculated as expressed by the following Equation (A-61).

[Equation. 69]

$$\dot{x}^{cmd} = J_{cog}^{-1}\dot{p}_{add}^{cmd} \tag{A-61}$$

Here, $(\dot{p}_{add})^{cmd}$ represents a command speed of the center of gravity of the leg. In addition, $(\dot{p}_{add})^{cmd}$ is calculated as expressed by the following Equation (A-62).

[Equation. 70]

$$\dot{x}^{cmd} = K_p(p_{add}^{tar} - p_{add}^{act}) \tag{A-62}$$

Here, $K_p$, $(p_{add})^{tar}$, and $(p_{add})^{act}$ represent a P gain, the center of gravity of a target leg, and the center of gravity of the target leg, respectively.

Modification Example of First Embodiment

In a modification example of the first embodiment, an example in which the conservative system model described above is extended will be described. Note that a configuration of the walking control device A10 is the same as that of the first embodiment.

Figure 18:
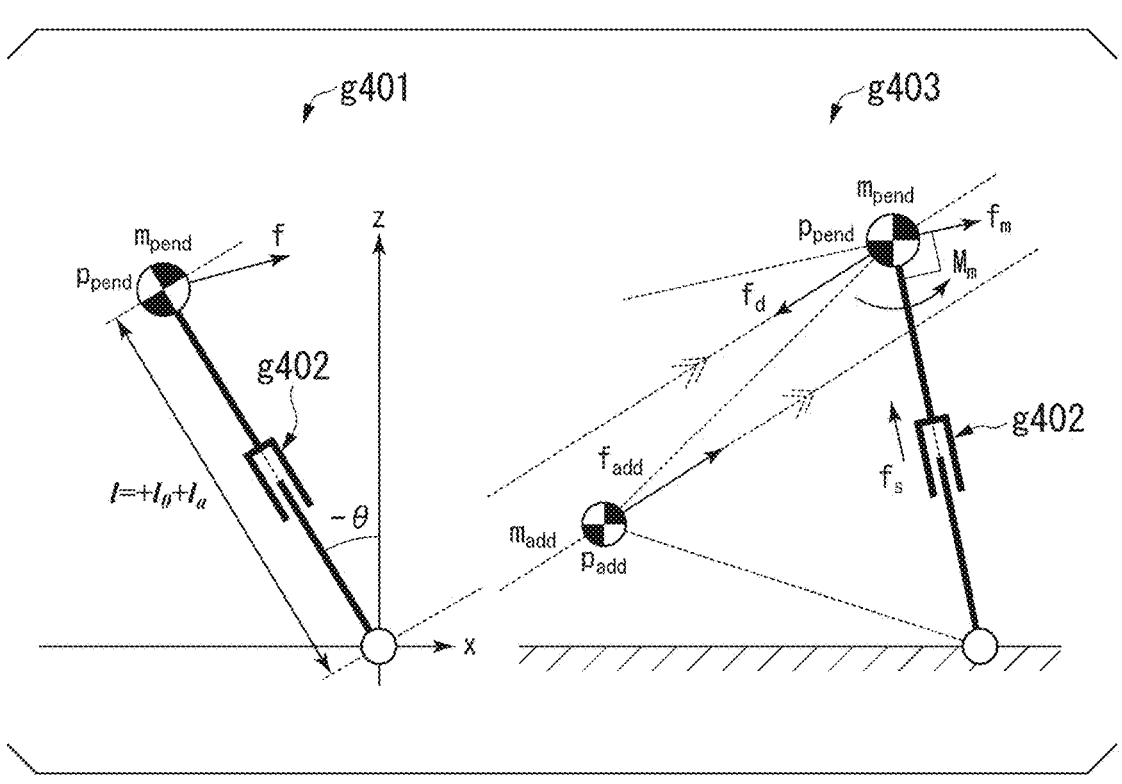
FIG. 18 is a diagram illustrating a single-mass point model and a two-mass point model according to a modification example of the first embodiment.

FIG. 18 is a diagram illustrating a single-mass point model and a two-mass point model according to the modification example of the first embodiment. Note that a symbol g402 indicates a support point of which an end point comes into contact with the ground. $P_{end}$ of a symbol g401 indicates the center of a mass point. In a symbol g403, add indicates a mass point added to the model of the symbol g401, and $p_{end}$ indicates a mass point center that does not include add.

As indicated by the symbol g401 in FIG. 18, when the mass point and position of a single-mass point model are set to be $m_{pend}$ and $p_{pend} = \{x_{pend}, z_{pend}\}^T$, respectively, an equation of motion of a two-mass point model is given as expressed by the following Equation (A-63).

[Equation. 71]

$$m_{pend}\ddot{p}_{pend} = -m_{pend}g[0, 1]^T + f \qquad (A-63)$$

When a case where a force $f_{add}$ is applied to the additional mass point position $p_{add}$ is added (symbol g402 in FIG. 18), an external force f at the additional mass point position $p_{add}$ is calculated as a result of the two forces as expressed by the following Equation (A-64).

[Equation. 72]

$$f = f_d + f_m + f_s \qquad (A-64)$$

In Equation (A-64), $f_d$ is directly calculated from $f_{add}$, and $f_m$ is converted from a moment $M_m$ via a ground reaction force. The moment $M_m$, the force $f_m$, and $f_d$ are calculated as expressed by the following Equations (A-65) to (A-67).

[Equation. 73]

$$f_{add} = \begin{bmatrix} m_{add}\ddot{x}_{add} \\ m_{add}(\ddot{z}_{add} + g) \end{bmatrix} \qquad (A-65)$$

[Equation. 74]

$$M_m = (p_{pend} - p_{add}) \times f_{add} \qquad (A-66)$$

[Equation. 75]

$$f_m = \frac{1}{l^2}\begin{bmatrix} M_m z_{pend} \\ M_m x_{pend} \end{bmatrix} \qquad (A-67)$$

l is the length of the leg, $l = l_0 + l_a$, where $l_0$ indicates a natural length of a spring, and $l_a$ indicates a displacement input of the spring. In addition, $f_s$ is defined as the following Equation (A-68).

[Equation. 76]

$$f_s = -kp_{pend} + C(\dot{p}_{pend}, p_{pend}) \qquad (A-68)$$

Here, k is expressed by the following Equation (A-69).

[Equation. 77]

$$k = \begin{cases} 0 & (|p_{pend}| \geq l) \\ k_0\left(1 - \frac{1}{|p_{pend}|}\right) & (|p_{pend}| < l) \end{cases} \qquad (A-69)$$

A spring force can be adjusted by displacing the natural length $l_a$ of the spring as shown in Equation (A-69). In this model, a kick control unit gives energy by adjusting the displacement $l_a$ of the spring. Further, in the model of Equation (A-63), since a damper is disposed in parallel with the spring, the term of the following Equation (A-70) is added to the left side of Equation (A-3).

[Equation. 78]

$$C(\dot{p}_{pend}, p_{pend}) = \begin{cases} 0 & (|p_{pend}| \geq l) \\ -c_0\dfrac{p_{pend}^T\dot{p}_{pend}}{|p_{pend}|^2}p_{pend} & (|p_{pend}| < l) \end{cases} \qquad (A-70)$$

In addition, in order to stabilize the simulation, a small damper is added in the modification example of the first embodiment. Further, in the simulation, parameters for setting the natural length of the spring, the mass, a spring constant, and a damper constant to $l_0 = 0.5$ m, $m_{pend} = 10$ kg, $m_{swg} = 1$ kg, $k_0 = 10{,}000$ N/rn, and $c_0 = 500$ Ns/m were used. In addition, the Euler method is used for a dynamics simulation of a differential equation.

The energy of the spring is calculated as expressed by the following Equation (A-71).

[Equation. 79]

$$E_s = \frac{1}{2}\frac{(kp_{pend})^2}{k_0} \qquad (A-71)$$

Note that, in this simulation, a loss of energy of the damper is neglected because the effect of the damper is small.

In this manner, a behavior of a multi-mass point model can be simulated from Equation (A-63) of an equation of motion and Equation (A-64) of a force. In this specification, mass and a mass point may be used in the same meaning.

As described above, when an external force f (symbol g401 in FIG. 18) generated in the system can be designed arbitrarily, Equation (A-63) can express an equation of motion of any single-mass point model.

Next, in order to determine whether the dynamic system of the single-mass point model is a conservative system, it is analyzed whether an integral of a motion can be obtained. When Equation (A-63) of the equation of motion is multiplied by $(\dot{p}_{pend})^{\cdot}$, the time integration amount thereof becomes energy. When an analytical solution for energy is a function that does not depend on time, the amount is an integral of a motion and becomes a conservative quantity. Thus, the dynamic system of this model is a conservative system.

Energy $E_{all}$ of the system is calculated as expressed by the following Equation (A-72) from Equation (A-63) of the equation of motion.

[Equation. 80]

$$E_{all} = \frac{1}{2}m_{pend}\dot{p}_{pend}^T\dot{p}_{pend} + m_{pend}gz_{pend} \\ - \int f^T\dot{p}_{pend}dt \qquad (A-72)$$

Note that $E_{all}$ is mechanical energy of the system when the energy calculated by f is positional energy or kinetic energy, for example, when f=0.

Since f is unknown, Equation (A-72) has a time-dependent term. When this term can be solved in a time-independent manner, an integral of a motion in Equation (A-72) can be obtained.

In other words, even in a model in which the system itself generates an external force, when $\int (f \cdot (p_{pend})')dt$ does not depend on time, the dynamic system of the model will be a conservative system. In addition, the force f thereof is referred to as a conservative force.

For example, when a function $g(\cdot)$, a time integral function $G(\cdot)$, and an external force $f=g(p_{pend})$ are given, a motion integral of the dynamic system to which the external force is applied is obtained as expressed by the following Equation (A-73) as a function of $p_{pend}$.

[Equation. 81]

$$\int f^T \dot{p}_{pend} dt = G(p_{pend}) + Const \qquad (A-73)$$

Note that the derivation of Equation (A-73) is performed in the same manner as the above-mentioned "(integral of motion of position-dependent function)".

For this reason, the dynamic system is a conservative system. Thus, Equation (A-72) does not have a time-dependent term. When Equation (A-73) is substituted into Equation (A-72), the quantity $E_{all}$ becomes a kind of conserved energy. As long as the dynamic system is a conservative system, a motion is uniquely determined by the amount of conserved energy.

In this manner, as an example of a dynamic model of a walking controller, a model was created from conditions of the conservative system. A controller using the trajectory energy of the LIP model indicated by the symbol g401 in FIG. 18 gives conditions as expressed by the following Equation (A-74).

[Equation. 82]

$$f = \frac{(m_{pend}g|p_{pend}|)}{(e_z \cdot p_{pend})} \qquad (A-74)$$

$$z_{pend} = Const$$

In Equation (A-74), $e_z$ is a unit vector in the z direction.

Since f depends on a position $p_{pend}$, the dynamic system becomes a conservative system even when an external force is generated on the leg. In Non-Patent Document 3, the conserved energy is defined as trajectory energy, and a walking speed of the robot is controlled by comparing a difference between the current trajectory energy and target trajectory energy. In this manner, by appropriately designing a force generated in the model, the dynamic system for a specific motion becomes a conservative system with time uniformity. The motion of the robot can be uniquely determined by referring to the current conserved energy and the target conserved energy.

(Conservative System in Multi-Mass)

In the modification example of the first embodiment, for the conservative system in multi-mass, Equation (A-8) (f=f$_d$+f$_m$) is replaced with Equation (A-64) (f=f$_d$+f$_m$+f$_s$).

(Derivation of Conserved Energy)

Next, conditions for becoming a conservative system taking a swing leg motion into consideration by putting some assumptions and the derivation of conserved energy will be described.

Figure 19:
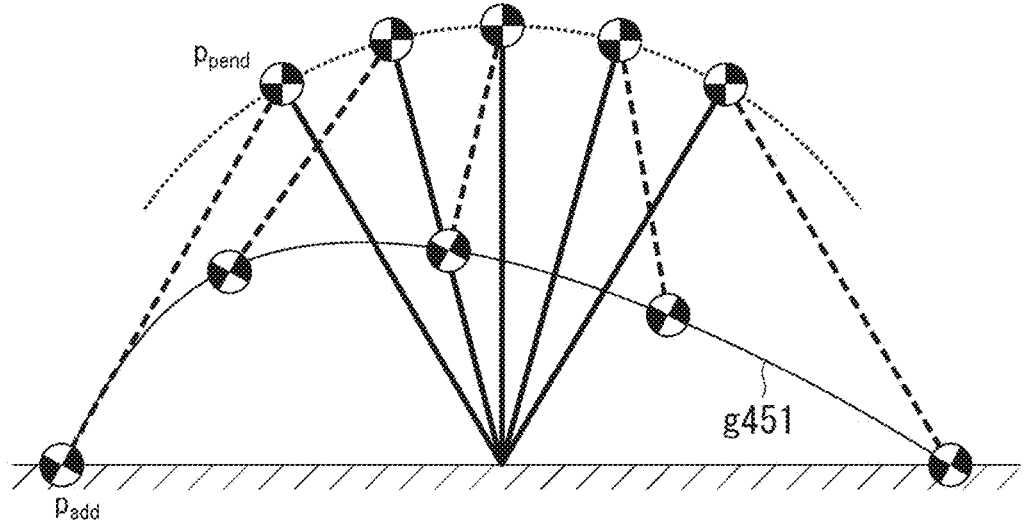
FIG. 19 is a diagram illustrating a conservative system model in the modification example of the first embodiment.

FIG. 19 is a diagram illustrating a conservative system model in the modification example of the first embodiment. As illustrated in FIG. 19, in the modification example of the first embodiment, the flywheel used in FIG. 5 of the first embodiment is not used, energy $E_{add}$ is added instead of adding the moment $M_r$, and affine transformation (Equation (A-74) to be described later) is used instead of Equation (A-17) as a constraint equation. Further, in the first embodiment, as illustrated in FIG. 5, the length of the leg during walking is constant, a trajectory $dp_{add}$, $dp_{pend}$ of $p_{add}$ is constant, and for example, they are regarded as curves that are symmetrical to each other, while in the modification example of the first embodiment, the length of the leg during walking is variable, and the trajectory of $p_{add}$ is, for example, parabolic as indicated by a curve g451 in FIG. 19.

In the case of walking, the foot is required to come into contact with the ground in a specific posture at the time of termination of the SS phase. That is, it is necessary to give a positional constraint condition to $p_{add}$ so that the foot reaches a specific position in a specific posture of the robot. For this reason, in the modification example of the first embodiment, a position constraint condition such as in the following Equation (A-75) is given such that the position of the swing leg can be adjusted arbitrarily to some extent. Note that $C_{add}$ is a matrix of affine transformation. In addition, $B_{add}$ is an offset.

[Equation. 83]

$$p_{add} = C_{add} p_{pend} + B_{add} = \begin{bmatrix} c_1 & c_2 \\ c_3 & c_4 \end{bmatrix} p_{pend} + \begin{bmatrix} b_x \\ b_z \end{bmatrix} \qquad (A-75)$$

Thereby, the following Equation (A-76) is obtained.

[Equation. 84]

$$\ddot{p}_{actd} = c_{add} \ddot{p}_{pend} \qquad (A-76)$$

In addition, an external force is expressed by Equation (A-15). In addition, an indefinite integral is obtained for a term related to a translational force of the energy of the external force in Equation (A-14).

On the other hand, for an external moment term in Equation (A-14), an indefinite integral cannot be obtained as it is.

For this reason, a motion of $p_{pend}$ in the SS phase is assumed to be similar to that of an inverted pendulum, and the following first assumption is made.

First Assumption: The Length of the Support Leg is Constant in the SS Phase.

Thereby, most of the indefinite integrals can be obtained for the moment term in Equation (A-14). At this time, when the total energy calculated from Equation (A-5) is set to be $E_{all}$, kinetic energy $E_{kinetic}$ and positional energy $E_{potential}$, and other energy $E_{mod}$ are expressed as the following Equations (A-77) to (A-80).

[Equation. 85]

$$F_{all} = E_{kinetic} + E_{potential} + E_s + E_{mod} \tag{A-77}$$

[Equation. 86]

$$E_{kinetic} = \frac{1}{2}(m_{pend} + m_{add}|C_{add}|)\dot{P}_{pend}^T \dot{P}_{pend} \tag{A-78}$$

[Equation. 87]

$$E_{potential} = \left(m_{pend}[0, g]^T + m_{add}|C_{add}|C_{add}^{-1}[0, g]^T\right)p_{pend} \tag{A-79}$$

[Equation. 88]

$$E_{mod} = m_{add}\int (B_{add} \times \dot{p}_{add})\dot{\theta}dt \tag{A-80}$$

In Equations (A-76) to (A-79), $|C_{add}|$ indicates a determinant of $C_{add}$. In addition, $E_s$ is energy of the spring.

The system energy $E_{all}$ has a term $E_{mod}$ that cannot be obtained by an indefinite integral. When the term of $E_{mod}$ is further expanded into Equation (A-80), the following Equation (A-81) is obtained.

[Equation. 89]

$$E_{mod} = m_{add}\int (B_{add} \times \dot{p}_{add})\dot{\theta}dt \tag{A-81}$$
$$+m_{add}\int (B_{add} \times p_{add})\dot{\theta}dt - m_{add}\int (B_{add} \times p_{add})\dot{\theta}dt$$

Finally, there remains a term that cannot be obtained by an indefinite integral. Here, it is assumed that another additional energy is generated in order to obtain an indefinite integral of the energy $E_{all}$ of the system.

In order to derive the additional energy for obtaining the indefinite integral of Equation (A-80), energy of the following Equation (A-82) needs to be generated.

[Equation. 90]

$$E_{react} = E_{mod} + E_{add} \tag{A-82}$$

In Equation (A-81), $E_{add}$ is the following Equation (A-83).

[Equation. 91]

$$E_{add} = Am_{add}\int (B_{add} \times \dot{p}_{pend})\dot{\theta}dt \tag{A-83}$$
$$+(A + 1)m_{add}\int (B_{add} \times \dot{p}_{pend})\ddot{\theta}dt$$

Here, A is a variable. An indefinite integral of Equation (A-81) of energy is obtained as expressed by the following Equation (A-84). In addition, $\theta$ is an angle between a mass point ($m_{pend}$) and a leg ground contact position, and $m_{add}$ is the weight of the leg.

[Equation. 92]

$$E_{react} = (A + 1)m_{add}(B_{add} \times \dot{p}_{add})\dot{\theta} \tag{A-84}$$

Here, $E_{all}$ is the following Equation (A-85).

[Equation. 93]

$$E_{all} = E_{kinetic} + E_{potential} + E_{react} \tag{A-85}$$

In the modification example of the first embodiment, Equation (A-74) of the constraint position trajectory is given to the swing leg trajectory, and added energy (due to the foot) is given, whereby it is possible to allow the robot to follow a target walking speed by intermittent walking control in which Equation (A-85) of the conserved energy has been adjusted before a swing leg motion. Note that the added energy may be added by the flywheel. In the modification example of the first embodiment, the target walking speed is set to be a horizontal speed of pendulum mass at the peak position in the SS phase, and target conserved energy is uniquely determined from a first premise condition in which "the length of the support leg is constant in the SS phase" and the target speed. In addition, the current conserved energy in the DS phase is obtained by $B_{add}$ and $C_{add}$, which are calculated from both the target peak position and the current position, and the position and speed of the pendulum mass in the DS phase.

Here, the derivation of the above-described equations will be described.

(Energy Derivation: Force Component)

When a constraint condition such as Equation (A-75) is given to $(p_{add})$'', an indefinite integral such as Equation (A-86) is obtained.

[Equation. 94]

$$\int f_d^T \dot{p}_{pend}dt = \int m_{add}\ddot{p}_{add}^T \dot{p}_{pend}dt + \int m_{add}[0, g]^T \dot{p}_{pend}dt \tag{A-86}$$
$$= \int m_{add}\ddot{p}_{add}^T \dot{p}_{pend}dt + m_{add}gz_{pend}$$

Here, an indefinite integral of a first term on the right side is obtained as expressed by the following Equation (A-87).

[Equation. 95]

$$\int m_{add}\ddot{p}_{add}^T \dot{p}_{pend}dt = \int m_{add}(c_1\ddot{x}_{pend}\dot{x}_{pend} + c_4\ddot{z}_{pend}\dot{z}_{pend})dt + \tag{A-87}$$
$$\int m_{add}(c_2\ddot{z}_{pend}\dot{x}_{pend} + c_4\ddot{x}_{pend}\dot{z}_{pend})dt$$
$$= \frac{m_{add}}{2}\begin{bmatrix} c_1 & 0 \\ 0 & c_4 \end{bmatrix}\dot{p}_{pend}^T\dot{p}_{pend} + m_{add}\left(\begin{bmatrix} c_2 & 0 \\ 0 & -c_3 \end{bmatrix}\dot{p}_{pend}\right)\times$$
$$\dot{p}_{pend}dt$$

The following Equation (A-88) is obtained from Equation (A-86).

[Equation. 96]

$$\int f_d^T \dot{p}_{pend} dt = m_{add} g z_{pend} + \frac{m_{add}}{2}\begin{bmatrix} c_1 & 0 \\ 0 & c_4 \end{bmatrix} p_{pend}^T p_{pend} \qquad (A-88)$$
$$+ m_{add}\left( \begin{bmatrix} c_2 & 0 \\ 0 & -c_3 \end{bmatrix} p_{pend} \right) \times \dot{p}_{pend} dt$$

(Derivation of Energy: Moment Component)

When Equation (A-66) of a moment is given, energy can be calculated as expressed by the following Equation (A-89).

[Equation. 97]

$$\int M_m \dot{\theta} dt = -\frac{1}{l^4}\int \left(m_{add} l^2 p_{pend} \times \ddot{p}_{pend}\right)\left(p_{pend} \times \dot{p}_{pend}\right)dt - \qquad (A-89)$$
$$\frac{1}{l^4}\int \left(m_{add} l^2 p_{pend} \times [0, g]^T\right)\left(p_{pend} \times \dot{p}_{pend}\right)dt +$$
$$\frac{1}{l^4}\int \left(m_{add} l^2 p_{pend} \times \ddot{p}_{pend}\right)\left(p_{pend} \times \dot{p}_{pend}\right)dt +$$
$$\frac{1}{l^4}\int \left(m_{add} l^2 p_{pend} \times [0, g]^T\right)\left(p_{pend} \times \dot{p}_{pend}\right)dt$$

First, by using the modified Equation (A-44), the indefinite integral of the first term on the right side in Equation (A-89) is obtained as expressed by the following Equation (A-90).

[Equation. 98]

$$\frac{1}{l^2}\int \left(m_{add} p_{pend} \times \ddot{p}_{pend}\right)\left(p_{pend} \times \dot{p}_{pend}\right)dt = m_{add}\int \left(-c_3 \dot{x}_{pend} z_{pend} - c_2 z_{pend} \dot{x}_{pend}\right)dt + \qquad (A-90)$$
$$m_{add}\int \left(-c_4 z_{pend} z_{pend} - c_1 \dot{x}_{pend} \dot{x}_{pend}\right)dt$$
$$= -m_{add}\int \left( \begin{bmatrix} c_2 & 0 \\ 0 & -c_3 \end{bmatrix} p_{pend}^T \right) \times \dot{p}_{pend} dt -$$
$$\frac{m_{add}}{2}\begin{bmatrix} c_1 & 0 \\ 0 & c_4 \end{bmatrix} p_{pend}^T p_{pend}$$

An indefinite integral of a second term of Equation (A-88) is obtained as expressed by the following Equation (A-91).

[Equation. 99]

$$\frac{1}{l^2}\int \left(m_{add} p_{pend} \times [0, g]^T\right)\left(p_{pend} \times \dot{p}_{pend}\right)dt = -m_{add} g z_{pend} \qquad (A-91)$$

An indefinite integral of a third term of Equation (A-89) is obtained as expressed by the following Equation (A-92).

[Equation. 100]

$$\frac{1}{l^2}\int (m_{add} p_{add} \times \ddot{p}_{add})\left(p_{pend} \times \dot{p}_{pend}\right)dt = +\frac{m_{add}}{l^2}\int \left(C_{add} p_{pend} \times C_{add} \ddot{p}_{pend}\right)\left(p_{pend} \times \dot{p}_{pend}\right)dt + \qquad (A-92)$$
$$\frac{m_{add}}{l^2}\int \left(B_{add} \times \ddot{p}_{pend}\right)\left(p_{pend} \times \dot{p}_{pend}\right)dt$$
$$= \frac{1}{2}m_{add}|C_{add}| p_{pend}^T p_{pend} + \frac{1}{l^2}\int \left(m_{add} B_{add} \times \dot{p}_{pend}\right)$$
$$\left(p_{pend} \times \dot{p}_{pend}\right)dt$$

Here, a term that cannot be obtained as an indefinite integral is expressed as Equation (A-80). Finally, an indefinite integral of a fourth term on the right side in Equation (A-89) is obtained as expressed by the following Equation (A-93).

[Equation. 101]

$$\frac{1}{l^2}\int \left(m_{add} p_{pend} \times [0, g]^T\right)\left(p_{pend} \times \dot{p}_{pend}\right)dt = c_1 \int \left(m_{add} p_{pend} \times [0, g]^T\right)\left(p_{pend} \times \dot{p}_{pend}\right)dt + \qquad (A-93)$$
$$\int \left(m_{add}\begin{bmatrix} b_x \\ b_z \end{bmatrix} \times [0, g]^T\right)\left(p_{pend} \times \dot{p}_{pend}\right)dt$$
$$= -m_{add} g c_1 z_{pend} + m_{add} b_x g \theta$$

(Anti-Differential of Added Energy)

When functions g(p) and h(p) and their time differential values g'(p) and h'(p) are given, an integral of g(p)h'(p) is obtained as expressed by the following Equation (A-94).

[Equation. 102]

$$\int \dot{g}(p)h(p)dt = g(p)h(p) - \int g(p)\dot{h}(p)dt \qquad (A\text{-}94)$$

Here, in order to obtain an indefinite integral of Equation (A-94), variables are added to the terms on the right side as in Equation (A-95) below.

[Equation. 103]

$$A \int \dot{g}(p)h(p)dt + B \int g(p)\dot{h}(p)dt \qquad (A\text{-}95)$$

Thereby, Equation (A-94) can be expressed as the following Equation (A-96).

[Equation. 104]

$$\int \dot{g}(p)h(p)dt = g(p)h(p) + A \int \dot{g}(p)h(p)dt + (B-1)\int g(p)\dot{h}(p)dt \qquad (A\text{-}96)$$

In order to obtain an indefinite integral of Equation (A-94), variables A and B need to satisfy the following Equation (A-97).

[Equation. 105]

$$A = B - 1 \qquad (A\text{-}97)$$

Thereby, an indefinite integral of Equation (A-93) is calculated as expressed by the following Equation (A-98).

[Equation. 106]

$$\int \dot{g}(p)h(p)dt = (A+1)g(p)h(p) \qquad (A\text{-}98)$$

(Minimum Added Energy)

In the case of Equation (A-81), each item of Equation (A-94) is equivalent to the following Equations (A-99) to (A-100).

[Equation. 107]

$$\int \dot{g}(p)h(p)dt = m_{add} \int (B_{add} \times \dot{p}_{add})\dot{\theta}dt \qquad (A\text{-}99)$$
$$= m_{add}l \int \Big(c_4 b_x \dot{\theta}^3 \cos\theta + c_4 b_x \dot{\theta}\ddot{\theta} \sin\theta -$$
$$c_1 b_z \dot{\theta}^3 \sin\theta + c_1 b_z \dot{\theta}\ddot{\theta} \cos\theta\Big)dt$$

[Equation. 108]

$$\int g(p)\dot{h}(p)dt = m_{add} \int (B_{add} \times \dot{p}_{add})\ddot{\theta}dt \qquad (A\text{-}100)$$
$$= m_{add}l \int (c_4 b_x \sin\theta + c_1 b_2 \cos\theta)\dot{\theta}\ddot{\theta}dt$$

From the second and third assumptions, Equation (A-82) becomes the following Equation (A-100).

[Equation. 109]

$$E_{add} = Am_{add}l \int (c_1 b_z \dot{\theta}\ddot{\theta}\cos\theta)dt + (a+1)m_{add}l \int (c_1 b_z \cos\theta)\dot{\theta}\ddot{\theta}dt \qquad (A\text{-}101)$$

Note that A is expressed by the following Equation (A-101), and a condition of $-\frac{1}{2}$ minimizes $E_{add}$ to zero.

[Equation. 110]

$$A = -\frac{1}{2}\min mizes E_{add} \qquad (A\text{-}102)$$

(Approximate Conservative System with Constrained Position Trajectory)

Equation (A-81) of energy is a term that represents an extremely small portion of the energy of the entire turning leg for which an indefinite integral cannot be obtained, and is much smaller than a moment directly generated by the turning leg. This energy is infinitesimally small under a certain assumption, and it is possible to obtain an approximation of the conserved energy without adding any energy.

Equation (A-82) includes $B_{add}$, and $b_x$ is a displacement between the pendulum mass position $p_{pend}$ and the x-axis of the added mass position $p_{add}$ when the pendulum mass is at the peak position. As a setting range, it is necessary to set a value for $b_x$ that is smaller than a stride, and the value of $b_x$ is often smaller than $c_1$, $c_4$, and $b_z$. Basically, the value of $b_x$ is set to 0 or an extremely small value and is used under the following premises.

Second Precondition; $b_x \approx 0$

Equations (A-99), (A-100), and (A-83) include sin. For this reason, a stride during walking is shorter than the leg length, and thus a precondition is added.

Third Precondition; $\theta \approx 0$

From this precondition, the dynamic system becomes an approximate conservative system, and energy $E_{react}$ can be approximated as expressed by the following Equation (A-103).

[Equation. 111]

$$E_{react} = -\frac{1}{2}m_{add}(B_{add} \times \dot{p}_{add})\dot{\theta} \qquad (A\text{-}103)$$

Consequently, walking control is performed using Equation (A-85) of approximate conserved energy calculated from Equations (A-78), (A-79), and (A-103).

Implementation Example

In the modification example of the first embodiment, conserved energy at the time of kicking which is calculated by Equations (A-74), (A-85), (A-78), (A-79), and (A-103) of the position-constrained swing leg trajectory is used by using the controller of Hodgins. Note that conserved energy and kicking energy depend on the position and speed of the pendulum mass and the parameters $B_{add}$ and $C_{add}$. The constraint trajectory determines these parameters.

An implementation method is basically the same as in the first embodiment. Although Equation (A-17) of the position-constrained swing leg trajectory is used in the first embodiment, Equation (A-74) is used for generalization in the modification example of the first embodiment. Further, although conserved energy of kicking which is calculated by Equations (A-17), (A-28), (A-20), (A-21) and (A-30) is used in the first embodiment, conserved energy of kicking which is calculated by Equations (A-74), (A-85), (A-78), (A-79) and (A-103) is used in the modification example of the first embodiment. Further, although $c_{add}$ and $b_{add}$ are used in the first embodiment, $C_{add}$ and $B_{add}$ are used in the modification example of the first embodiment.

Note that, in the modification example of the first embodiment, as described above, the entire system is set to be a conservative system by giving a constraint trajectory in which the center of gravity $p_{add}$ of additional mass related to a swing leg motion is a linear function of the center-of-gravity position $p_{pend}$ of the additional mass to a single-mass point model satisfying a conservative system by using a multi-mass point model obtained by adding the additional mass. Further, in the modification example of the first embodiment, energy is added to the system in order to make an indefinite integral obtained for a term for which a time-independent indefinite integral cannot be obtained in an equation representing energy for an external force of a single-mass point. Note that the system is a dynamic system. For example, applying energy to the system means applying energy to a model when an object is the model, and means applying energy to a robot when an object is the robot.
(Processing Procedure)

Figure 20:
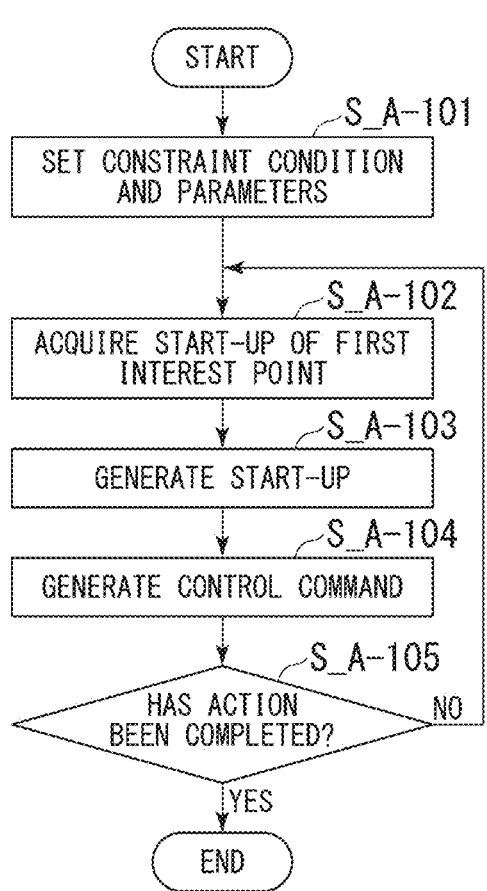
FIG. 20 is a diagram illustrating an example of a processing procedure of a walking control method performed by a walking control device according to the modification example of the first embodiment.

Next, an example of a processing procedure of the walking control method performed by the walking control device A10 will be described. FIG. 20 is a diagram illustrating an example of a processing procedure of the walking control method performed by the walking control device according to the modification example of the first embodiment;

(Step S_A-101) First, a user such as a designer or a developer decomposes a mobile device (robot) having legs into a plurality of mass points.

(Step S_A-102) Next, the user decomposes the plurality of decomposed mass points into a first interest mass point (pendulum mass) and mass points other than the first interest mass point (second interest mass point, . . . ). The second interest mass point is, for example, additional mass or swing-leg mass.

(Step S_A-103) Next, the user assumes that a length between the first interest mass point and a contact point on a walking plane is constant.

(Step S_A-104) Next, the user assumes that mass points other than the first interest mass point are constrained to an affine-transformed (for example, Equation (A-74)) position of the first interest mass point.

(Step S_A-105) Next, when the first interest mass point is moved, the walking control device A10 generates a constraint trajectory for mass points other than the first interest mass point according to the constraint.

As described above, in the modification example of the first embodiment, a two-mass point model constituted by additional mass related to a swing leg motion is used, and a constraint trajectory is derived and used with the system in one support phase as the conservative system. Also in the modification example of the first embodiment, this constraint makes it possible to follow a target speed by intermittent adjustment of energy by kicking in a double support phase.

As a result of verification using a simulation and an actual bipedal walking robot by using the method according to the modification example of the first embodiment, it can be confirmed that a walking speed follows a target speed.

Second Embodiment (Configuration Example of Robot)

Figure 21:
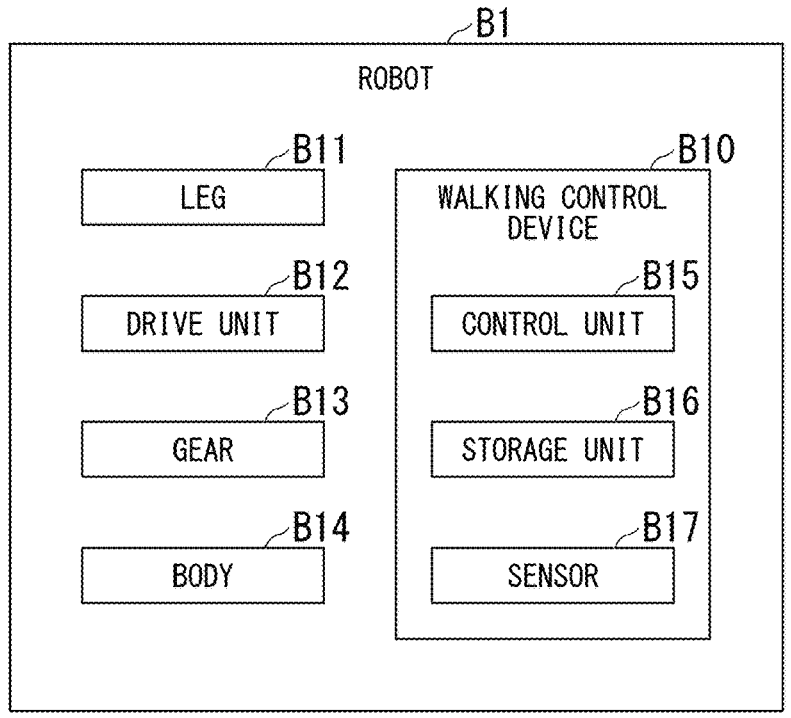
FIG. 21 is a diagram illustrating a configuration example of a robot according to a second embodiment.

FIG. 21 is a diagram illustrating a configuration example of a robot according to a second embodiment. Note that a configuration illustrated in FIG. 21 is an example and is not limited thereto.

As illustrated in FIG. 21, a robot B1 (walking device) includes, for example, a leg B11, a drive unit B12, a gear B13, a body B14, and a walking control device B10.

The walking control device B10 includes, for example, a control unit B15, a storage unit B16, and a sensor B17.

Note that the robot B1 may include an arm, a hand, a head, and the like. Note that at least two legs B11 are connected to the body B14. In addition, the control unit B15 and the storage unit B16 may be provided in an external device such as a robot control device.

The storage unit B16 stores parameters, equations, models, programs, and the like that are required for control. The storage unit B16 stores the weight of the robot B1, the length of the leg B11, and the like.

The sensor B17 is an inertial measuring unit that detects inertial momentum by using, for example, a force sensor or a torque sensor, a three-axis gyro sensor for knowing changes in rotation and direction, and a three-axis acceleration sensor for knowing changes in speed in an axial direction.

The control unit B15 performs control only by kicking by using conditions for becoming a conservative system in consideration of dynamics at the time of adding a mass point to a single-mass point model derived as described above, giving a swing leg constraint trajectory under the conditions, and using the entire system as the conservative system. Note that the walking control may be performed by controlling a motor provided in the drive unit B12 or may be performed by controlling a mechanical system.

Figure 22:
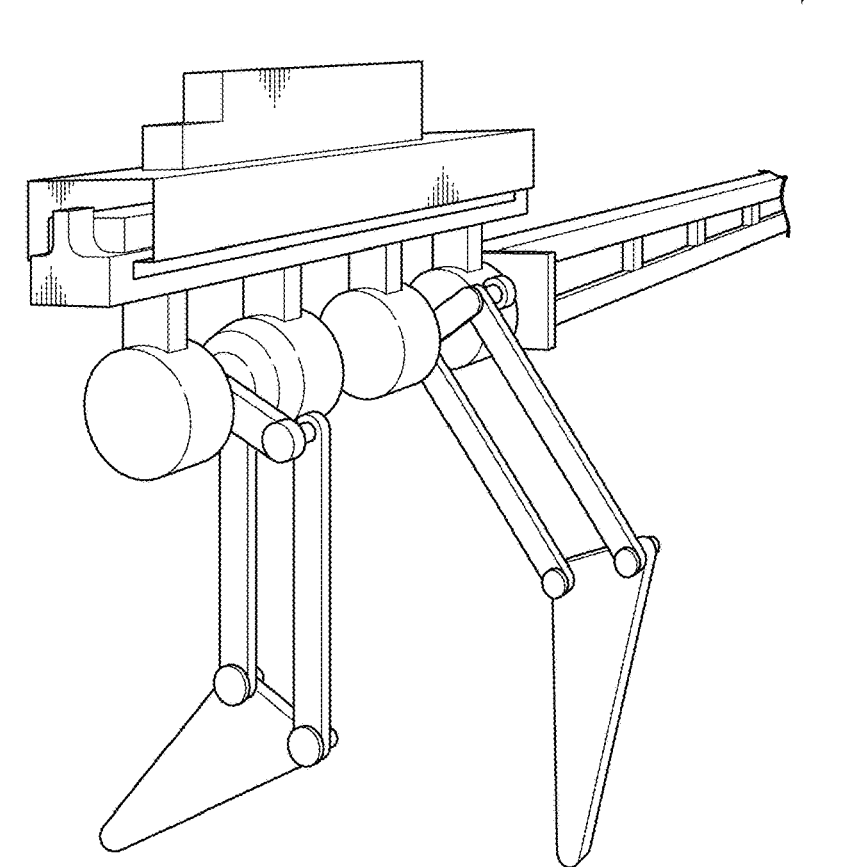
FIG. 22 is a diagram illustrating an appearance example of a robot.

FIG. 22 is a diagram illustrating an appearance example of the robot. As illustrated in FIG. 22, the robot B1 includes two legs B11 and the body B14. The legs B11 are driven by the drive unit B12. The drive unit B12 is controlled by the walking control device B10. The sensor B17 is attached to the leg B11. As illustrated in FIG. 22, the robot B1 constrains four degrees of freedom on a two-dimensional plane. Note that the appearance example illustrated in FIG. 22 is an example and is not limited thereto.
(Definition of Names and the Like)

Next, names and the like used in the second embodiment will be defined.

Figure 23:
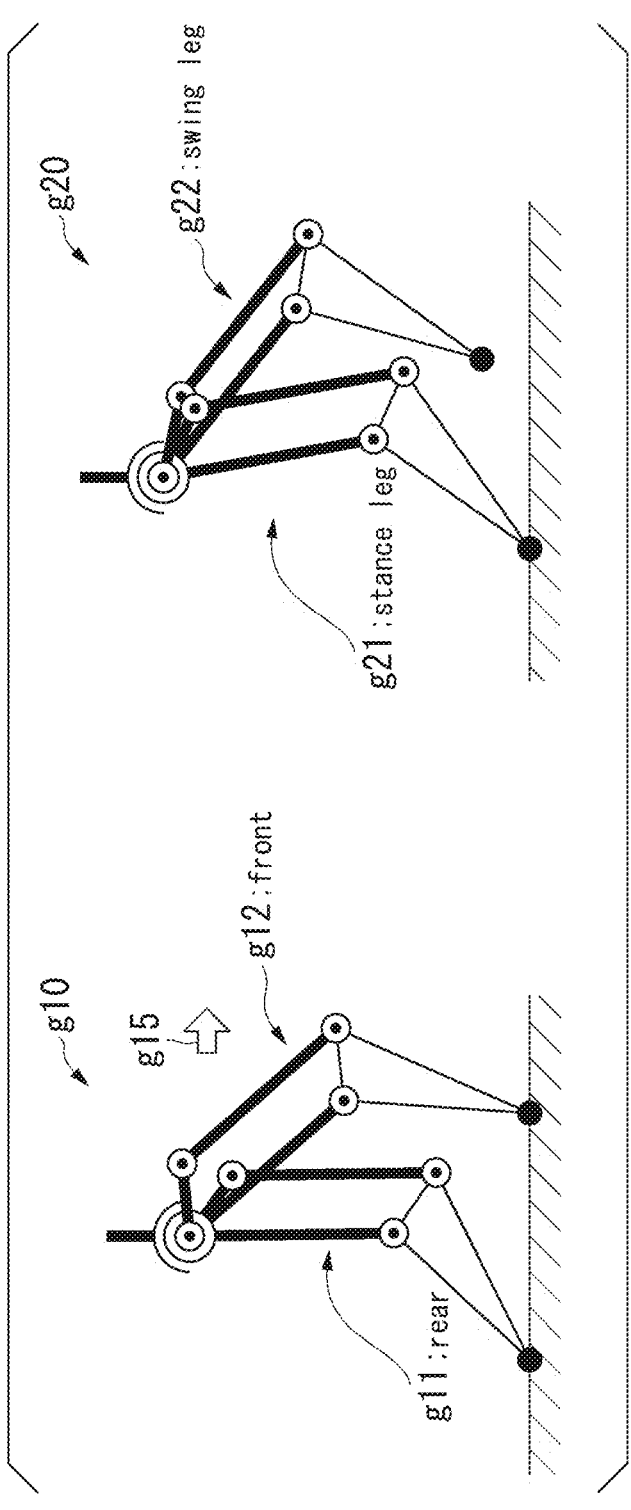
FIG. 23 is a diagram illustrating a definition of a leg.

FIG. 23 is a diagram illustrating a definition related to the leg.

An image indicated by a symbol g10 shows the state of a double-leg support phase, an arrow g15 indicates the direction of movement, a symbol g11 indicates a rear leg (rear), and a symbol g12 indicates a front leg (front).

An image indicated by a symbol g20 shows the state of a single-leg support phase, a symbol g21 indicates a support leg (sup), and a symbol g22 indicates a swing leg (swing).

Figure 24:
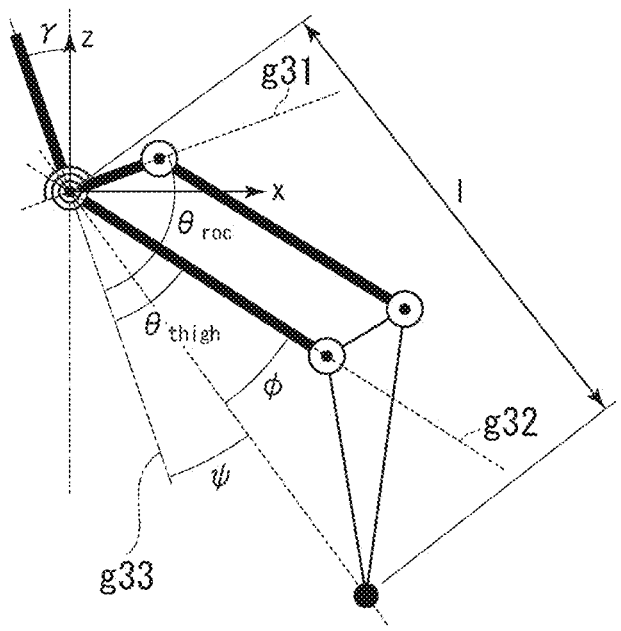
FIG. 24 is a diagram illustrating definition of coordinates, angles, and the like in a robot.

FIG. 24 is a diagram illustrating definitions of coordinates, angles, and the like in the robot.

The z-axis direction is perpendicular to a moving surface (ground, floor, or the like). The x-axis direction is parallel to the moving surface. 1 is the length of the leg. $\gamma$ is an angle between the z-axis direction and the center of gravity of the robot B1 or an inclination of the body of the robot B1. $\psi$ is an angle of the toe (leg angle) from a vertical direction g33 from the body. $\varphi$ is an angle (leg length angle) related to a leg length from the hip joint of the leg to the toe. A symbol g31 indicates the direction of a shorter link which is connected to the body B14 among links that constitute the leg B11. A symbol g32 indicates the direction of a longer link which is connected to the body B14 among the links that constitute the leg B11. $\theta_{roc}$ is a relative angle of the shorter link connected to the body B14 among the links that constitute the thigh of the leg B11 with reference to the direction indicated by the symbol g33. $\theta_{thigh}$ is a relative angle of the longer link connected to the body B14 among the links that constitute the thigh of the leg B11 with reference to the direction indicated by the symbol g33.

(Task Space Coordinate System of Robot)

Figure 25:
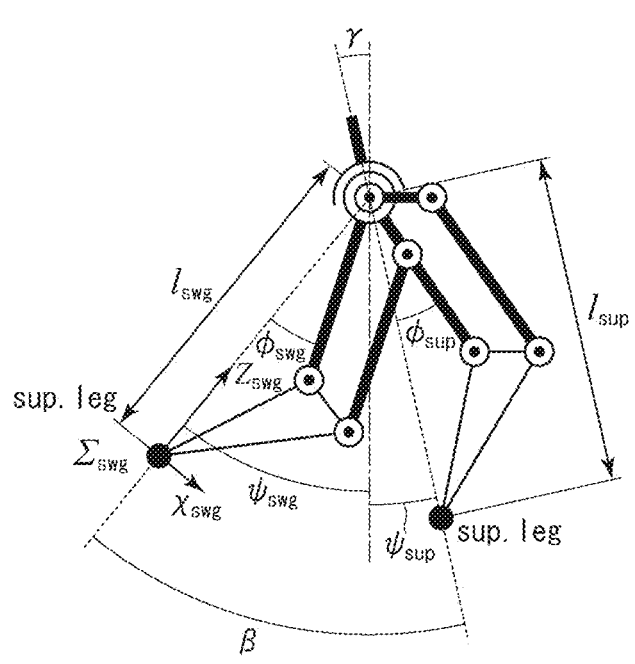
FIG. 25 is a diagram illustrating a task space coordinate system of a robot, and a diagram of a planar bipedal walking model showing variables used for Hodgins's control which is a conventional method.

A task space coordinate system of the robot B1 will be further described using FIG. 25.

FIG. 25 is a diagram illustrating a task space coordinate system of the robot, and is a diagram of a planar bipedal walking model showing variables used for Hodgins's control which is a conventional method. A joint space is defined by a relative angle $\theta M = \{\theta_{left,in}, \theta_{left,out}, \theta_{right,in}, \theta_{right,out}\}^T$ of four links extending from the hip joint. Note that T indicates transposition, left indicates a left side, and right indicates a right side. In addition, here, in and out of each drive unit B12 correspond to a rocker and a thigh link of a parallel link forming the thigh, respectively. A task space $x = \{(x_{swg})^T, (x_{sup})^T\}$ or $\{(x_{fore})^T, (x_{back})^T\}$ representing the foot tip position is defined by the following Equation (B-1).

[Equation. 112]

$$x_i = \{l_i, \psi_i\}^T \qquad (B\text{-}1)$$

where $$\phi_i = \frac{1}{2}(\theta_{j,in} \rightarrow \theta_{j,out}),$$

$$l_i = 2l_{link}\cos\phi_i,$$

$$\psi_i = \frac{1}{2}(\theta_{j,in} + \theta_{j,out})$$

In Equation (B-1), a subscript "j" indicates the right and left of the corresponding leg, and a subscript "i" indicates a functional classification of the leg. In a single-leg support phase, $i \in \{swg, sup\}$ indicates a swing leg and a support leg, and in a double-leg support phase, $i \in \{fore, back\}$ indicates a front leg and a rear leg. $\varphi_i$ and $\psi_i$ indicate an angle related to the leg length from the hip joint to the foot tip of the leg, and an angle from the vertical direction, which are referred to as a leg length angle and a leg angle, respectively. In addition, $l_{link}$ indicates the length of a thigh link. A coordinate system in which a unit vector directed from the foot tip to the hip joint is set as a z-axis is referred to as a leg coordinate system $\Sigma_i$.

In addition, a control system is formulated as a target speed in the entire task space, and a motor command value is given as expressed by the following Equation (B-2) using a Jacobian matrix J. Note that a superscript " ` " represents a first-order differential.

[Equation. 113]

$$\dot{\theta}_M^{cmd} = J^{-1}\dot{x}^{cmd} \qquad (B\text{-}2)$$

(Planar Bipedal Walking Model of Related Art)

Figure 26:
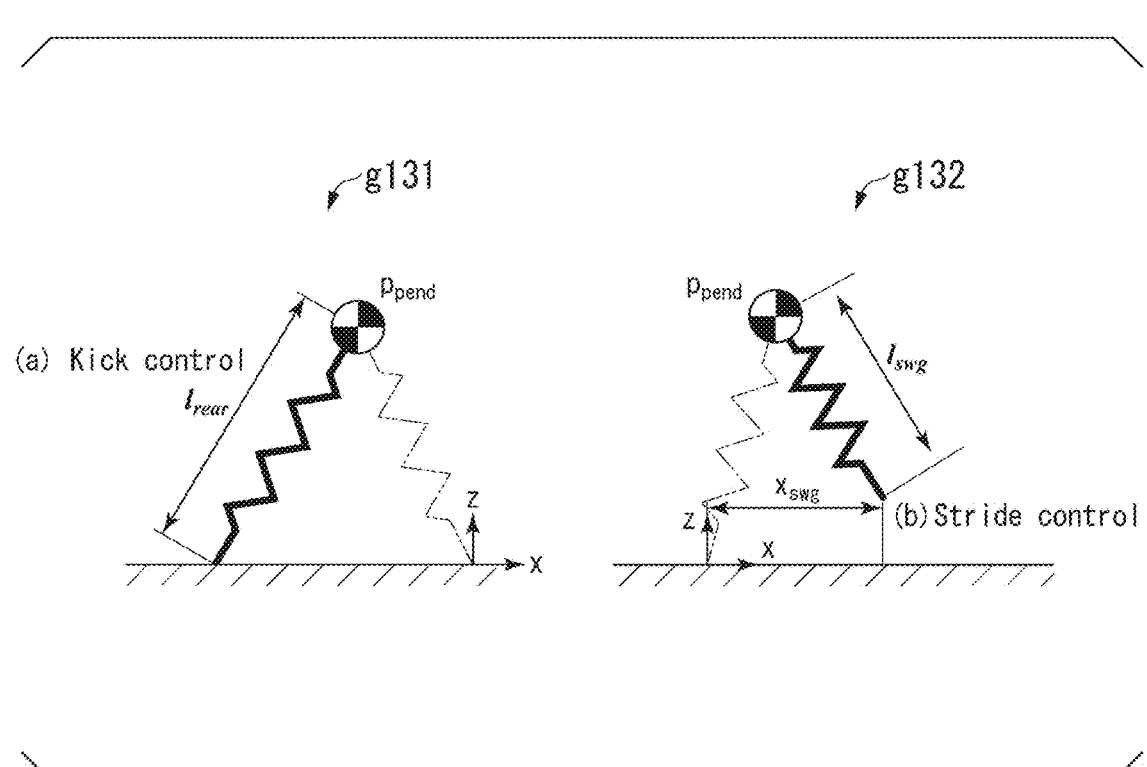
FIG. 26 is a diagram illustrating a walking model.

FIG. 26 is a diagram illustrating a walking model. The drawing indicated by a symbol g131 illustrates a model of kick control in which a rear leg kicks the floor in a double-leg support (DS) period. The drawing indicated by a symbol g132 illustrates a model of stride control of a single-leg swing leg in a single-leg support (SS) phase. Note that, in FIG. 26, a horizontal direction with respect to the floor is set to be an x-axis, and a height direction is set to be a z-axis. In addition, $l_{rear}$ is a rear leg link length, $l_{swag}$ is a swing leg link length, $p_{pend}$ is a center-of-gravity (CoG) position, and $x_{swg}$ is a distance in the x-direction between the rear leg and the swing leg.

Hodgins's control can be decomposed into the following three actions.

(a) Kicking the floor with the rear leg to switch from the DS phase to the SS phase.

(b) Adjusting the stride of the foot to control the horizontal speed in the SS phase.

(c) Adjusting body rotation in the DS and SS phases.

In Hodgins' control, the height of a robot is controlled by a kicking action (a), and a running speed of the robot is controlled by stride adjustment (b). Assuming that walking in the SS phase is similar to that of the IP model, and the height at a peak position is constant, a movement speed in the SS phase (a horizontal speed at the peak position) is uniquely determined only by mechanical energy and a standing leg angle. In this manner, in the Hodgins' control, a walking action is realized by giving a certain target stride in each SS phase, but controlling only a kicking action in the DS phase.

Raibert's control and Hodgins' control, which are conventional methods, take only the dynamics of the center of gravity of a single mass point model into consideration.

However, in an actual robot, mass is distributed to each link, and thus angular momentum is generated in a high-speed motion such as a swing motion. Even when the mass of a legs is sufficiently smaller than the mass of the whole body (for example, totalmass:legmass=10:1), angular momentum according to the swing motion of the leg is not negligible. For this reason, in walking control for expressing the dynamics of the whole body with a single-mass point model, such as in Hodgins's control which is a conventional method, an error larger than expected occurs. Due to this error, in these control methods of the conventional methods, walking in accordance with a target movement speed can be performed. Further, in the control methods which are conventional methods, since a leg motion generating large angular momentum has a nonnegligible error in the dynamics of the whole body, it is difficult to continue targeted walking by control using only the single-mass point model. This problem is caused by a difference between the dynamic system of the model assumed in configuring the control and the actual dynamic system. Actually, there is an effect of angular momentum, and an action of a walking model causes a large error compared to the assumption. In this manner, the conventional method has a problem that the dynamic system of a motion is no longer a conservative system due to the influence of the motion, and control according to conservative energy cannot be performed.

43

44

(Multi-Mass Point Model)

Next, a multi-mass point model will be described.

Figure 27:
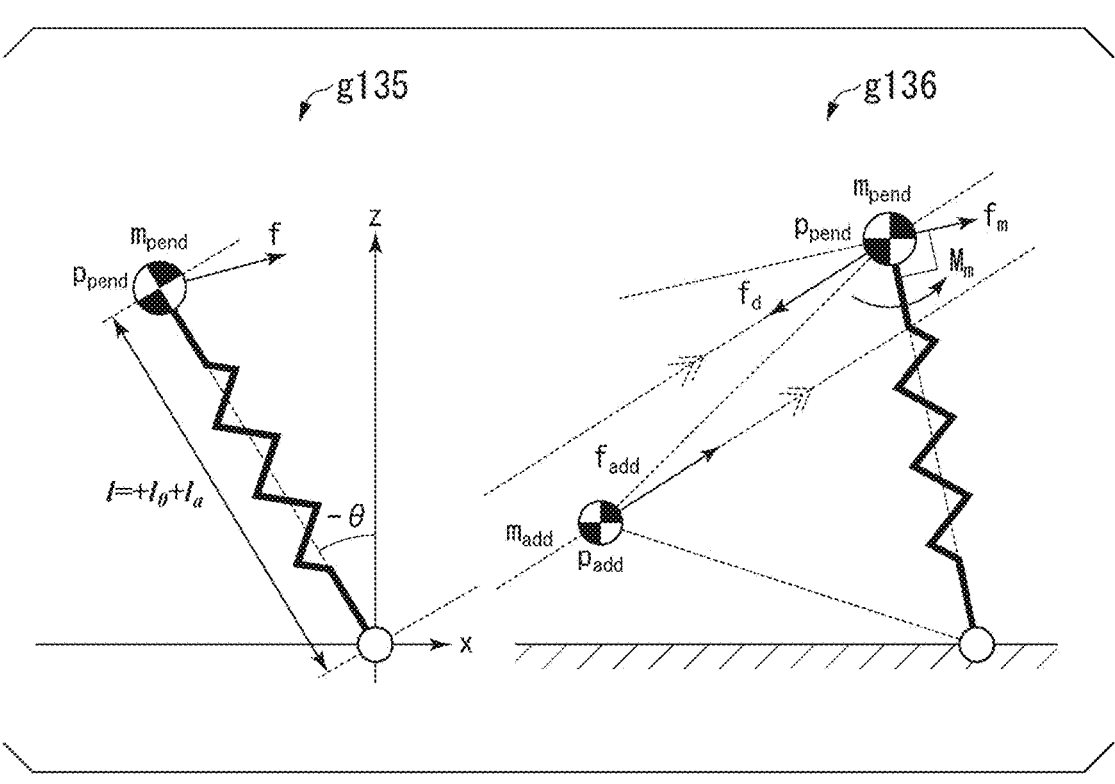
FIG. 27 is a diagram illustrating a single-mass point spring mass model and an additional mass point model.

FIG. 27 is a diagram illustrating a single-mass point spring mass model and an additional mass point model. An image g135 shows a single-mass point spring mass model, and an image g136 shows a weighted point model.

In a symbol g135, the mass of a single-mass point is indicated by m, a position (attention point) is indicated by $p_{pend}(=\{x_{pend}, z_{pend}\}^T)$, and an equation of motion of a model in which an external force is applied to the single-mass point is indicated by $m_{pend}(p_{pend})^{\cdot\cdot}$. In addition, $l=l_0+l_a$. $l_0$ indicates a natural length of a spring, $l_a$ indicates a displacement input of the spring, and f indicates an external force generated in the system. $M_m$ is a moment generated in $p_{pend}$ by $f_{add}$. A force $f_{add}$ is a force applied to the position $p_{add}$ of an added mass point.

When the mass point $m_{add}$ is added as indicated by a symbol g136, an external force generated from the motion becomes a resultant force as expressed by the following Equation (B-3).

[Equation. 114]

$$f = f_d + f_m \tag{B-3}$$

As shown in Equation (B-3), an external force f applied to $m_{pend}$ due to mass point motion of $m_{add}$ is calculated by a resultant force of two forces, that is, $f_d$ applied as a direct force and $f_m$ applied as a moment and then transmitted to $m_{pend}$ via a ground reaction force. The moment $M_m$ for generating $f_m$, and $f_d$ are calculated as expressed by the following Equation (B-4). Note that a superscript represents a second-order differential.

[Equation. 115]

$$f_{add} = \begin{bmatrix} m_{add}\ddot{x}_{add} \\ m_{add}(\ddot{z}_{add} + g) \end{bmatrix}, \tag{B-4}$$

$$M_m = f_{add} \times (p_{pend} - p_{add}),$$

$$f_d = f_{add}$$

In Equation (B-4), the position of a leg mass point $m_{add}$ is $p_{add}=\{fx_{add}, z_{add}\}^T$, and g is gravitational acceleration. With respect to this external force, a time integral multiplied by $(p_{pend})^{\cdot}$ is expanded as expressed by the following Equation (B-5).

[Equation. 116]

$$\int f^T p_{pend} dt = \tag{B-5}$$

$$-\int f_d^T p_{pend} dt + \int f_m^T p_{pend} dt = -\int f_d^T p_{pend} dt + \int M_m \dot{\theta} dt$$

The system is a conservative system when a primitive function that is not a time-dependent function is obtained in the integration of both a term related to a translational force and a moment in Equation (B-5) (an integral of a motion is obtained). In order to obtain an integral of these motions, it is necessary to satisfy both conditions of the following Equation (B-6).

[Equation. 117]

$$f_d = h_{d1}(\ddot{p}_{pend}) + h_{d2}(p_{pend}), \tag{B-6}$$

$$M_m = h_{m1}(\ddot{\theta}) + h_{m2}(\theta)$$

When $(p_{pend})^{\cdot}$ satisfying both an equation of $M_m$ and an equation of fa in Equation (B-4) can be calculated under the condition of Equation (B-6), an integral of a motion is obtained, and the dynamic system becomes a conservative system even when a multi-mass point of two or more mass points is considered. That is, it is a condition under which a conservation law is established in the dynamic system of the equation of motion of the model taking the motion of the multi-mass point into consideration.

Figure 28:
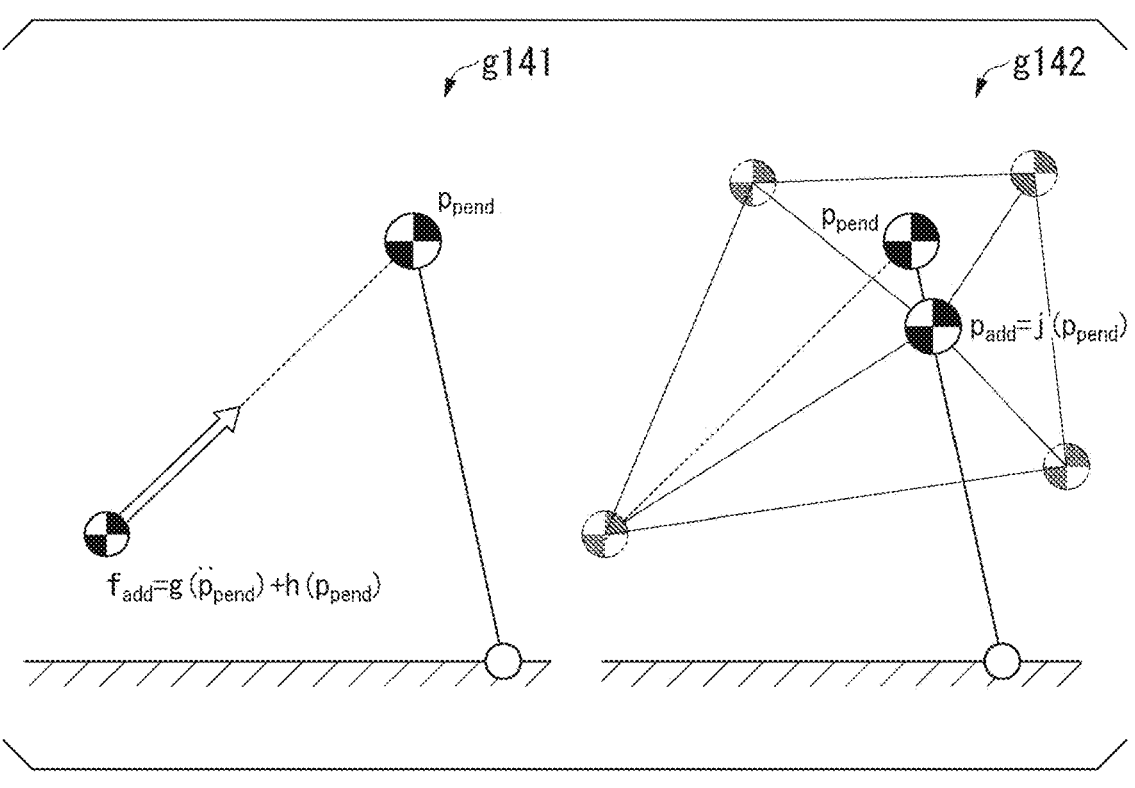
FIG. 28 is a diagram illustrating conditions under which a conservative system is established.

For example, it is a constraint condition as indicated by symbols g141 and g142 in FIG. 28. FIG. 28 is a diagram illustrating conditions under which a conservative system is established. The symbol g141 shows a diagram illustrating a forced constraint that neglects a moment. The symbol g142 shows a diagram illustrating a positional constraint.

In the symbol g141, it is possible to satisfy a conservative system condition by generating a translational force in a direction from $p_{add}$ to $p_{pend}$ so as to eliminate $M_m$ in Equation (B-6), which is a moment component, and setting the translational force to be a function of $p_{pend}$ and $(p_{pend})^{\cdot}$.

In addition, as indicated by the symbol g142, it is also possible to eliminate the influence of the moment and satisfy the above-described conservative system condition by placing the center-of-gravity position of a mass point other than $p_{pend}$ on the support leg axis and giving a constraint trajectory dependent on that $p_{pend}$ to the coordinates (however, it is necessary to prevent a moment from being generated in the $p_{add}$ itself due to a motion of a plurality of mass point).

Although it is possible to easily consider a condition for a conservative system, a trajectory in which a constraint condition is applied to a generated force or the position of a mass point is fixed is required in many cases, which leads to an extremely severe constraint condition. In particular, in a swing action of walking, it is necessary to bring the leg to a specific position with an arbitrary body posture and a specific support leg posture (when the foot touches down), and it is necessary to give a constraint based on a position instead of a constraint based on a force and to consider a condition for a conservative system.

Figure 29:
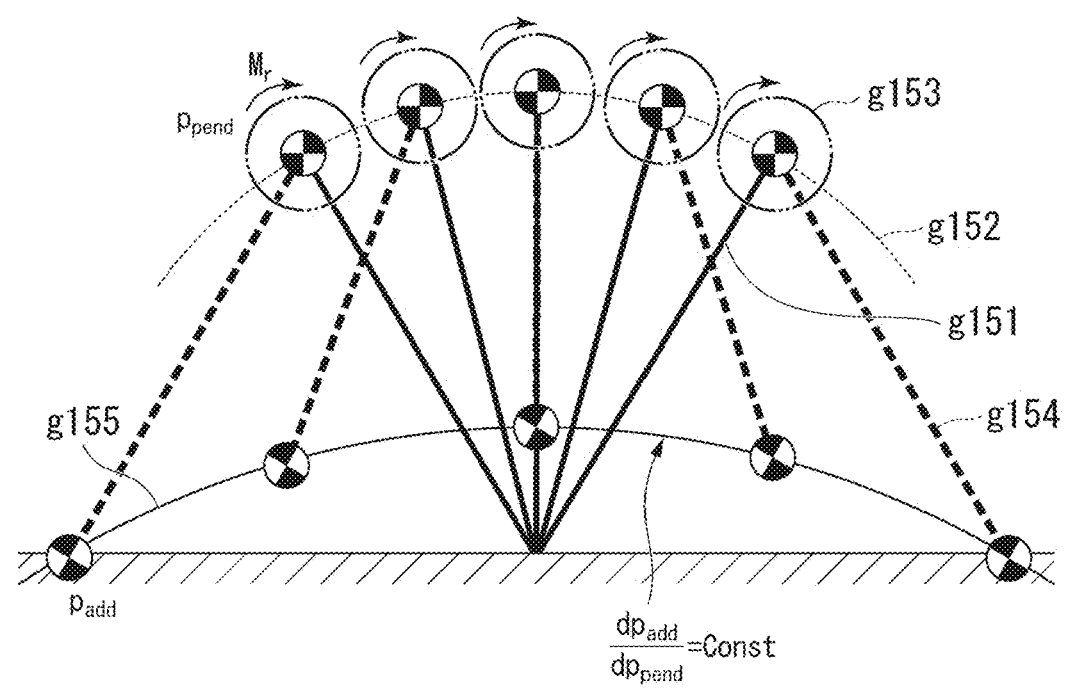
FIG. 29 is a diagram illustrating an example of constraints on a trajectory.

FIG. 29 is a diagram illustrating an example of a trajectory constraint. As illustrated in FIG. 29, a multi-mass point model obtained by adding an additional mass related to a swing leg motion to a single-mass point model based on SLIP is used. Note that, in the following description, the center of gravity (CoM) of a single-mass point model is indicated by $p_{pend}$. In addition, the center of gravity of the additional mass point with respect to the swing leg action is set to be $p_{add}$. The entire system can be a conservative system by giving a constraint trajectory such that $p_{add}$ is a linear function of $p_{pend}$. For example, the additional mass point may be the center-of-gravity position when a swing leg structure is added to the system.

(Integrable Condition Based on Leg Constraint Position Trajectory)

For energy-based walking control, it is only required to give $p_{swg}$ a constraint condition that can be expressed as in Equation (B-6). A swing leg trajectory position constraint as expressed by the following Equation (B-7) is given such that a swing leg trajectory can be adjusted arbitrarily to some extent. Note that, in the following Equation (B-7), $R_\gamma$ is a rotation matrix represented by cos and sin. That is, $R_\gamma$ indicates an affine transformation. In addition, "c" having a subscript attached thereto is a parameter. In addition, $b_{add}$ is an offset.

[Equation. 118]

$$p_{add} = c_{add}R_\gamma p_{pend} + b_{add} = \begin{bmatrix} c_x & 0 \\ 0 & c_z \end{bmatrix}\begin{bmatrix} \cos\gamma & \sin\gamma \\ -\sin\gamma & \cos\gamma \end{bmatrix}p_{pend} + \begin{bmatrix} b_x \\ b_z \end{bmatrix} \quad \text{(B-7)}$$

Thereby, $(p_{add})\ddot{}$ is represented by the following Equation (B-8), and most terms can be integrated.

[Equation. 119]

$$\ddot{p}_{add} = c_{add}R_\gamma \ddot{p}_{pend} = \begin{bmatrix} c_x\cos\gamma\ddot{x}_{pend} + c_x\sin\gamma\ddot{z}_{pend} \\ -c_x\sin\gamma\ddot{x}_{pend} + c_x\cos\gamma\ddot{z}_{pend} \end{bmatrix} \quad \text{(B-8)}$$

Here, it is assumed that a motion of $p_{pend}$ in the support leg is similar to that of an inverted pendulum, and the following first assumption is made.
First Assumption; a Leg Length is Constant During Single Leg Support
At this time, an integral $E_{all}$ of all motions is expressed as the following Equations (B-9) to (B-12).

[Equation. 120]

$$E_{all} = E_{kinetic} + E_{potential} + E_{mod} \quad \text{(B-9)}$$

[Equation. 121]

$$E_{kinetic} = +\frac{1}{2}m_{pend}\dot{p}_{pend} \cdot \dot{p}_{pend} \quad \text{(B-10)}$$

[Equation. 122]

$$E_{potential} = +\frac{1}{2}\frac{k^2 p_{pend} \cdot p_{pend}}{k_0} + \quad \text{(B-11)}$$

$$m_{pend}gz_{pend} - m_{add}gb_x\theta - m_{add}gc_x(x_{pend}\sin\gamma - z_{pend}\cos\gamma)$$

[Equation. 123]

$$E_{mod} = -\int (m_{add}p_{add} \times \ddot{p}_{pend}) \cdot (p_{add} \times \dot{p}_{pend})dt = \int m_{add}M_{add} \cdot \dot{\theta}dt \quad \text{(B-12)}$$

Based on the above-described derivation, a condition for the motion of the entire system to be a conservative system is derived in consideration of an appropriate constraint trajectory for each mass. In particular, the following second assumption is made for a swing leg trajectory.

Second assumption; when it is assumed that a support leg angle θ is sufficiently small during walking, cos θ≈1. Based on this assumption, $E_{mod}$ can be approximated as the following Equation (B-13).

[Equation. 124]

$$E_{mod} \simeq \frac{1}{2}c_x m_l\left(c_z + \frac{b_z}{l}\right)(\dot{p}_{pend} \times p_{pend}) \cdot (\dot{p}_{pend} \times p_{pend}) \quad \text{(B-13)}$$

In this manner, from Equations (B-10), (B-11), and (B-13), a motion given the constraint condition of Equation (B-7) is approximately a conservative system, and the motion is preliminarily specified, and a single-leg support motion including a swing leg motion can be uniquely determined by a preliminary energy operation.

Figure 30:
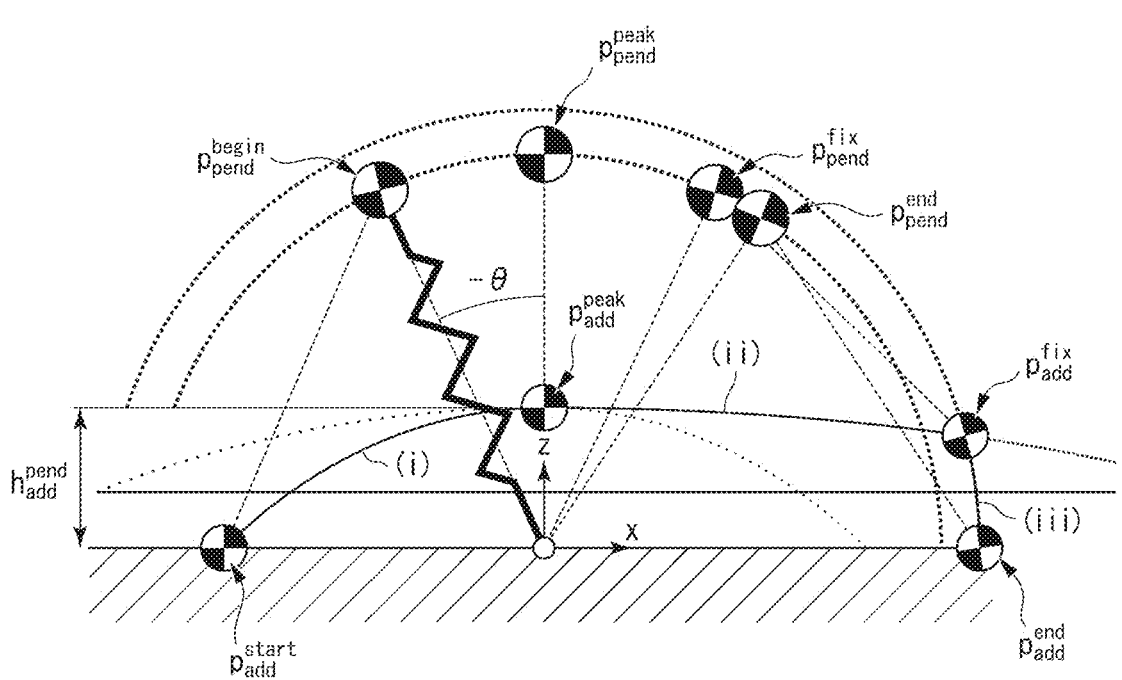
FIG. 30 is a diagram illustrating three phases of a motion in a swing leg.

In the actual robot, a swing leg trajectory in which an interval between a stride or a foot and the ground is changed is often performed in an SS phase during walking. For this reason, as illustrated in FIG. 30, a constrained swing leg trajectory that is decomposed into three swing leg phases is implemented. FIG. 30 is a diagram illustrating three phases of a motion in a swing leg. This decomposition allows a clearance with respect to the ground (or floor) and a stride to be adjusted.

In a phase (i), a trajectory of the swing leg is calculated from a target maximum height of a mass point position of the swing leg.

In phases (ii) and (iii), two parameters, that is, a final clearance $(h_{cle})^{pend}$ and a stride length $(l_{stride})^{end}$ are introduced.

Note that a length between the pendulum mass point position and the swing leg mass point position is maximum when the z-axis position of the swing leg mass point position reaches the final clearance $(h_{cle})^{pend}$. In addition, the maximum length is the same as the support leg length in the SS phase.

These trajectories are determined by the parameters $b_{add}$ and $c_{add}$.

The parameters $b_{add}$ and $c_{add}$ in each phase are derived by obtaining pendulum mass point and swing leg mass point positions $X=\{p_{pend}, p_{add}\}$ at the start and end of each swing leg phase and solving a simultaneous equation using Equation (B-17). In addition, as illustrated in FIG. 26, start and end positions of swinging phases (i), (ii), and (iii) are set to be $X^{start}$, $X^{peak}$, $X^{end}$ and $X^{atk}$.

First, each position at the end of the SS and DS phases, which is the beginning of the phase (i), is set to be $X^{start}$, and each position of the peak position (θ=0) is set to be $X^{peak}$. A z component of $(p_{pend})^{peak}$ is a target height at the peak position and is the same as the leg length in the SS phase. A z component of $(p_{peak})^{add}$ is a maximum leg clearance, and this value is arbitrarily set as a target parameter.

(Factors of Failure in Walking)

Next, an example of results of analyzing factors that cause the robot B1 to fail in walking will be described.

Figure 31:
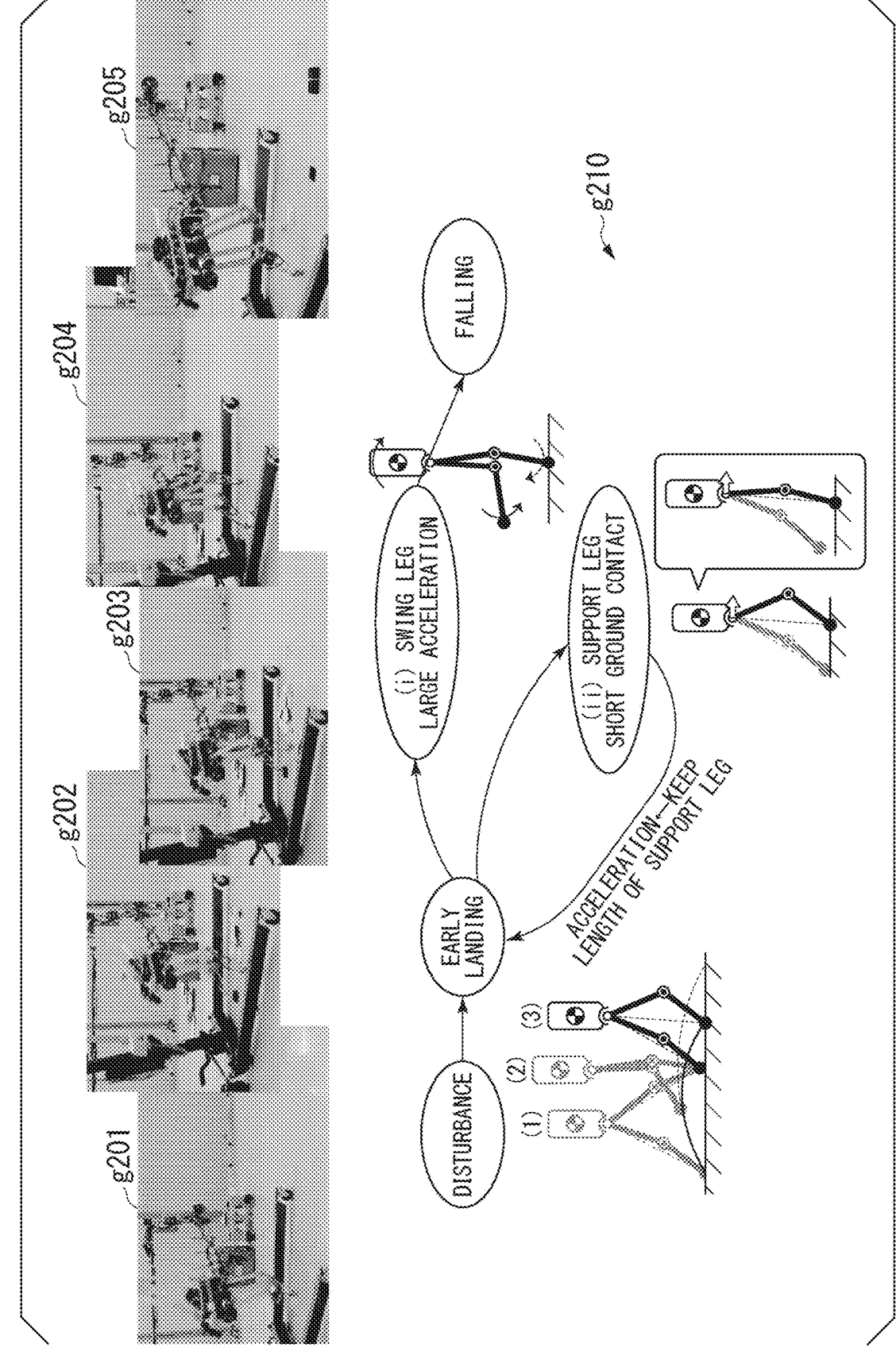
FIG. 31 is a diagram illustrating an example of results of analyzing factors of a failure in a robot's walking.

FIG. 31 is a diagram illustrating an example of results of analyzing factors that cause the robot to fail in walking.

Images g201 to g205 show the state of the robot B1 walking when there is an obstacle on the floor, or when the robot B1 is pushed from behind.

An image g210 shows results of analyzing factors of a failure in walking.

As a result of the analysis, it can be understood that one of factors of a failure when a disturbance is applied to the robot B1 during walking is early landing in which the leg comes into contact with the ground earlier than when there is no disturbance. Further, as a result of the analysis, it can be understood that there are two problems, as indicated by the symbol g210, even when this early landing is a factor.

(i) Problem in swing leg; large acceleration occurs.

(ii) Problem in support leg; The support leg comes into contact with the ground for a shorter period of time than when there is no disturbance.

In the second embodiment, the swing leg trajectory is corrected in order to solve the problem in the swing leg, in other words, to suppress the occurrence of early landing due to excessive acceleration applied due to a disturbances or the like.

(Swing Leg Correction)

Figure 32:
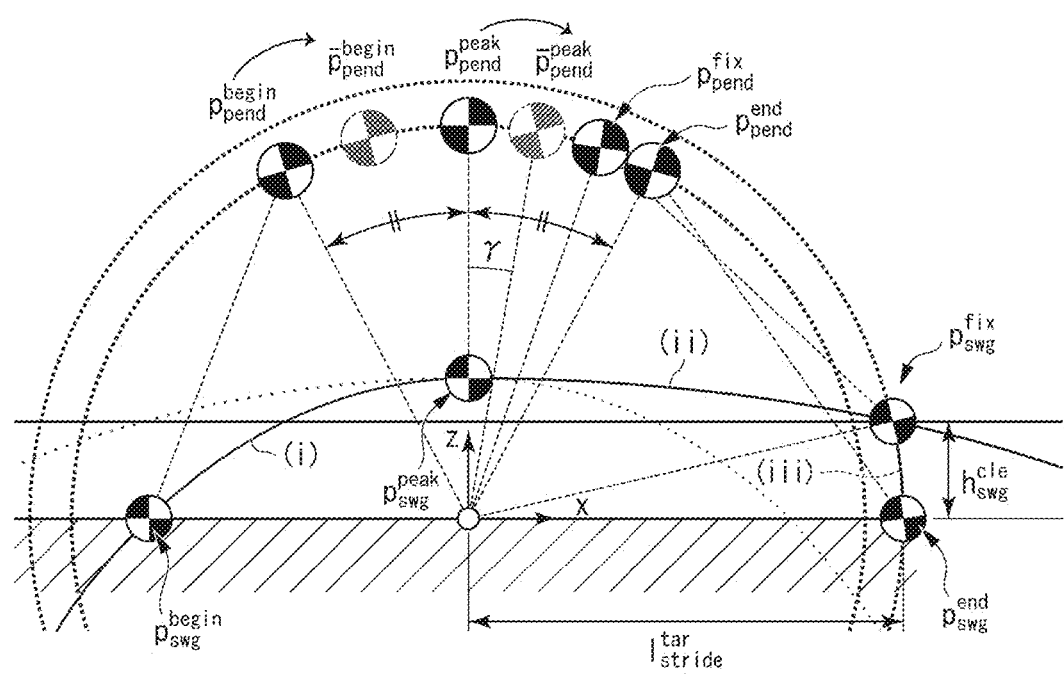
FIG. 32 is a diagram illustrating trajectories of an inverted pendulum and a swing leg mass point obtained by swing leg control.

FIG. 32 is a diagram illustrating trajectories of inverted pendulum and swing leg mass points obtained by swing leg control. During a swing leg phase, the trajectory of the inverted pendulum is defined by four points: $(p_{pend})^{peak}$ when standing upright, $(p_{pend})^{fix}$ which is an end point of swing of the swing leg, and $(p_{pend})^{end}$ which is the termination of the swing leg phase, and ideally, it is assumed that a trajectory that is substantially symmetrical around the time of standing upright is passed through. When the inverted pendulum transitions from $(p_{pend})^{begin}$ to $(p_{pend})^{end}$, the swing leg mass point also moves to a translational position of the inverted pendulum.

Figure 33:
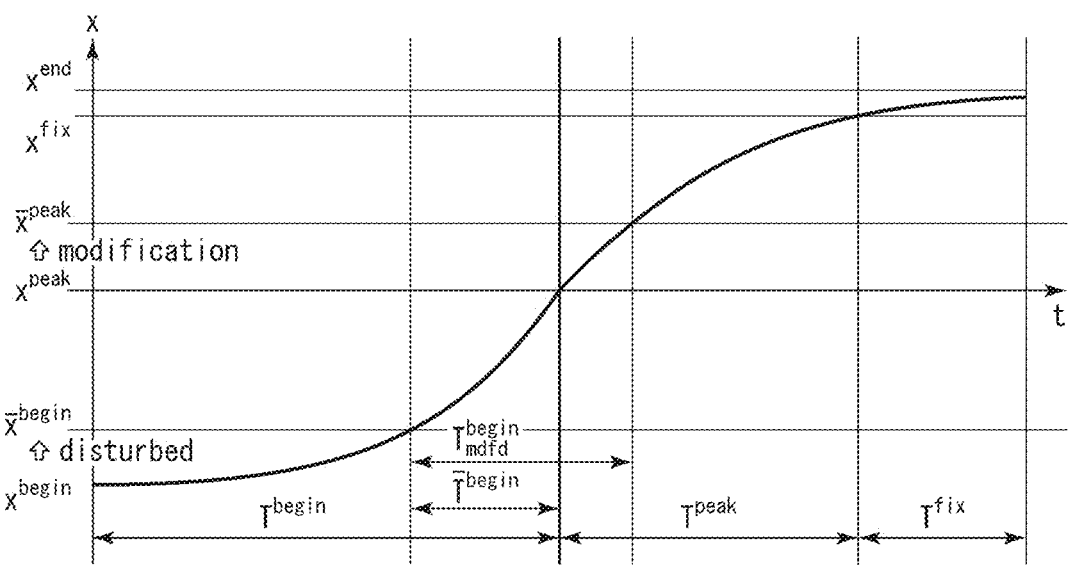
FIG. 33 is a diagram illustrating position trajectories of swing leg mass points that change in time series.

FIG. 33 is a diagram illustrating position trajectories of swing leg mass points that change in time series. Here, a case where $(p_{pend})^{begin}$ becomes $(p_{pend})^{-begin}$ due to a disturbance such as a ground contact surface of the swing leg which is not flat or a deviation of the center-of-gravity position of the swing leg due to a change in leg length is considered. As illustrated in FIG. 33, at this time, a time T-begin for moving from $(P_{pend})^{-begin}$ to $(P_{pend})^{peak}$ becomes shorter than $T^{begin}$ which is assumed. However, since a movement distance of the swing leg is fixed, a required speed increases, and a control error of the swing leg trajectory becomes large. As a result, an event in which the swing leg cannot be installed at a target point and falls over may occur. Alternatively, an event in which the support leg slips and falls over due to excessive acceleration of the swing leg may occur.

In order to deal with such a problem, as illustrated in FIG. 32, $(p_{pend})^{peak}$ defined as an upright state is changed to an angle inclined by a phase difference $\gamma$ from the upright state. As illustrated in FIG. 33, this operation allows $T_{-begin}$ to be extended to $(T_{mdfd})^{begin}$, making it possible to secure a movement time of the swing leg.

A swing leg constraint that satisfies a conservative system including a phase difference is represented by the above-mentioned Equation (B-7). Here, a method of obtaining the phase difference $\gamma$ according to the inverted pendulum position $(P_{pend})^{begin}$ at the start of the swing leg is described.

Figure 34:
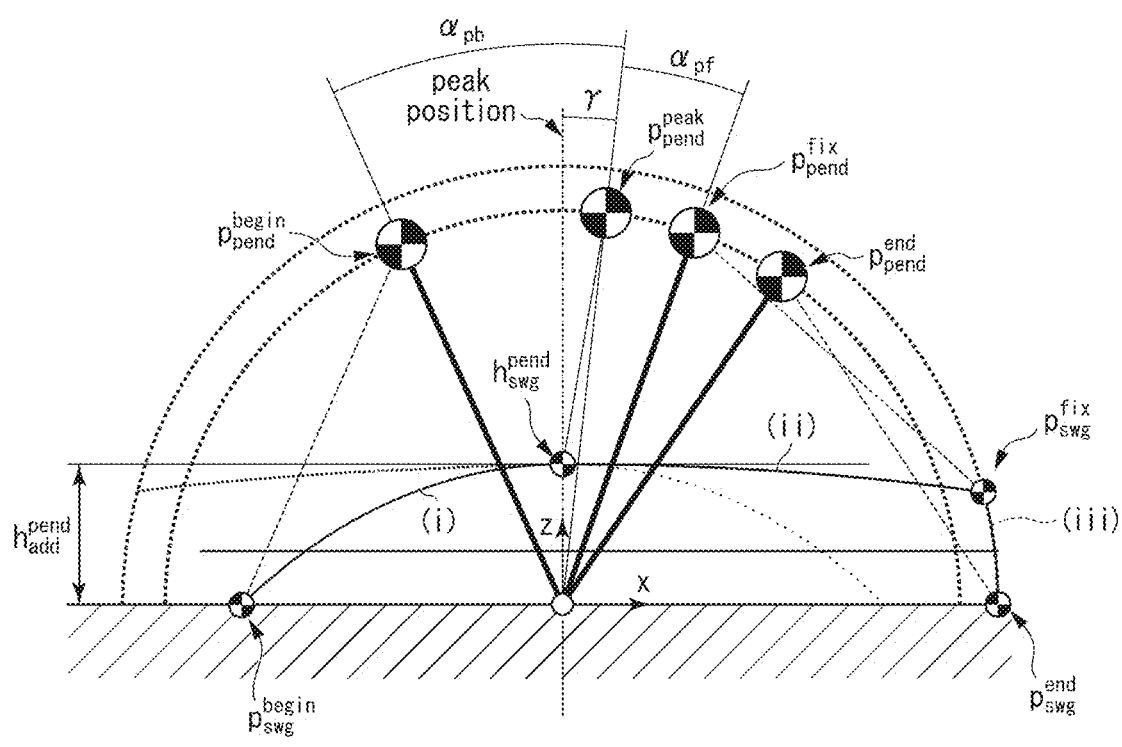
FIG. 34 is a diagram illustrating how to obtain a phase difference γ for correcting a swing leg.

FIG. 34 is a diagram illustrating how to obtain a phase difference $\gamma$ for correcting the swing leg. As illustrated in FIG. 34, $\gamma$ represents an angle from the vertical direction of an inverted pendulum position when a swing leg translational position $x_{swg}=0$, that is, when $(p_{swg})^{peak}$ is a peak position. When $\alpha_{gb}$, $\alpha_{fe}$, and $\alpha_{eg}$ are determined as illustrated in FIG. 34, an angle $\alpha_{bp}+\alpha_{pf}$ formed by $(P_{pend})^{begin}$ and $(P_{pend})^{fix}$ is determined as expressed by Equation (B-14).

[Equation. 125]

$$\alpha_{bp} + \alpha_{pf} = \pi - \alpha_{gb} - \alpha_{fe} - \alpha_{eg} \qquad (B-14)$$

Here, $\alpha_{gb}$ is a support leg angle when the swing leg is separated from the floor, and $\alpha_{fe}$ and $\alpha_{eg}$ are set in accordance with a target value of a swing leg motion.

$\alpha_{fe}$ may be determined in accordance with a target stride, and specifically, may be an angle formed by the center-of-gravity position of an additional mass point at the end of swinging of the swing leg ($(P_{pend})^{fix}$ which is an end point of swinging of the swing leg) and the center-of-gravity position of an additional mass point when the swing leg comes into contact with a walking plane (the termination of the swing leg phase $(P_{pend})^{end}$).

$\alpha_{eg}$ may be determined in accordance with a final clearance $(h_{cle})^{pend}$, and specifically, may be an angle formed by the center-of-gravity position of the additional mass point when the swing leg comes into contact with the walking plane (the termination of the swing leg phase $(P_{pend})^{end}$) and the walking plane.

Here, when $\eta_{swing}=\alpha_{bp}/\alpha_{pf}$, $\gamma$ is determined as expressed by Equation (B-15).

[Equation. 126]

$$\gamma = \frac{\pi}{2} - \frac{\pi - \alpha_{gb} - \alpha_{fe} - \alpha_{eg}}{\eta_{swing} + 1} - \alpha_{fe} - \alpha_{eg} \qquad (B-15)$$

As shown in Equation (B-15), a deviation of the swing leg trajectory described above can be adjusted in accordance with a ratio $\eta_{swing}=\alpha_{bp}/\alpha_{pf}$.

(Processing Procedure)

Figure 35:
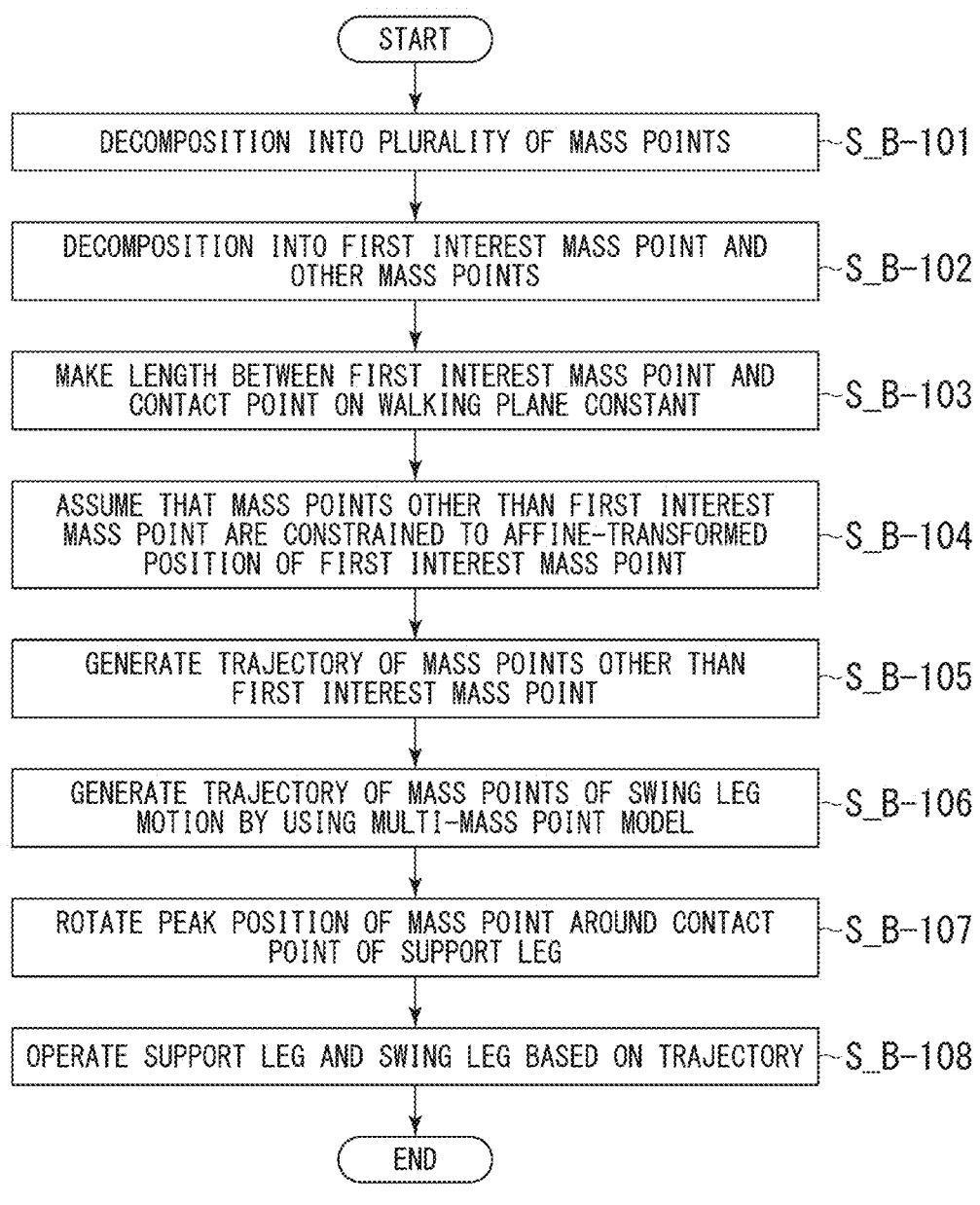
FIG. 35 is a flowchart showing a processing procedure of a walking control method.

Next, an example of a processing procedure of the walking control method performed by the walking control device B10 will be described. FIG. 35 is a diagram, that is, a flowchart for describing an example of a processing procedure of the walking control method performed by the walking control device according to the second embodiment.

(Step S_B-101) First, a user such as a designer or a developer decomposes a mobile device having a plurality of legs (typically, a bipedal walking robot) into a plurality of mass points.

(Step S_B-102) Next, the user decomposes the plurality of decomposed mass points into a first interest mass point (pendulum mass) and mass points other than the first interest mass point (second interest mass point, . . . ). The second interest mass point is, for example, Hip mass, Impend mass, or swing-leg mass. The first interest mass point is an example of a "first mass point", and mass points other than the first interest mass point (second interest mass point, . . . ) are examples of a "second mass point".

(Step S_B-103) Next, the user assumes that the length of a straight line connecting the first interest mass point (for example, the support leg) and a contact point between the support leg and the walking plane is constant. Hereinafter, a condition that the length of the straight line connecting the first interest mass point and the contact point on the walking plane is constant will also be referred to as a "first condition".

(Step S_B-104) Next, the user assumes that the mass points other than the first interest mass point are constrained to an affine-transformed (Equation (B-7)) position of the first interest mass point with respect to the swing-leg mass.

(Step S_B-105) When the first interest mass point is moved, the walking control device B10 generates a trajectory of the mass points other than the first interest mass point in accordance with a constraint condition that the mass points other than the first interest mass point are constrained to the affine-transformed (Equation (B-7)) position of the first interest mass point (hereinafter also referred to as a "second condition"). The trajectory of the mass points other than the first interest mass point are an example of a "constraint trajectory of the second mass point" or a "first constraint trajectory".

(Step S_B-106) The walking control device B10 gives a constraint trajectory in which the center of gravity ($p_{add}$) of the additional mass point is an affine-transformed center-of-gravity position of the additional mass point by using a multi-mass point model obtained by adding the additional mass point related to the swing leg motion to a single-mass point model. The additional mass point is an example of a "N+1-th mass point."

In other words, the walking control device B10 generates a trajectory of the center of gravity ($p_{add}$) of the additional mass point in accordance with a constraint condition that the center of gravity of the additional mass point ($p_{add}$) is constrained to the affine-transformed center-of-gravity position of the additional mass point ($p_{pend}$) (hereinafter also referred to as a "third condition") by using the multi-mass point model including the additional mass point related to the swing leg motion. Thereby, the entire system is set to be a conservative system. The trajectory of the center of gravity of the additional mass point ($p_{add}$) is an example of a "constraint trajectory of the center of gravity of an additional mass point" or an "N-th constraint trajectory."

(Step S_B-107) The walking control device B10 rotates the center of gravity of an additional mass point ($p_{add}$) that is farthest from the walking plane on the trajectory of the center of gravity of the additional mass point ($p_{add}$), that is, ($p_{swg}$)peak, around a contact point on the walking plane.

For example, the walking control device B10 changes $(p_{pend})^{peak}$ defined as an upright state to an angle inclined by a phase difference $\gamma$ from the upright state, and rotates $(p_{swg})^{peak}$ around the contact point on the walking plane. In other words, the walking control device B10 performs an offset rotation by $\gamma$ with respect to the constraint trajectory at the moment when the rear leg is separated (this leg becomes the next swing leg). Thereafter, the walking control device B10 corrects the other parameters (C and B) so that the current position of the swing leg and the position of the constraint trajectory described above do not deviate, and sets them to be new constraint trajectories.

(Step S_B-108) The walking control device B10 operates the support leg and the swing leg based on the trajectory of each mass point to control walking by the walking control device B10.

As described above, in the second embodiment, the walking control of the robot B1 is performed using a conservative system model using virtual mass points.

According to the second embodiment described above, the swing leg trajectory is corrected so as to be able to realize a gentle swing leg trajectory according to a situation while a motion in the support leg satisfies the conservative system, and thus it is possible to realize the walking control method with a small amount of calculation and capable of continuing walking robustly.

Note that the mobile device described above is not limited to the robot B1, and may be, for example, other movable devices having at least two legs.

Hereinafter, other examples of expressions according to the above-described second embodiment will be described as appendices.

Appendix 1

A walking control method using a computer that controls walking of a mobile device having a plurality of legs, the walking control method including:

generating a first constraint trajectory which is a trajectory of second mass points based on a second condition when a first mass point is moved in accordance with walking of the mobile device under both a first condition and the second condition, the first condition being a condition that a length of a straight line connecting the first mass point, which is one mass point to be noted among a plurality of mass points set for the mobile device, and a contact point between a support leg, which is a leg coming into contact with a plane on which the mobile device walks among the plurality of legs, and the plane is constant, and the second condition being a condition that the second mass points, which are the remaining mass points excluding the first mass point among the plurality of mass points set for the mobile device, are constrained to a trajectory of an affine-transformed position of the first mass point;

generating an N-th constraint trajectory, which is a trajectory of the center of gravity of an N+1-th mass point based on a third condition by using a multi-mass point model obtained by adding the N+1-th mass point related to a motion of a swing leg, which is a leg that does not come into contact with the plane among the plurality of legs, to a single-mass point model, the third condition being a condition that the center of gravity of the N+1-th mass point is constrained to the trajectory of the affine-transformed position of the first mass point, where the N is a natural number of 2 or more;

rotating the constraint trajectories around the contact point in the first constraint trajectory or the N-th constraint trajectory; and setting the first restraint trajectory to be a new first restraint trajectory when the first restraint trajectory is rotated, and setting the N-th constraint trajectory to be a new N-th constraint trajectory when the N-th constraint trajectory is rotated.

Appendix 2

In the walking control method according to appendix 1, with respect to an N+1-th constraint trajectory, the center of gravity of the N+1-th mass point may be rotated at a predetermined angle around the contact point in accordance with to the position of the support leg when the swing leg starts swinging.

Appendix 3

In the walking control method according to appendix 2, when the predetermined angle is $\gamma$, $\gamma$ may be expressed by Equation (B-15).

Here, $\alpha_{gb}$ is an angle formed by the support leg and the plane when the swing leg is separated from the plane, $\alpha_{fe}$ is an angle formed by a center-of-gravity position of a fourth mass point at the end of swinging of the swing leg and the center-of-gravity position of the N+1-th mass point when the swing leg comes into contact with the plane, $\alpha_{eg}$ is an angle formed by the plane and the center-of-gravity position of the N+1-th mass point when the swing leg comes into contact with the plane, $\eta_{swing}$ is $\alpha_{bp}/\alpha_{pf}$, $\alpha_{bp}$ is an angle formed by $(p_{pend})^{begin}$ and $(p_{pend})^{peak}$, $(P_{pend})^{begin}$ is the position of the first mass point at a point in time when the swing leg motion is started, with the contact point on the plane as the origin, $(P_{pend})^{peak}$ is the position of the first mass point when the first mass point arrives directly above the origin, with the contact point on the plane as the origin, and $\alpha_{pf}$ is an angle formed by $(P_{pend})^{peak}$ and the center-of-gravity position of the N+1-th mass point at the end of swinging of the swing leg.

Third Embodiment (Configuration Example of Robot)

Figure 36:
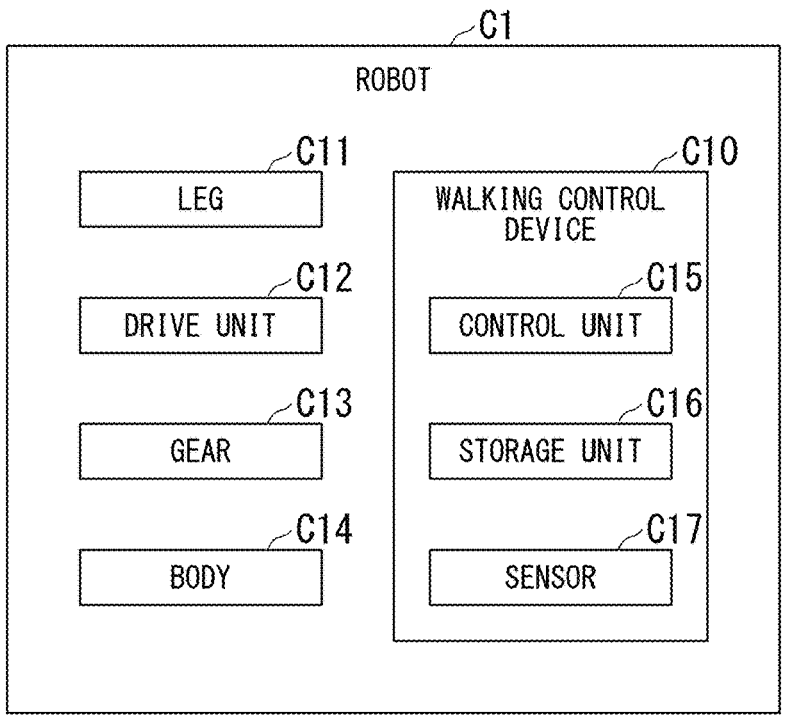
FIG. 36 is a diagram illustrating a configuration example of a robot according to a third embodiment.

FIG. 36 is a diagram illustrating a configuration example of the robot according to the third embodiment. Note that the configuration illustrated in FIG. 36 is an example and is not limited thereto.

As illustrated in FIG. 36, a robot C1 (walking device) includes, for example, a leg C11, a drive unit C12, a gear C13, a body C14, and a walking control device C10.

The walking control device C10 includes, for example, a control unit C15, a storage unit C16, and a sensor C17.

Note that the robot C1 may include an arm, a hand, a head, and the like. Note that at least two legs C11 are connected to the body C14. In addition, the control unit C15 and the storage unit C16 may be provided in an external device such as a robot control device.

The storage unit C16 stores parameters, equations, models, programs, and the like that are required for control. The storage unit C16 stores the weight of the robot C1, the length of the leg C11, and the like.

The sensor C17 is an inertial measuring unit that detects inertial momentum by using, for example, a force sensor or a torque sensor, a three-axis gyro sensor for knowing changes in rotation and direction, and a three-axis acceleration sensor for knowing changes in speed in an axial direction.

The control unit C15 performs control only by kicking by using conditions for becoming a conservative system in consideration of dynamics at the time of adding a mass point to a single-mass point model derived as described above, giving a swing leg constraint trajectory under the conditions, and using the entire system as the conservative system. Note that the walking control may be performed by controlling a motor provided in the drive unit C12 or may be performed by controlling a mechanical system.

Figure 37:
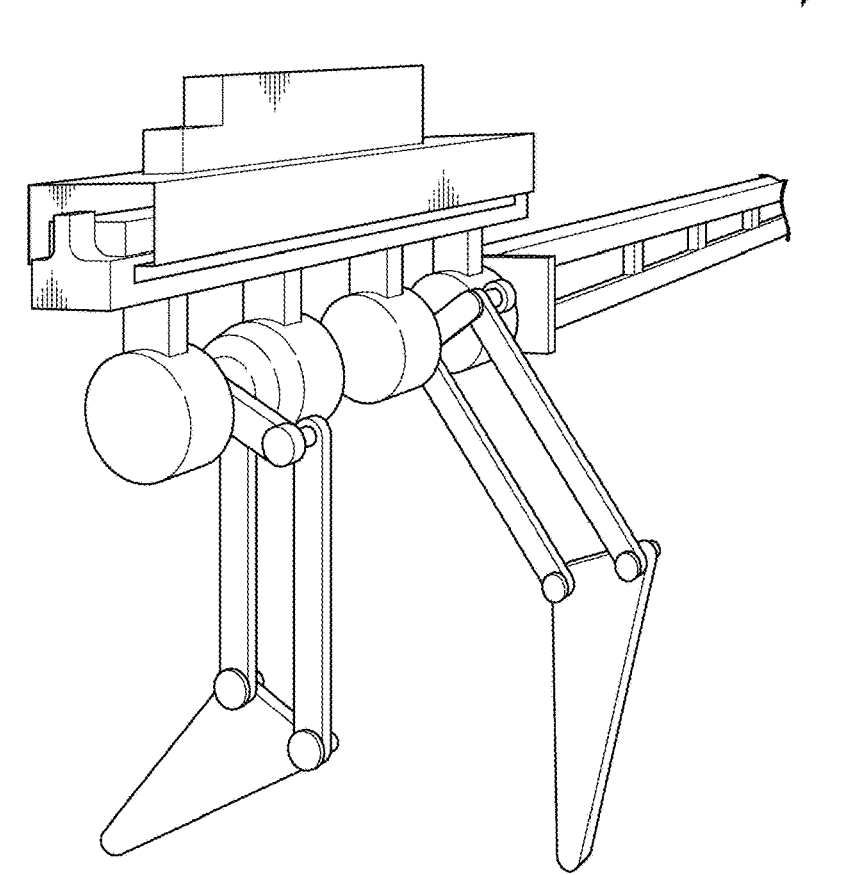
FIG. 37 is a diagram illustrating an appearance example of a robot.

FIG. 37 is a diagram illustrating an appearance example of the robot. As illustrated in FIG. 37, the robot C1 includes two legs C11 and the body C14. The legs C11 are driven by the drive unit C12. The drive unit C12 is controlled by the walking control device C10. The sensor C17 is attached to the leg C11. As illustrated in FIG. 37, the robot C1 constrains four degrees of freedom on a two-dimensional plane. Note that the appearance example illustrated in FIG. 37 is an example and is not limited thereto.

(Definition of Names and the Like)

Next, names and the like used in the third embodiment will be defined.

Figure 38:
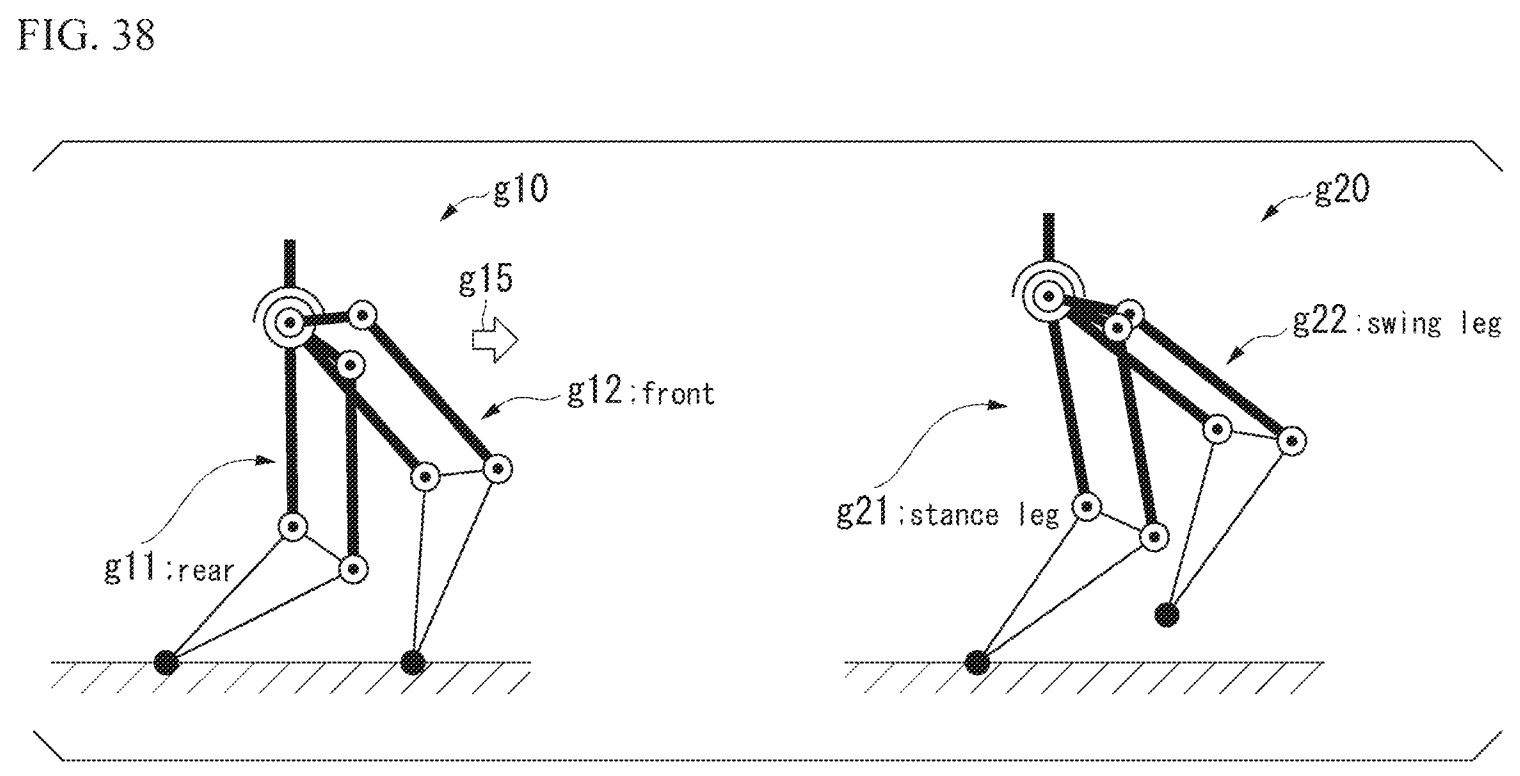

FIG. 38 is a diagram illustrating a definition related to the leg.

An image indicated by a symbol g10 shows the state of a double-leg support phase, an arrow g15 indicates the direction of movement, a symbol g11 indicates a rear leg (rear), and a symbol g12 indicates a front leg (front).

An image indicated by a symbol g20 shows the state of a single-leg support phase, a symbol g21 indicates a support leg (sup), and a symbol g22 indicates a swing leg (swing).

Figure 39:
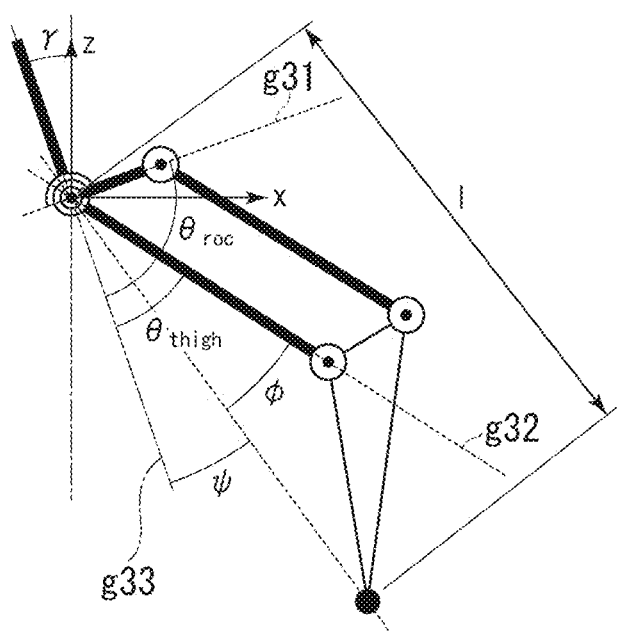
FIG. 39 is a diagram illustrating definition of coordinates, angles, and the like in a robot.

FIG. 39 is a diagram illustrating definitions of coordinates, angles, and the like in the robot.

The z-axis direction is perpendicular to a moving surface (ground, floor, or the like). The x-axis direction is parallel to the moving surface. 1 is the length of the leg. $\gamma$ is an angle between the z-axis direction and the center of gravity of the robot C1 or an inclination of the body of the robot C1. $\psi$ is an angle of the toe (leg angle) from a vertical direction g33 from the body. $\varphi$ is an angle (leg length angle) related to a leg length from the hip joint of the leg to the toe. A symbol g31 indicates the direction of a shorter link which is connected to the body C14 among links that constitute the leg C11. A symbol g32 indicates the direction of a longer link which is connected to the body C14 among the links that constitute the leg C11. $\theta_{roc}$ is a relative angle of the shorter link connected to the body C14 among the links that constitute the thigh of the leg C11 with reference to the direction indicated by the symbol g33. $\theta_{thigh}$ is a relative angle of the longer link connected to the body C14 among the links that constitute the thigh of the leg C11 with reference to the direction indicated by the symbol g33.

(Task Space Coordinate System of Robot)

Figure 40:
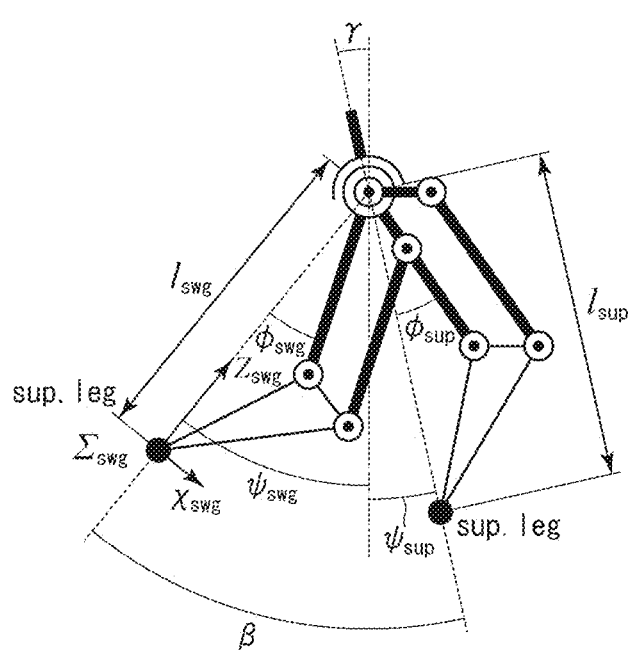
FIG. 40 is a diagram illustrating a task space coordinate system of a robot, and a diagram of a planar bipedal walking model showing variables used for Hodgins's control which is a conventional method.

A task space coordinate system of the robot C1 will be further described using FIG. 40.

FIG. 40 is a diagram illustrating a task space coordinate system of the robot. A joint space is defined by a relative angle $\theta M=\{\theta_{left,in}, \theta_{left,out}, \theta_{right,in}, \theta_{right,out}\}^T$ of four links extending from the hip joint. Note that T indicates transposition, left indicates a left side, and right indicates a right side. In addition, here, in and out of each drive unit C12 correspond to a rocker and a thigh link of a parallel link forming the thigh, respectively. A task space $x=\{(x_{swg})^T, (x_{sup})^T\}$ or $\{(x_{fore})^T, (x_{back})^T\}$ representing the foot tip position is defined by the following Equation (C-1).

[Equation. 127]

$$X_i = \{l_i, \psi_i\}^T \tag{C-1}$$

where $$\phi_i = \frac{1}{2}(\theta_{j,in} - \theta_{j,out}),$$

$$l_i = 2l_{link}\cos\phi_i,$$

$$\psi_i = \frac{1}{2}(\theta_{j,in} + \theta_{j,out})$$

In Equation (C-1), a subscript "j" indicates the right and left of the corresponding leg, and a subscript "i" indicates a functional classification of the leg. In a single-leg support phase, $i\in\{swg, sup\}$ indicates a swing leg and a support leg, and in a double-leg support phase, $i\in\{fore, back\}$ indicates a front leg and a rear leg. $\varphi_i$ and $\psi_i$ indicate an angle related to the leg length from the hip joint to the foot tip of the leg, and an angle from the vertical direction, which are referred to as a leg length angle and a leg angle, respectively. In addition, $l_{link}$ indicates the length of a thigh link. A coordinate system in which a unit vector directed from the foot tip to the hip joint is set as a z-axis is referred to as a leg coordinate system $\Sigma_i$.

In addition, a control system is formulated as a target speed in the entire task space, and a motor command value is given as expressed by the following Equation (C-2) using a Jacobian matrix J. Note that a Superscript "˙" represents a first-order differential.

[Equation. 128]

$$\dot{\theta}_M^{cmd} = J^{-1}\dot{x}^{cmd} \tag{C-2}$$

(Planar Bipedal Walking Model of Related Art)

Figure 41:
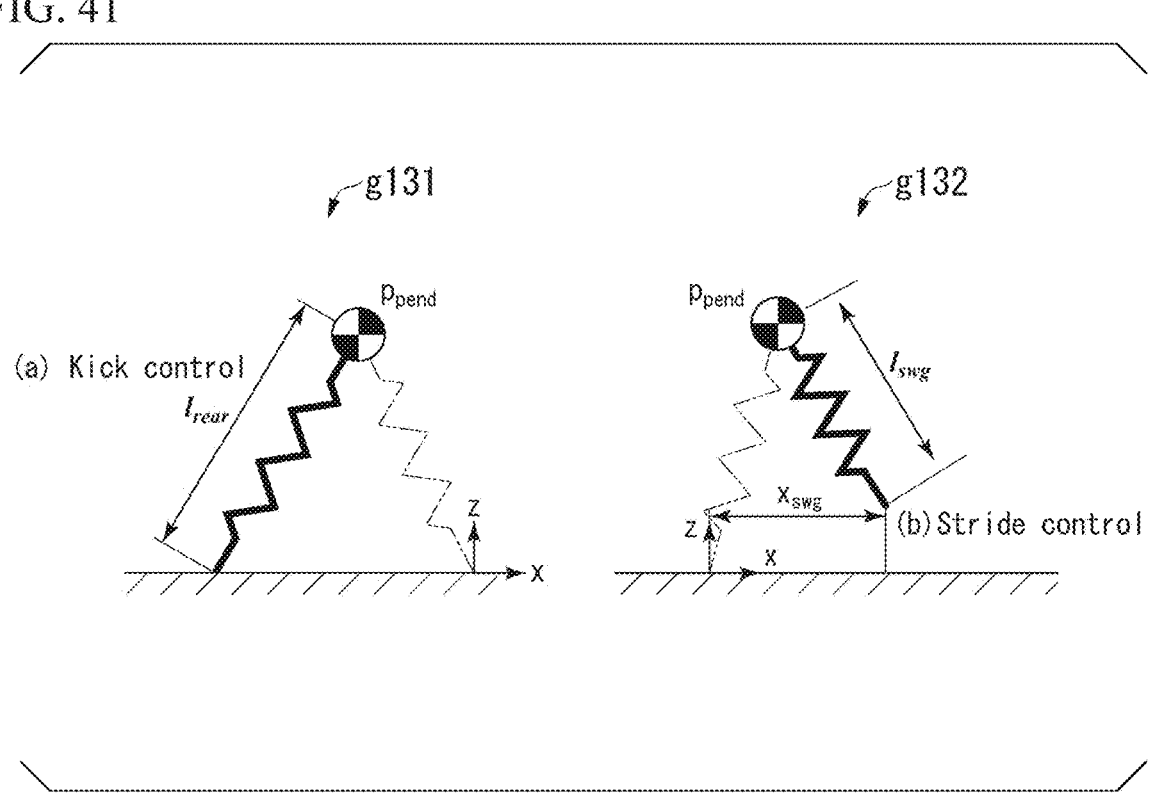
FIG. 41 is a diagram illustrating a walking model.

FIG. 41 is a diagram illustrating a walking model. The drawing indicated by a symbol g131 illustrates a model of kick control in which a rear leg kicks the floor in a double-leg support (DS) period. The drawing indicated by a symbol g132 illustrates a model of stride control of a single-leg swing leg in a single-leg support (SS) phase. Note that, in FIG. 41, a horizontal direction with respect to the floor is set to be an x-axis, and a height direction is set to be a z-axis. In addition, $l_{rear}$ is a rear leg link length, $l_{swag}$ is a swing leg link length, $p_{pend}$ is a center-of-gravity (CoG) position, and $x_{swg}$ is a distance in the x-direction between the rear leg and the swing leg.

Hodgins's control can be decomposed into the following three actions.

(a) Kicking the floor with the rear leg to switch from the DS phase to the SS phase.

(b) Adjusting the stride of the foot to control the horizontal speed in the SS phase.

(c) Adjusting body rotation in the DS and SS phases.

In Hodgins' control, the height of a robot is controlled by a kicking action (a), and a running speed of the robot is controlled by stride adjustment (b). Assuming that walking in the SS phase is similar to that of the IP model, and the height at a peak position is constant, a movement speed in the SS phase (a horizontal speed at the peak position) is uniquely determined only by mechanical energy and a standing leg angle. In this manner, in the Hodgins' control, a walking action is realized by giving a certain target stride in each SS phase, but controlling only a kicking action in the DS phase.

Raibert's control and Hodgins' control, which are conventional methods, take only the dynamics of the center of gravity of a single-mass point model into consideration.

However, in an actual robot, mass is distributed to each link, and thus angular momentum is generated in a high-speed motion such as a swing motion. Even when the mass of a legs is sufficiently smaller than the mass of the whole body (for example, totalmass:legmass=10:1), angular momentum according to the swing motion of the leg is not negligible. For this reason, in walking control for expressing the dynamics of the whole body with a single-mass point model, such as in Hodgins's control which is a conventional method, an error larger than expected occurs. Due to this error, in these control methods of the conventional methods, walking in accordance with a target movement speed can be performed. Further, in the control methods which are conventional methods, since a leg motion generating large angular momentum has a nonnegligible error in the dynamics of the whole body, it is difficult to continue targeted walking by control using only the single-mass point model. This problem is caused by a difference between the dynamic system of the model assumed in configuring the control and the actual dynamic system. Actually, there is an effect of angular momentum, and an action of a walking model causes a large error compared to the assumption. In this manner, the conventional method has a problem that the dynamic system of a motion is no longer a conservative system due to the influence of the motion, and control according to conservative energy cannot be performed.
(Multi-Mass Point Model)

Next, a multi-mass point model will be described.

Figure 42:
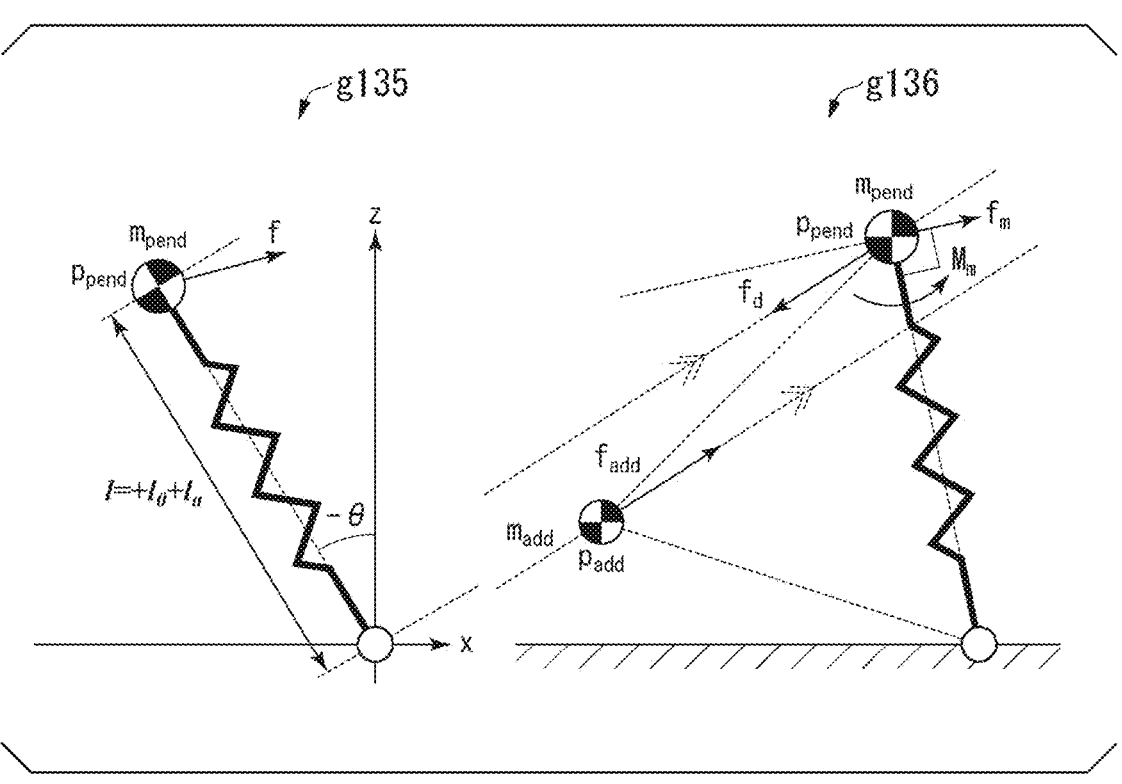
FIG. 42 is a diagram illustrating a single-mass point spring mass model and an additional mass point model.

FIG. 42 is a diagram illustrating a single-mass point spring mass model and an additional mass point model. An image g135 shows a single-mass point spring mass model, and an image g136 shows a weighted point model.

In a symbol g135, the mass of a single-mass point is indicated by $m_{pend}$, a position (attention point) is indicated by $p_{pend}(=\{x_{pend}, z_{pend}\}^T)$, and an equation of motion of a model in which an external force is applied to the single-mass point is indicated by $m_{pend}(p_{pend})^{..}$. In addition, $l=l_0+l_a$. $l_0$ indicates a natural length of a spring, $l_a$ indicates a displacement input of the spring, and f indicates an external force generated in the system. $M_m$ is a moment generated in $p_{pend}$ by $f_{add}$. A force $f_{add}$ is a force applied to the position $p_{add}$ of an added mass point.

When the mass point $m_{add}$ is added as indicated by a symbol g136, an external force generated from the motion becomes a resultant force as expressed by the following Equation (C-3).

[Equation. 129]

$$f = f_d + f_m \tag{C-3}$$

As shown in Equation (C-3), an external force f applied to $m_{pend}$ due to mass point motion of $m_{add}$ is calculated by a resultant force of two forces, that is, $f_d$ applied as a direct force and $f_m$ applied as a moment and then transmitted to $m_{pend}$ via a ground reaction force. The moment $M_m$ for generating $f_m$, and $f_d$ are calculated as expressed by the following Equation (C-4). Note that a superscript "``" represents a second-order differential.

[Equation. 130]

$$f_{add} = \begin{bmatrix} m_{add}\ddot{x}_{add} \\ m_{add}(\ddot{z}_{add} + g) \end{bmatrix}, \tag{C-4}$$

$$M_m = f_{add} \times (p_{pend} - p_{add}),$$

$$f_d = f_{add}$$

In Equation (C-4), the position of a leg mass point $m_{add}$ is $p_{add}=\{fx_{add}, z_{add}\}^T$, and g is gravitational acceleration. With respect to this external force, a time integral multiplied by $(p_{pend})^.$ is expanded as expressed by the following Equation (C-5).

[Equation. 131]

$$\int f^T \dot{p}_{pend} dt = \tag{C-5}$$

$$-\int f_d^T \dot{p}_{pend} dt + \int f_m^T \dot{p}_{pend} dt = -\int f_d^T \dot{p}_{pend} dt + \int M_m \dot{\theta} dt$$

The system is a conservative system when a primitive function that is not a time-dependent function is obtained in the integration of both a term related to a translational force and a moment in Equation (C-5) (an integral of a motion is obtained). In order to obtain an integral of these motions, it is necessary to satisfy both conditions of the following Equation (C-6).

[Equation. 132]

$$f_d = h_{d1}(\ddot{p}_{pend}) + h_{d2}(p_{pend}), \tag{C-6}$$

$$M_m = h_{m1}(\ddot{\theta}) + h_{m2}(\theta)$$

When $(p_{pend})^.$ satisfying both an equation of $M_m$ and an equation of fa in Equation (C-4) can be calculated under the condition of Equation (C-6), an integral of a motion is obtained, and the dynamic system becomes a conservative system even when a multi-mass point of two or more mass points is considered. That is, it is a condition under which a conservation law is established in the dynamic system of the equation of motion of the model taking the motion of the multi-mass point into consideration.

Figure 43:
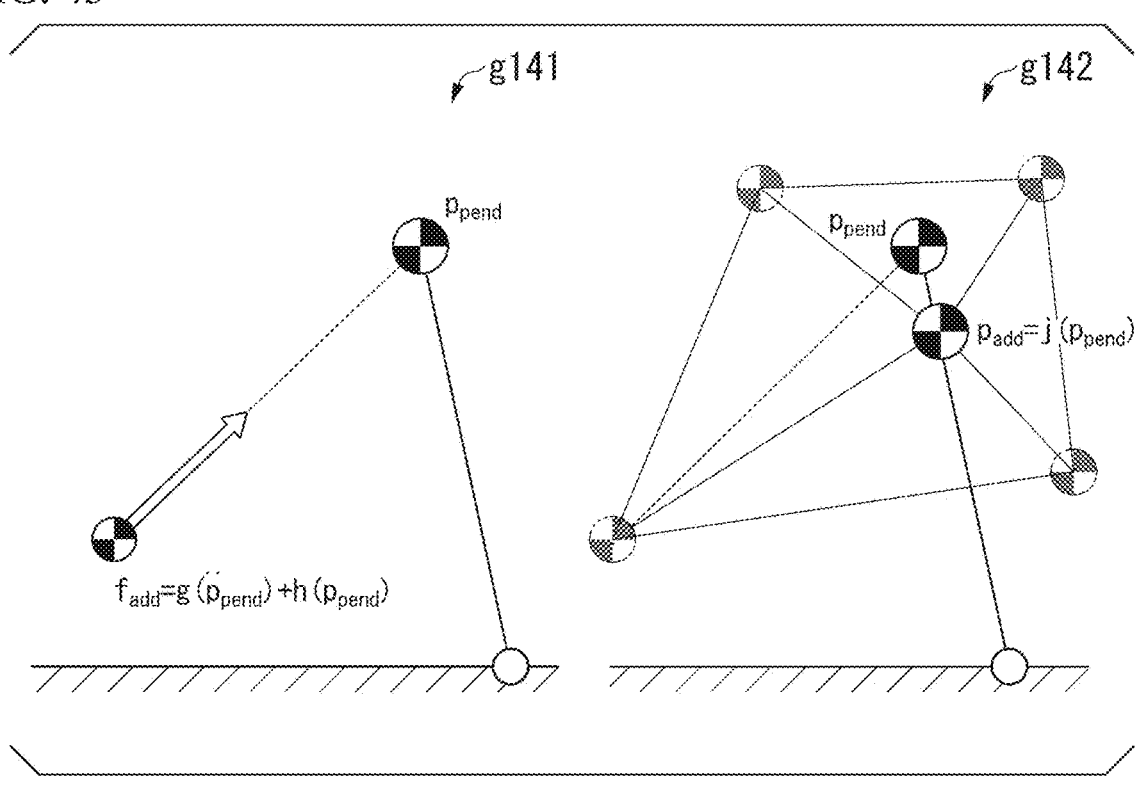
FIG. 43 is a diagram illustrating conditions under which a conservative system is established.

For example, it is a constraint condition as indicated by symbols g141 and g142 in FIG. 43. FIG. 43 is a diagram illustrating conditions under which a conservative system is established. The symbol g141 shows a diagram illustrating a forced constraint that neglects a moment. The symbol g142 shows a diagram illustrating a positional constraint.

In the symbol g141, it is possible to satisfy a conservative system condition by generating a translational force in a direction from $p_{add}$ to $p_{pend}$ so as to eliminate $M_m$ in Equation (C-6), which is a moment component, and setting the translational force to be a function of $p_{pend}$ and $(p_{pend})^{\cdot}$.

In addition, as indicated by the symbol g142, it is also possible to eliminate the influence of the moment and satisfy the above-described conservative system condition by placing the center-of-gravity position of a mass point other than $p_{pend}$ on the support leg axis and giving a constraint trajectory dependent on that $p_{pend}$ to the coordinates (however, it is necessary to prevent a moment from being generated in the $p_{add}$ itself due to a motion of a plurality of mass point).

Although it is possible to easily consider a condition for a conservative system, a trajectory in which a constraint condition is applied to a generated force or the position of a mass point is fixed is required in many cases, which leads to an extremely severe constraint condition. In particular, in a swing action of walking, it is necessary to bring the leg to a specific position with an arbitrary body posture and a specific support leg posture (when the foot touches down), and it is necessary to give a constraint based on a position instead of a constraint based on a force and to consider a condition for a conservative system.

Figure 44:
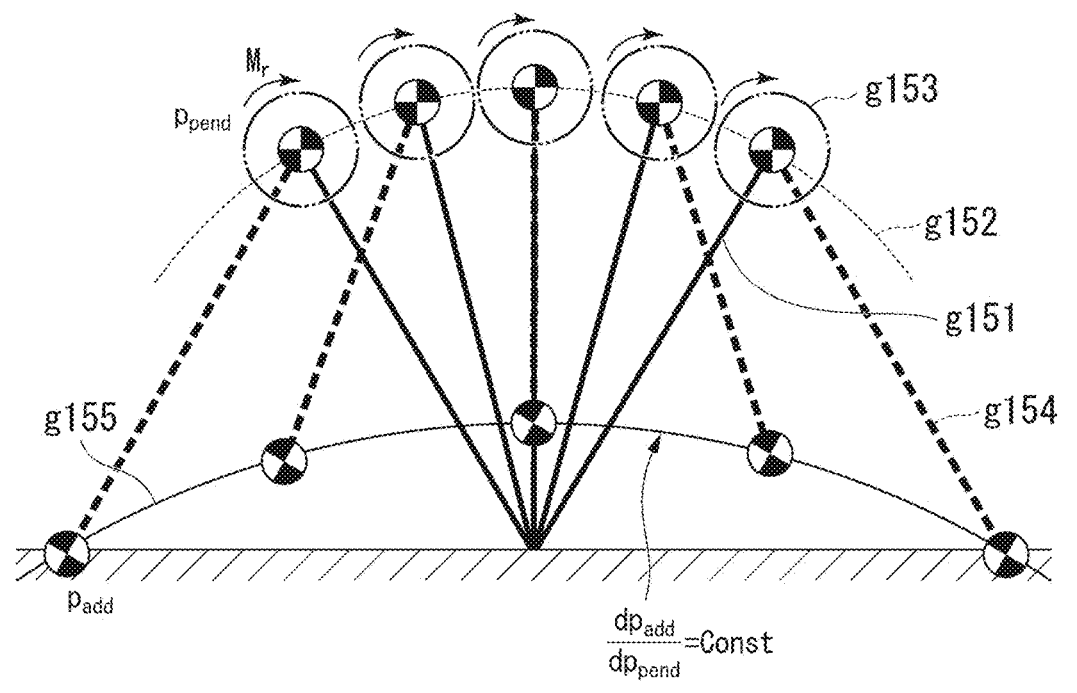
FIG. 44 is a diagram illustrating an example of constraints on a trajectory.

FIG. 44 is a diagram illustrating an example of a trajectory constraint. As illustrated in FIG. 44, a multi-mass point model obtained by adding an additional mass related to a swing leg motion to a single-mass point model based on SLIP is used. Note that, in the following description, the center of gravity (CoM) of a single-mass point model is indicated by $p_{pend}$. In addition, the center of gravity of the additional mass point with respect to the swing leg action is set to be $p_{add}$. The entire system can be a conservative system by giving a constraint trajectory such that $p_{add}$ is a linear function of $p_{pend}$. For example, the additional mass point may be the center-of-gravity position when a swing leg structure is added to the system.

(Integrable Condition Based on Leg Constraint Position Trajectory)

For energy-based walking control, it is only required to give $p_{swg}$ a constraint condition that can be expressed as in Equation (C-6). A swing leg trajectory position constraint as expressed by the following Equation (C-7) is given such that a swing leg trajectory can be adjusted arbitrarily to some extent. Note that, in the following Equation (C-7), $R_\gamma$ is a rotation matrix represented by cos and sin. In addition, "c" having a subscript attached thereto is a parameter. In addition, $b_{add}$ is an offset.

[Equation. 133]

$$p_{add} = c_{add} R_\gamma p_{pend} + b_{add} = \begin{bmatrix} c_x & 0 \\ 0 & c_z \end{bmatrix} \begin{bmatrix} \cos\gamma & \sin\gamma \\ -\sin\gamma & \cos\gamma \end{bmatrix} p_{pend} + \begin{bmatrix} b_x \\ b_z \end{bmatrix} \quad (C\text{-}7)$$

Thereby, $(p_{add})^{\cdot}$ is represented by the following Equation (C-8), and most terms can be integrated.

[Equation. 134]

$$\dot{p}_{add} = c_{add} R_\gamma \dot{p}_{pend} = \begin{bmatrix} c_x \cos\gamma \dot{x}_{pend} + c_x \sin\gamma \dot{z}_{pend} \\ -c_x \sin\gamma \dot{x}_{pend} + c_x \cos\gamma \dot{z}_{pend} \end{bmatrix} \quad (C\text{-}8)$$

Here, it is assumed that a motion of $p_{pend}$ in the support leg is similar to that of an inverted pendulum, and the following first assumption is made.

First Assumption; a Leg Length is Constant During Single Leg Support

At this time, an integral $E_{all}$ of all motions is expressed as the following Equations (C-9) to (C-12).

[Equation. 135]

$$E_{all} = E_{kinetic} + E_{potential} + E_{mod} \quad (C\text{-}9)$$

[Equation. 136]

$$E_{kinetic} = +\frac{1}{2} m_{pend} \dot{p}_{pend} \cdot \dot{p}_{pend} \quad (C\text{-}10)$$

[Equation. 137]

$$E_{potential} = +\frac{1}{2} \frac{k^2 p_{pend} \cdot p_{pend}}{k_0} + \quad (C\text{-}11)$$

$$m_{pend} g z_{pend} - m_{add} g b_x \theta - m_{add} g c_x (x_{pend} \sin\gamma - z_{pend} \cos\gamma)$$

[Equation. 138]

$$E_{mod} = -\int (m_{add} p_{add} \times \dot{p}_{pend}) \cdot (p_{add} \times \dot{p}_{pend}) dt = \int m_{add} M_{add} \cdot \dot{\theta} dt \quad (C\text{-}12)$$

Based on the above-described derivation, a condition for the motion of the entire system to be a conservative system is derived in consideration of an appropriate constraint trajectory for each mass. In particular, the following second assumption is made for a swing leg trajectory.

Second assumption; when it is assumed that a support leg angle $\theta$ is sufficiently small during walking, cos $\theta \approx 1$. Based on this assumption, $E_{mod}$ can be approximated as the following Equation (C-13).

[Equation. 139]

$$E_{mod} \simeq \frac{1}{2} c_x m_l \left( c_z + \frac{b_z}{l} \right) (\dot{p}_{pend} \times p_{pend}) \cdot (\dot{p}_{pend} \times p_{pend}) \quad (C\text{-}13)$$

In this manner, from Equations (C-10), (C-11), and (C-13), a motion given the constraint condition of Equation (C-7) is approximately a conservative system, and the motion is preliminarily specified, and a single-leg support motion including a swing leg motion can be uniquely determined by a preliminary energy operation.

Figure 45:
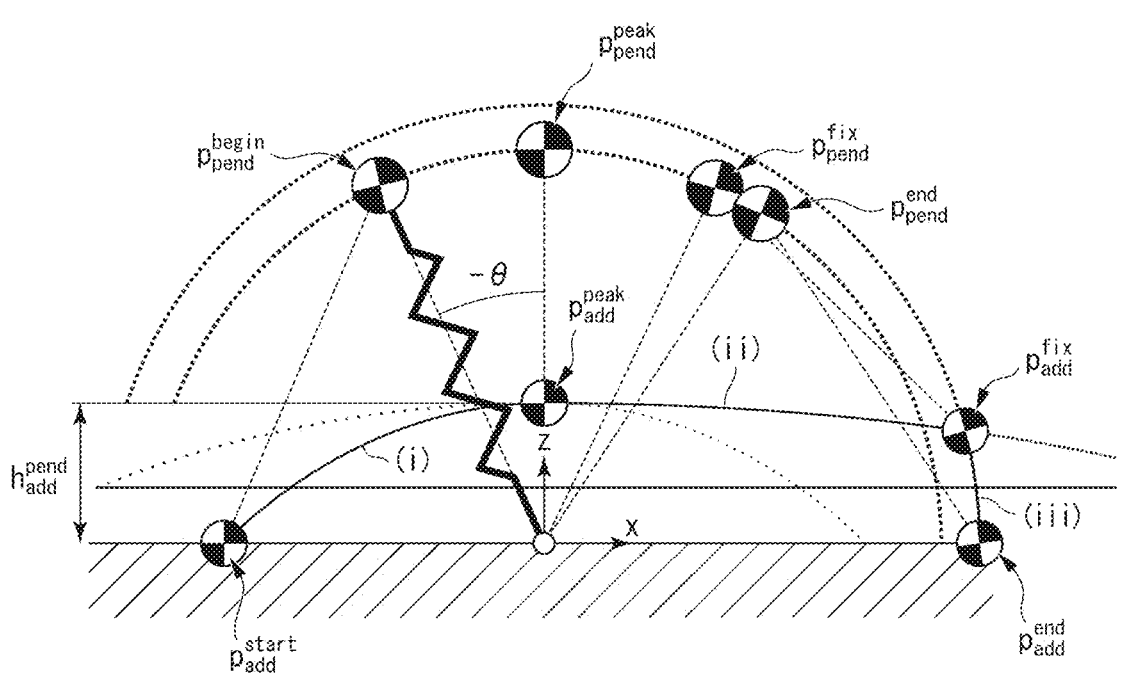
FIG. 45 is a diagram illustrating three phases of a motion in a swing leg.

In the actual robot, a swing leg trajectory in which an interval between a stride or a foot and the ground is changed is often performed in an SS phase during walking. For this reason, as illustrated in FIG. 45, a constrained swing leg trajectory that is decomposed into three swing leg phases is implemented. FIG. 45 is a diagram illustrating three phases of a motion in a swing leg. This decomposition allows a clearance with respect to the ground (or floor) and a stride to be adjusted.

In a phase (i), a trajectory of the swing leg is calculated from a target maximum height of a mass point position of the swing leg.

In phases (ii) and (iii), two parameters, that is, a final clearance $(h_{cle})^{pend}$ and a stride length $(l_{stride})^{end}$ are introduced.

Note that a length between the pendulum mass point position and the swing leg mass point position is maximum when the z-axis position of the swing leg mass point position reaches the final clearance $(h_{cle})^{pend}$. In addition, the maximum length is the same as the support leg length in the SS phase.

These trajectories are determined by the parameters $b_{add}$ and $c_{add}$.

The parameters $b_{add}$ and $c_{add}$ in each phase are derived by obtaining pendulum mass point and swing leg mass point positions $X=\{p_{pend}, p_{add}\}$ at the start and end of each swing leg phase and solving a simultaneous equation using Equation (C-17). In addition, as illustrated in FIG. 41, start and end positions of swinging phases (i), (ii), and (iii) are set to be $X^{start}$, $X^{peak}$, $X^{end}$ and $X^{atk}$.

First, each position at the end of the SS and DS phases, which is the beginning of the phase (i), is set to be $X^{start}$, and each position of the peak position ($\theta$=0) is set to be $X^{peak}$. A z component of $(p_{pend})^{peak}$ is a target height at the peak position and is the same as the leg length in the SS phase. A z component of $(p_{peak})^{add}$ a maximum leg clearance, and this value is arbitrarily set as a target parameter.

(Factors of Failure in Walking)

Next, an example of results of analyzing factors that cause the robot C1 to fail in walking will be described.

Figure 46:
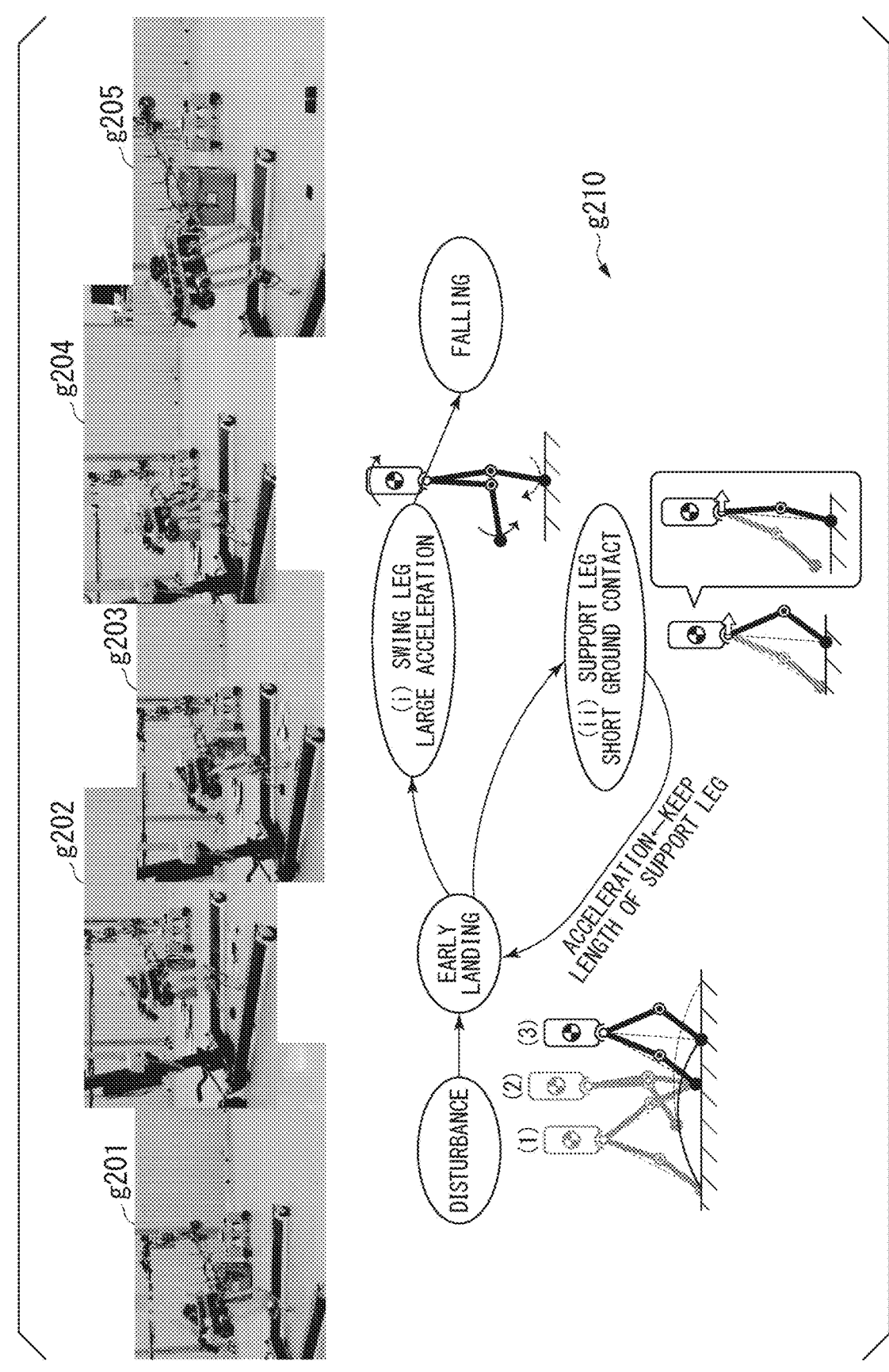
FIG. 46 is a diagram illustrating an example of results of analyzing factors of a failure in a robot's walking.

FIG. 46 is a diagram illustrating an example of results of analyzing factors that cause the robot to fail in walking.

Images g201 to g205 show the state of the robot C1 walking when there is an obstacle on the floor, or when the robot C1 is pushed from behind.

An image g210 shows results of analyzing factors of a failure in walking.

As a result of the analysis, it can be understood that one of factors of a failure when a disturbance is applied to the robot C1 during walking is early landing in which the leg comes into contact with the ground earlier than when there is no disturbance. Further, as a result of the analysis, it can be understood that there are two problems, as indicated by the symbol g210, even when this early landing is a factor.

(i) Problem in swing leg; large acceleration occurs.

(ii) Problem in support leg; The support leg comes into contact with the ground for a shorter period of time than when there is no disturbance.

In the comparative example described above, the length of the support leg in the swing phase is constant at all times. However, as described with reference to FIG. 46, during the actual walking, the swing leg does not have a desired leg length due to a disturbance or the like, and the swing leg phase may start. Further, when the speed of the robot C1 increases or decreases due to a disturbance, it may be difficult to follow the speed only with a kicking motion of the robot C1.

For this reason, in the third embodiment, in such a case, the length of the support leg is returned to a desired length without breaking the conditions of the conservative system. Further, in the third embodiment, a model that can positively correct the length of the support leg is used in order to realize a support leg trajectory changing method for following a walking speed that cannot be achieved only by a kicking motion by changing a support leg trajectory.

(Variable Support Leg Length Model)

First, description will be given of a method of expressing a leg trajectory so that the overall dynamics becomes a conservative system even when the length of the support leg is changed during an SS phase. In the comparative example, as described above, a constraint condition for a swing leg trajectory position is expressed by Equation (C-7). As expressed by Equation (C-7), a swing leg trajectory is determined based on an inverted pendulum position $p_{pend}$. For this reason, when the length of the inverted pendulum is changed, leg trajectory parameters also need to be modified, and thus complicated derivation is required additionally. Since the length of the support leg is made variable so as not to break the above-described first assumption, it is considered that the mass point of $p_{pend}$ is decomposed into two virtual mass points.

Figure 47:
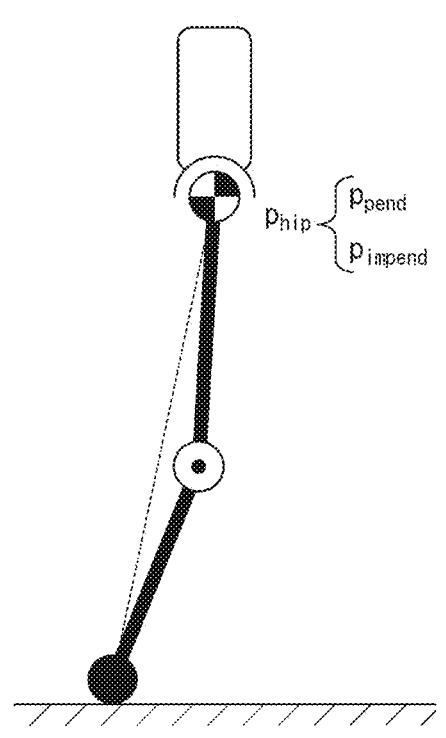
FIG. 47 is a diagram illustrating a support leg model in forming a virtual mass point.
Figure 48:
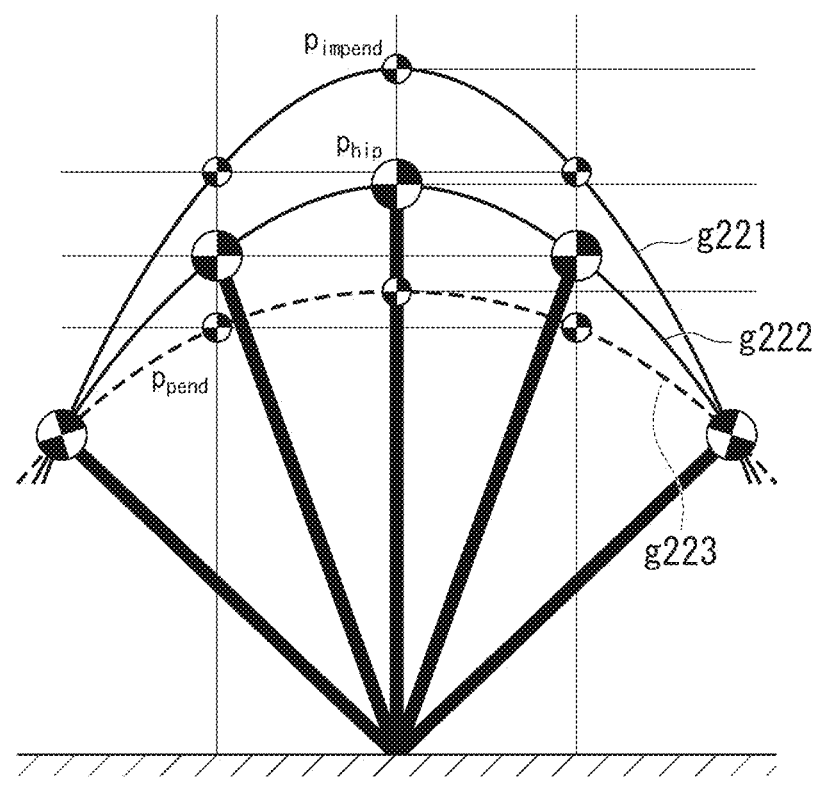
FIG. 48 is a diagram illustrating a definition of a standing leg in each phase.
Figure 49:
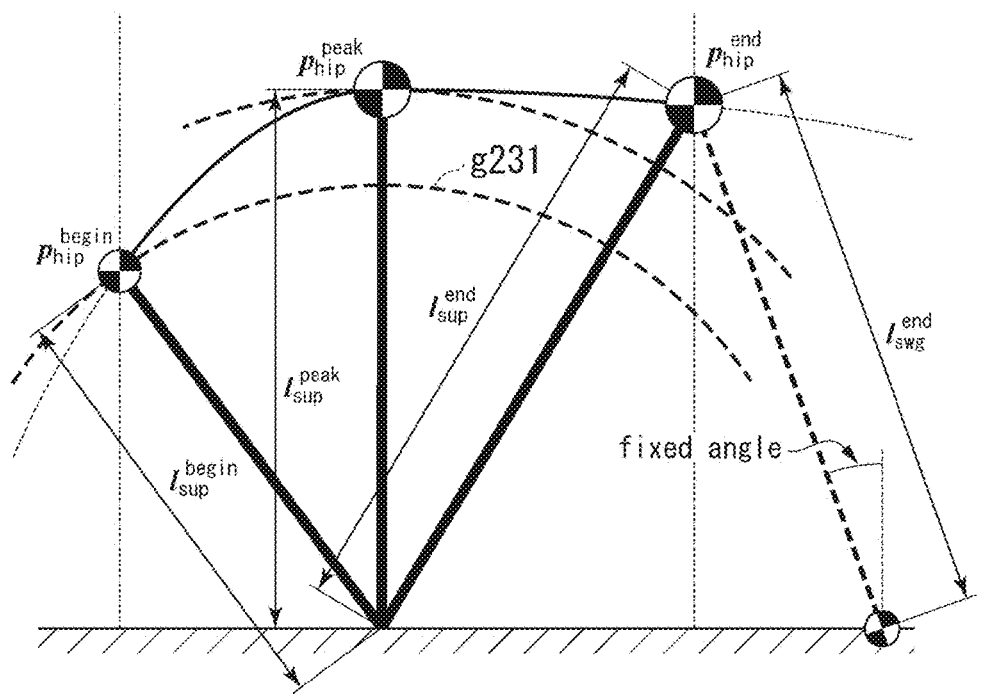
FIG. 49 is a diagram illustrating a definition of a standing leg in each phase.

For this reason, in the third embodiment, decomposition is performed as illustrated in FIGS. 47 to 49.

FIG. 47 is a diagram illustrating a support leg model in forming a virtual mass point. As illustrated in FIG. 47, in the third embodiment, the hip is set to be the center-of-gravity position of the support leg.

Further, in the third embodiment, the mass point position of the support leg, which is $p_{pend}$ in the comparative example, is replaced with $p_{hip}$. Note that the following description can be given in the same manner even when the mass point position of the support leg is actually replaced with the support leg mass point.

An actual mass point $p_{hip}$, which is the position of the support leg mass point, is decomposed into an ideal mass point $p_{pend}$ which moves to satisfy the first assumption and a virtual mass point $p_{impend}$ paired with the ideal mass point $p_{pend}$ which satisfies the following Equations (C-14) and (C-15). Further, in the third embodiment, the above-described first attention point is set to be the ideal mass point $p_{pend}$.

[Equation. 140]

$$m_{hip}z_{hip} = m_{pend}z_{pend} + m_{impend}z_{impend} \qquad (C-14)$$

[Equation. 141]

$$x_{hip} = x_{pend} = x_{impend} \qquad (C-15)$$

Note that $p_{impend}$ represents the position of newly introduced virtual inverted pendulum, and $m_{hip}$ is a hip joint point, $m_{pend}$ is inverted pendulum, and $m_{impend}$ is the mass of the virtual inverted pendulum in Equations (C-14) and (C-15). Further, the total mass m of the robot C1 is expressed by the following Equation (C-16).

[Equation. 142]

$$m = m_{hip} + m_{swg} = m_{pend} + m_{impend} + m_{swg} \qquad (C-16)$$

In the third embodiment, the hip joint mass is mass obtained by subtracting the mass of one leg from the total mass m of the robot C1, and the hip joint mass is shared between the inverted pendulum and the virtual inverted pendulum. In this model, it is assumed that a motion of a mass point other than the inverted pendulum applies an external force of Equation (C-3) described above to only the inverted pendulum. Under this assumption, when the position $p_{impend}$ of the virtual inverted pendulum is moved by Equation (C-7), the entire system becomes a conservative system.

FIG. 48 is a diagram illustrating a definition in the support leg mass point in forming a virtual mass point. In the third embodiment, as illustrated in FIG. 48, the length of the ideal mass point $p_{pend}$ is fixed, and the position of the actual mass point $p_{hip}$ can be freely changed in accordance with Equation (C-7), Equation (C-17) to described later, and a trajectory constrained to an affine-transformed position of the first attention mass point. Further, in the third embodiment, the position of the virtual mass point $p_{impend}$ is corrected for consistency.

In FIG. 48, a dashed line g223 indicates a change in the position of the ideal mass point $p_{pend}$ during walking, and the length of the leg is constant. A line g222 indicates a change in the position of the actual mass point $p_{hip}$ during walking, the length of the leg is not constant, and there is a position longer than the length of the ideal mass point $p_{pend}$. A line g221 indicates a change in the position of the virtual mass point $p_{impend}$ during walking, the length of the leg is not constant, and there is a position longer than the length of the position of the actual mass point pimp.

($p_{hip}$ Trajectory)

Next, a method of determining a pimp trajectory will be described.

FIG. 49 is a diagram illustrating a definition of a standing leg in each phase. In addition, a dashed line g231 indicates a trajectory of the ideal mass point $p_{pend}$. First, for a target leg length in each single-leg support phase, a begin phase (walking start phase), a peak phase (walking maximum phase), and an end phase (walking end phase) are determined as illustrated in FIG. 49. Here, a target $p_{hip}$ position in the peak phase is $(l_{sup})^{peak}$ from the floor, and a target $p_{hip}$ position in the end phase is $(l_{sup})^{end}$ from the floor. Note that it is assumed that $p_{hip}$, $p_{pend}$, and $p_{impend}$ at the start of single leg support are at the same position as illustrated in FIG. 49. Note that, when the length of the leg $(l_{sup})^{peak}$ is longer than the length of the leg $(l_{sup})^{begin}$, deceleration occurs. When the length of the leg $(l_{sup})^{end}$ is increased, the time of the swing leg phase can be lengthened. When the length of the leg $(l_{swg})^{end}$ is reduced, deceleration occurs.

$(p_{pend})^{peak}$ and $(p_{pend})^{end}$ are determined in accordance with $(l_{sup})^{peak}$ and $(l_{sup})^{end}$. Parameters $c_{hip}$ and $b_{hip}$ for each phase in the single support leg walking of the $p_{hip}$ trajectory are calculated using the target values. The $p_{hip}$ trajectory in this case is expressed by the following Equation (C-17).

[Equation. 143]

$$p_{hip} = c_{hip} p_{pend} + b_{hip} \tag{C-17}$$

Further, in the derivation of the swing leg trajectory, it is assumed that an offset corresponding to the height of $p_{hip}$ is given instead of calculating a swing leg position from $p_{peak}$. This reduces the expansion and contraction of the swing leg itself due to the expansion and contraction of the support leg. Thereby, the swing leg trajectory is expressed by the following Equation (C-18).

[Equation. 144]

$$p_{swg} = c_{swg} R_\gamma p_{pend} + b_{swg} + c_{hip} p_{pend} + b_{hip} - p_{pend} \tag{C-18}$$

Note that, in Equation (C-18), $c_{swg}$ is a parameter of the swing leg trajectory during movement, $R_\gamma$ is a parameter, $b_{swg}$ is a parameter of the swing leg trajectory during movement, and $b_{hip}$ is a parameter for each state of single leg support during movement.

Here, Equation (C-18) is obtained by adding the Equations (C-7) and (C-17) and subtracting the position of the point $p_{pend}$ to be noted, and this trajectory does not allow an indefinite integral to be obtained and satisfies a conservative system. Note that, in Equation (C-18), add in Equation (C-7) is represented by swg. Further, the swing leg trajectory is obtained from the parameters $c_{impend}$ and $b_{impend}$ of the $p_{impend}$ trajectory and Equations (C-14), (C-15), and (C-18).

In the third embodiment, these are used to calculate energy, which is combined with the energy of the swing leg to be conserved energy.

Note that, in a simulation, the length of the leg $(l_{sup})^{peak}$, the length of the leg $(l_{sup})^{end}$, and the length of the swing leg $(l_{swg})^{end}$ are optimized in accordance with a ground contact situation.

Actually, the length of the leg $(l_{sup})^{peak}$, the length of the leg $(l_{sup})^{end}$, and the length of the swing leg $(l_{swg})^{end}$ are given as fixed values. Note that, when the leg lands early, the leg comes into contact with the ground with a leg length shorter than the fixed value (the length of the leg is $(l_{sup})^{peak}$), but the speed can be returned to return the length of the leg to the fixed value. In this case, no optimization calculation is required.

(Other Constraint Conditions)

In the above-described example, Equation (C-1) is used as a constraint condition. However, a constraint condition is not limited to Equation (C-7), and it is also possible to use the following generalized affine transformation.

Figure 50:
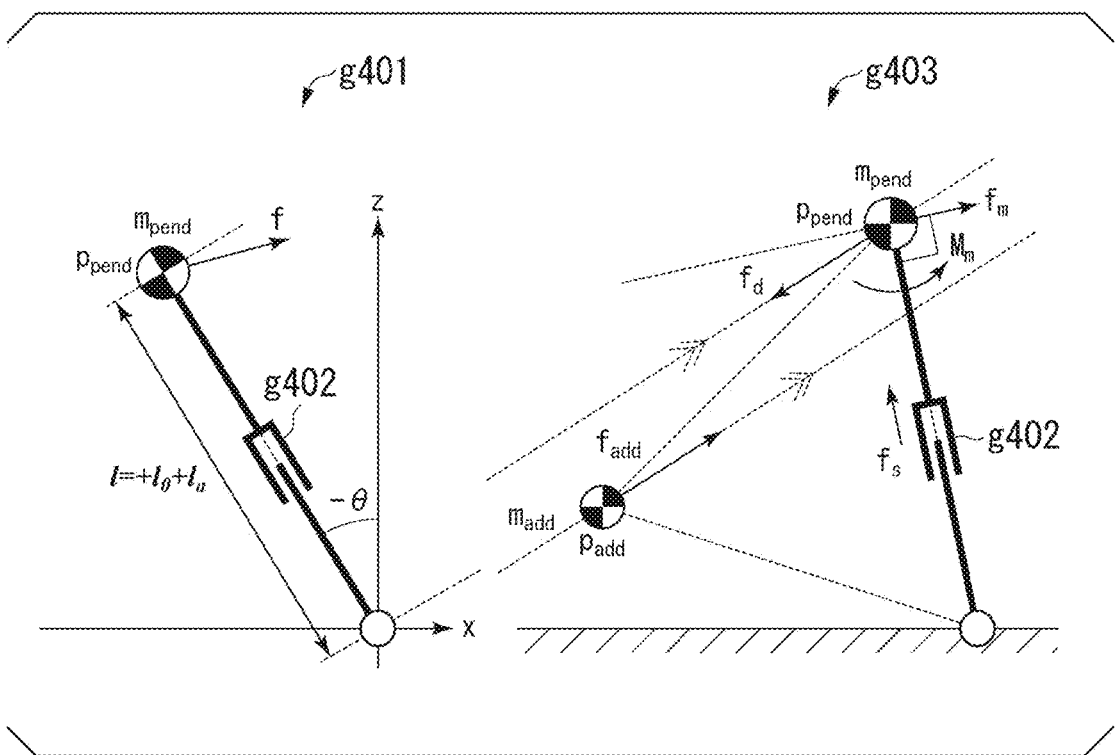
FIG. 50 is a diagram illustrating a single-mass point model and a multi-mass point model.

FIG. 50 is a diagram illustrating a single-mass point model. Note that a symbol g402 indicates a support point of which an end point comes into contact with the ground. $p_{end}$ in a symbol g401 indicates the center of a mass point. In a symbol g403, add indicates a mass point added to the model indicated by the symbol g401, and $p_{end}$ indicates the center of a mass point that does not include add.

As indicated by the symbol g401 in FIG. 50, when the mass point and position of a single-mass point model are set to be $m_{pend}$ and $p_{pend} = \{x_{pend}, z_{pend}\}^T$, respectively, an equation of motion of a two-mass point model is given as expressed by the following Equation (C-19).

[Equation. 145]

$$m_{pend} \ddot{p}_{pend} = -m_{pend} g[0, 1]^T + f \tag{C-19}$$

When a case where a force $f_{add}$ is applied to an additional position $p_{add}$ is added (the symbol g402 in FIG. 50), an external force f at the additional mass point position $p_{add}$ is calculated as a result of the two forces as expressed by the following Equation (C-20).

[Equation. 146]

$$f = f_d + f_m + f_s \tag{C-20}$$

In Equation (C-20), $f_d$ is directly calculated from $f_{add}$, and $f_m$ is converted from a moment $M_m$ via a ground reaction force. The moment $M_m$, the force $f_m$, and $f_d$ are calculated as expressed by the following Equations (C-21) to (C-23).

[Equation. 147]

$$f_{add} = \begin{bmatrix} m_{add}\ddot{x}_{add} \\ m_{add}(\ddot{z}_{add} + g) \end{bmatrix} \qquad \text{(C-21)}$$

[Equation. 148]

$$M_m = (p_{pend} - p_{add}) \times f_{add} \qquad \text{(C-22)}$$

[Equation. 149]

$$f_m = \frac{1}{l^2}\begin{bmatrix} M_m z_{pend} \\ M_m x_{pend} \end{bmatrix} \qquad \text{(C-23)}$$

l is the length of the leg, $l=l_0+l_a$, where $l_0$ indicates a natural length of a spring, and $l_a$ indicates a displacement input of the spring. In addition, $f_s$ is defined as the following Equation (C-24).

[Equation. 150]

$$f_s = -kp_{pend} + C(\dot{p}_{pend}, p_{pend}) \qquad \text{(C-24)}$$

Here, k is expressed by the following Equation (C-25).

[Equation. 151]

$$k = \begin{cases} 0 & (|p_{pend}| \geq l) \\ k_0\left(1 - \dfrac{1}{|p_{pend}|}\right) & (|p_{pend}| < l) \end{cases} \qquad \text{(C-25)}$$

A spring force can be adjusted by displacing the natural length $l_a$ of the spring as shown in Equation (C-25). In this model, a kick control unit gives energy by adjusting the displacement $l_a$ of the spring. Further, in the model, since a damper is disposed in parallel with the spring, the term of the following Equation (C-26) is added.

[Equation. 152]

$$C(\dot{p}_{pend}, p_{pend}) = \begin{cases} 0 & (|p_{pend}| \geq l) \\ -c_0\dfrac{p_{pend}^T \dot{p}_{pend}}{|p_{pend}|^2}p_{pend} & (|p_{pend}| < l) \end{cases} \qquad \text{(C-26)}$$

The energy of the spring is calculated as expressed by the following Equation (C-27).

[Equation. 153]

$$E_s = \frac{1}{2}\frac{(kp_{pend})^2}{k_0} \qquad \text{(C-27)}$$

Note that, in this simulation, a loss of energy of the damper is neglected because the effect of the damper is small.

In this manner, a behavior of a multi-mass point model can be simulated from Equation (C-19) of an equation of motion and Equation (C-20) of a force.

As described above, when an external force f (symbol g401 in FIG. 50) generated in the system can be designed arbitrarily, Equation (C-19) can express an equation of motion of any single-mass point model.

Next, in order to determine whether the dynamic system of the single-mass point model is a conservative system, it is analyzed whether an integral of a motion can be obtained. When Equation (C-19) of the equation of motion is multiplied by $(\dot{p}_{pend})$, the time integration amount thereof becomes energy. When an analytical solution for energy is a function that does not depend on time, the amount is an integral of a motion and becomes a conservative quantity. Thus, the dynamic system of this model is a conservative system.

Energy $E_{all}$ of the system is calculated as expressed by the following Equation (C-28) from Equation (C-19) of the equation of motion.

[Equation. 154]

$$E_{all} = \frac{1}{2}m_{pend}\dot{p}_{pend}^T\dot{p}_{pend} + m_{pend}gz_{pend} - \int f^T\dot{p}_{pend}dt \qquad \text{(C-28)}$$

Note that $E_{all}$ is mechanical energy of the system when the energy calculated by f is potential energy or kinetic energy, for example, when f=0.

Since f is unknown, Equation (C-28) has a time-dependent term. When this term can be solved in a time-independent manner, an integral of a motion in Equation (C-28) can be obtained.

In other words, even in a model in which the system itself generates an external force, when $\int f\cdot(\dot{p}_{pend})dt$ does not depend on time, the dynamic system of the model will be a conservative system. In addition, the force f thereof is referred to as a conservative force.

For example, when a function g(•), a time integral function G(•), and an external force $f=g(p_{pend})$ are given, a motion integral of the dynamic system to which the external force is applied is obtained as expressed by the following Equation (C-29) as a function of $p_{pend}$

[Equation. 155]

$$\int f^T\dot{p}_{pend}dt = G(p_{pend}) + Const \qquad \text{(C-29)}$$

Note that the derivation of Equation (C-29) is performed in the same manner as the integral of the motion of the position-dependent function.

For this reason, the dynamic system is a conservative system. Thus, Equation (C-28) does not have a time-dependent term. When Equation (C-29) is substituted into Equation (C-28), the quantity $E_{all}$ becomes a kind of conserved energy. As long as the dynamic system is a conservative system, a motion is uniquely determined by the amount of conserved energy.

In this manner, as an example of a dynamic model of a walking controller, a model was created from conditions of the conservative system. A controller using the trajectory energy of the LIP model indicated by the symbol g401 in FIG. 15 give conditions as expressed by the following Equation (C-30).

[Equation. 156]

$$f = \frac{(m_{pend}g|p_{pend}|)}{(e_z \cdot p_{pend})} \qquad \text{(C-30)}$$

$$z_{pend} = Const$$

In Equation (C-30), $e_z$ is a unit vector in the z direction.

Since f depends on a position $p_{pend}$, the dynamic system becomes a conservative system even when an external force is generated on the leg. In Non-Patent Document 3, the conserved energy is defined as trajectory energy, and a walking speed of the robot is controlled by comparing a difference between the current trajectory energy and target trajectory energy. In this manner, by appropriately designing a force generated in the model, the dynamic system for a specific motion becomes a conservative system with time uniformity. The motion of the robot can be uniquely determined by referring to the current conserved energy and the target conserved energy.

(Conservative System in Multi-Mass)

In the third embodiment, for the conservative system in a multi-mass point, Equation (C-3) ($f=f_d+f_m$) in the first embodiment is replaced with Equation (C-20) ($f=f_d+f_m+f_s$).

(Derivation of Conserved Energy)

Next, conditions for becoming a conservative system taking a swing leg motion into consideration by putting some assumptions and the derivation of conserved energy will be described.

FIG. 51 is a diagram illustrating a conservative system model in the third embodiment. As illustrated in FIG. 51, the flywheel used in FIG. 9 is not used, energy $E_{add}$ is added instead of adding the moment $M_r$, and affine transformation (Equation (C-31) to be described later) is used instead of Equation (C-7) as a constraint equation. Further, in the above-described example, the length of the leg during walking is constant, a trajectory $dp_{add}/dp_{pend}$ of $p_{add}$ is constant, and for example, they are regarded as curves that are symmetrical to each other, while in the third embodiment, the length of the leg during walking is variable, and the trajectory of $p_{add}$, is, for example, parabolic as indicated by a curve g451 in FIG. 51.

In the case of walking, the foot is required to come into contact with the ground in a specific posture at the time of termination of the SS phase. That is, it is necessary to give a positional constraint condition to $p_{add}$ so that the foot reaches a specific position in a specific posture of the robot. For this reason, in the third embodiment, a position constraint condition such as in the following Equation (C-31) is given such that the position of the swing leg can be adjusted arbitrarily to some extent. Note that $C_{add}$ is a matrix of affine transformation. In addition, $B_{add}$ is an offset.

[Equation. 157]

$$p_{add} = C_{add}p_{pend} + B_{add} = \begin{bmatrix} c_1 & c_2 \\ c_3 & c_4 \end{bmatrix} p_{pend} + \begin{bmatrix} b_x \\ b_z \end{bmatrix} \qquad (C\text{-}31)$$

Thereby, the following Equation (C-32) is obtained.

[Equation. 158]

$$\ddot{p}_{add} = c_{add}\ddot{p}_{pend} \qquad (C\text{-}32)$$

In addition, an indefinite integral is obtained for a term related to a translational force of the energy of the external force. On the other hand, for an external moment term, an indefinite integral cannot be obtained as it is.

For this reason, a motion of $p_{pend}$ in the SS phase is assumed to be similar to that of an inverted pendulum, and a first assumption is made.

First Assumption: The Length of the Support Leg is Constant in the SS Phase.

Thereby, most of the indefinite integrals can be obtained for the moment term. At this time, when the total energy $E_{all}$ is set, the kinetic energy Ekinetic, the positional energy $E_{potential}$, and other energy $E_{mod}$ are expressed as the following Equations (C-33) to (C-36).

[Equation. 159]

$$E_{all} = E_{kinetic} + E_{potential} + E_s + E_{mod} \qquad (C\text{-}33)$$

[Equation. 160]

$$E_{kinetic} = \frac{1}{2}(m_{pend} + m_{add}|C_{add}|)\dot{p}_{pend}^T\dot{p}_{pend} \qquad (C\text{-}34)$$

[Equation. 161]

$$E_{potential} = \left(m_{pend}[0, g]^T + m_{add}|C_{add}|C_{add}^{-1}[0, g]^T\right)p_{pend} \qquad (C\text{-}35)$$

[Equation. 162]

$$E_{mod} = m_{add}\int \left(B_{add} \times \ddot{p}_{add}\right)\dot{\theta}dt \qquad (C\text{-}36)$$

In Equations (C-34) and (35), $|C_{add}|$ indicates a determinant of $C_{add}$. In addition, $E_s$ is energy of the spring.

The system energy $E_{all}$ has a term $E_{mod}$ that cannot be obtained by an indefinite integral. When the term of $E_{mod}$ is further expanded into Equation (C-36), the following Equation (C-37) is obtained.

[Equation. 163]

$$E_{mod} = m_{add}\int (B_{add} \times \ddot{p}_{add})\dot{\theta}dt + \qquad (C\text{-}37)$$
$$m_{add}\int (B_{add} \times \dot{p}_{add})\dot{\theta}dt - m_{add}\int (B_{add} \times \dot{p}_{add})\dot{\theta}dt$$

Finally, there remains a term that cannot be obtained by an indefinite integral. Here, it is assumed that another additional energy is generated in order to obtain an indefinite integral of the energy $E_{all}$ of the system.

In order to derive the additional energy for obtaining the indefinite integral of Equation (C-79), energy of the following Equation (C-38) needs to be generated.

[Equation. 164]

$$E_{react} = E_{mod} + E_{add} \qquad (C\text{-}38)$$

In Equation (C-38), $E_{add}$ is the following Equation (C-39).

[Equation. 165]

$$E_{add} = Am_{add}\int (B_{add} \times \dot{p}_{add})\dot{\theta}dt + (A+1)m_{add}\int (B_{add} \times \dot{p}_{add})\ddot{\theta}dt \qquad (C\text{-}39)$$

Here, A is a variable. An indefinite integral of Equation (C-38) of energy is obtained as expressed by the following Equation (C-40). In addition, $\theta$ is an angle between the position of the peak of the mass point $p_{pend}$ and the leg, and $m_{add}$ is the weight of the leg.

[Equation. 166]

$$E_{react} = (A + 1)m_{add}(B_{add} \times \dot{p}_{add})\dot{\theta} \qquad \text{(C-40)}$$

Here, $E_{all}$ is the following Equation (C-41).

[Equation. 167]

$$E_{all} = E_{kinetic} + E_{potential} + E_{react} \qquad \text{(C-41)}$$

As described above, the affine transformation of Equation (C-31) can also be used for the constraint condition.
(Processing Procedure)

Next, an example of a processing procedure of the walking control method performed by the walking control device C10 will be described. FIG. 52 is a diagram illustrating an example of a processing procedure of the walking control method performed by the walking control device according to the third embodiment.

(Step S_C-101) First, a user such as a designer or a developer decomposes a mobile device (robot) having legs into a plurality of mass points.

(Step S_C-102) Next, the user decomposes the plurality of decomposed mass points into a first interest mass point (pendulum mass) and mass points other than the first interest mass point (second interest mass point, . . . ). The second interest mass point is, for example, Hip mass, Impend mass, or swing-leg mass.

(Step S_C-103) Next, the user assumes that the length of a contact point between the first interest mass point (for example, the support leg) and the floor on the walking plane is constant.

(Step S_C-104) Next, for the swing-leg mass, the user assumes that the mass points other than the first interest mass point are constrained to the affine-transformed (Equation (C-20)) position of the first interest mass point. In addition, the user assumes that the actual center-of-gravity position (for example, hip mass) of the support leg is constrained to an affine-transformed trajectory for the support leg. Then, the virtual mass point (for example, impend mass) which is set in accordance with Equations (C-14) to (C-17) is a position obtained by affine-transforming the first interest mass point (Equation (20)). Note that, at this time, hip mass can be expressed by pend mass and impend mass.

(Step S_C-105) When the first interest mass point is moved, the walking control device C10 generates a constraint trajectory for mass points other than the first interest mass point in accordance with constraint.

(Step S_C-106) The walking control device C10 gives a single-mass point model a constraint trajectory such that the center of gravity ($p_{add}$) of an additional mass point (additional mass) is an affine-transformed position of the center-of-gravity position of the additional mass point (additional mass) by using a multi-mass point model obtained by adding the additional mass point related to a swing leg motion. Thereby, the entire system is a conservative system.

(Step S_C-107) The walking control device C10 sets the first interest mass point to be an ideal mass point $p_{pend}$. Then, the walking control device C10 sets a virtual mass point and an ideal mass point such that the center of gravity of the ideal mass point $p_{pend}$ and the center of gravity of the virtual mass point $p_{impend}$ are the actual mass point $p_{hip}$ of the mobile device.

(Step S_C-108) The walking control device C10 operates the support leg and the swing leg.

The walking control device C10 performs walking control for the robot C1 using results set through such processing.

As described above, in the third embodiment, the walking control for the robot C1 is performed using a conservative system model using a virtual mass point.

Thereby, according to the third embodiment, while a motion during a single leg support phase satisfies the conservative system, it is possible to construct a method capable of changing a support leg length during the single leg support phase depending on a situation and to realize continuous walking robustly against a disturbance. In addition, according to the third embodiment, it is possible to realize the walking control method with a small amount of calculation and capable of continuing walking robustly.

Note that the mobile device described above is not limited to the robot C1, and may be, for example, other movable devices having at least two legs.

Note that all or some of the processes performed by the walking control devices A10, B10, and C10 in the present invention may be performed by recording a program for realizing all or some of the functions of the walking control devices A10, B10, and C10 in a computer-readable recording medium and by causing a computer system to read and execute the program recorded in the recording medium. Note that it is assumed that the "computer system" as mentioned herein includes hardware such as OS and peripheral devices. In addition, it is assumed that the "computer system" also includes a WWW system including a homepage providing environment (or a display environment). In addition, the "computer-readable recording medium" refers to a portable medium such as a flexible disc, a magneto-optical disc, a ROM, or a CD-ROM, or a storage device such as a hard disk built into the computer system. Further, it is assumed that the "computer-readable recording medium" also includes a medium holding the program for a certain period of time like a volatile memory (RAM) inside the computer system serving as a server or a client in a case in which the program is transmitted through a network such as the Internet or through a communication line such as a telephone line.

In addition, the above-described program may be transmitted from the computer system in which the program is stored in a storage device or the like to another computer system through a transmission medium or by transmitted waves in the transmission medium. Here, the "transmission medium" transmitting the program refers to a medium having a function of transmitting information like a network (communication network) such as the Internet or a communication line (communication wire) such as a telephone line. In addition, the above-described program may be a program for realizing a portion of the above-described function. Further, the above-described program may be a so-called differential file (differential program) capable of realizing the above-described function in combination with a program which is recorded in advance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A walking control method comprising:

decomposing a mobile device with legs into a plurality of mass points;

decomposing the plurality of decomposed mass points into a first interest mass point and mass points other than the first interest mass point;

making a length between the first interest mass point and a contact point on a walking plane constant;

making the mass points other than the first interest mass point constrained to an affine-transformed position of the first interest mass point;

generating a constraint trajectory of the mass points other than the first interest mass point in accordance with the constraint when the first interest mass point is moved;

and using the legs, moving the mobile device in accordance with the constraint trajectory of the mass points other than the first interest mass point.

2. The walking control method according to claim 1, wherein an entire system is set to be a conservative system by giving a constraint trajectory in which a center of gravity $p_{add}$ of additional mass related to a swing leg motion is a linear function of a center-of-gravity position $p_{pend}$ of the additional mass to a single-mass point model satisfying the conservative system by using a multi-mass point model obtained by adding the additional mass.

3. The walking control method according to claim 2, wherein energy is added to the system in order to make an indefinite integral obtained for a term for which a time-independent indefinite integral is not able to be obtained in an equation representing energy for an external force of a single-mass point.

4. The walking control method according to claim 3, wherein, regarding conditions for representing an indefinite integral by a time-independent function, the center of gravity $p_{add}$ of the additional mass is expressed by the following equation,

[Equation. 1]

$$p_{add} = C_{add}p_{pend} + B_{add} = \begin{bmatrix} c_1 & c_2 \\ c_3 & c_4 \end{bmatrix} p_{pend} + \begin{bmatrix} b_x \\ b_z \end{bmatrix}$$

$C_{add}$ and $B_{add}$ are constant matrices, energy $E_{add}$ of the following equation is given to the additional mass,

[Equation. 2]

$$E_{react} = E_{mod} + E_{add}$$

$E_{react}$ is other energy, $E_{mod}$ is other energy that cannot be obtained as an indefinite integral, and the energy $E_{add}$ is expressed by the following equation,

[Equation. 3]

$$E_{add} = Am_{add} \int (B_{add} \times \ddot{p}_{add}) \dot{\theta} dt + (A+1)m_{add} \int (B_{add} \times \dot{p}_{add}) \ddot{\theta} dt$$

in the equation of $E_{add}$, $\theta$ is an angle between the mass point and a ground contact position of the leg, $m_{add}$ is a weight of the leg, a superscript "˙" represents a first-order differential, a superscript "¨" represents a second-order differential, A is a variable, and the other energy $E_{react}$ is expressed by the following equation, $$E_{react} = (A+1)m_{add}(B_{add} \times \dot{p}_{add})\dot{\theta}$$ [Equation. 4]

a total energy $E_{all}$ is expressed by the following equation using kinetic energy $E_{kinetic}$, potential energy $E_{potential}$, and the other energy $E_{react}$, and $$E_{all} = E_{kinetic} + E_{potential} + E_{react}$$ [Equation. 5]

a target walking speed is followed by intermittent walking control in which conserved energy of the total energy $E_{all}$ before a turning leg action has been adjusted.

5. The walking control method according to claim 4, wherein, in the equation of $E_{add}$, the other energy approximates $E_{react}$ by the following equation by assuming that bx≈0 and θ≈0.

[Equation. 6]

$$E_{react} \simeq \frac{1}{2}m_{add}c_x b_z l\dot{\theta}^2 = \frac{1}{2l}m_{add}c_x b_z \dot{p}_{pend}^T \dot{p}_{pend}^2$$

6. A walking control method comprising:

decomposing a mobile device with legs into a plurality of mass points;

decomposing the plurality of decomposed mass points into a first mass point, which is one mass point to be noted, and second mass points, which are the remaining mass points except for the first mass point;

making a length of a straight line connecting the first mass point and a contact point on a walking plane constant;

making the second mass points constrained to an affine-transformed position of the first mass point;

generating a constraint trajectory of the second mass points in accordance with the constraint when the first mass point is moved;

using the legs, moving the mobile device in accordance with the constraint trajectory of the second mass points;

giving a constraint trajectory of a center of gravity of an additional mass point related to a motion of a swing leg such that the center of gravity of the additional mass point is an affine-transformed center-of-gravity position of the additional mass point to a single-mass point by using a multi-mass point model obtained by adding the additional mass point; and shifting an expected peak position of the center of gravity of the additional mass point to a position rotated by a predetermined angle with the contact point on the walking plane as an origin.

7. The walking control method according to claim 6, wherein the predetermined angle is an angle according to a position of a support leg when the swing leg starts swinging.

8. The walking control method according to claim 7, wherein, when the predetermined angle is γ, γ is expressed by the following equation,

[Equation. 7]

$$\gamma = \frac{\pi}{2} - \frac{\pi - \alpha_{gb} - \alpha_{fe} - \alpha_{eg}}{\eta_{swing} + 1} - \alpha_{fe} - \alpha_{eg}$$

here, $\alpha_{gb}$ is an angle formed by the support leg and the walking plane when the swing leg is separated from the walking plane, $\alpha_{fe}$ is an angle formed by the center-of-gravity position of the additional mass point at the end of swinging of the swing leg and the-center-of-gravity position of the additional mass point when the swing leg comes into contact with the walking plane, $\alpha_{eg}$ is an angle formed by the walking plane and the center-of-gravity position of the additional mass point when the swing leg comes into contact with the walking plane, $\eta_{swing}$ is $\alpha_{bp}/\alpha_{pf}$, $\alpha_{bp}$ is an angle formed by $(P_{pend})^{begin}$ and $(P_{pend})^{peak}$, $(P_{pend})^{begin}$ is a position of the first mass point at a point in time when a motion of the swing leg is started when the contact point on the walking plane is an origin, $(P_{pend})^{peak}$ is a position of the first mass point when the contact point on the walking plane is the origin, and the first mass point arrives directly above the origin, and $\alpha_{pf}$ is an angle formed by $(P_{pend})^{peak}$ and the center-of-gravity position of the additional mass point at a point in time when the motion of the swing leg ends.

9. A walking control method comprising:

decomposing a mobile device with legs into a plurality of mass points;

decomposing the plurality of decomposed mass points into a first interest mass point and mass points other than the first interest mass point;

making a length between the first interest mass point and a contact point on a walking plane constant;

making the mass points other than the first interest mass point constrained to an affine-transformed position of the first interest mass point;

generating a constraint trajectory of the mass points other than the first interest mass point in accordance with the constraint when the first interest mass point is moved;

using the legs, moving the mobile device in accordance with the constraint trajectory of the mass points other than the first interest mass point;

setting an entire system to be a conservative system by giving a constraint trajectory such that a center of gravity of an additional mass point related to a motion of a swing leg is an affine-transformed center-of-gravity position of the additional mass point to a single-mass point by using a multi-mass point model obtained by adding the additional mass point;

setting the first interest mass point to be an ideal mass point; and setting a virtual mass point and the ideal mass point so that a center of gravity of each of the ideal mass point and the virtual mass point is an actual mass point of the mobile device.

10. The walking control method according to claim 9, wherein it is assumed that a length of the ideal mass point is constant.

11. The walking control method according to claim 9, wherein a position of the actual mass point is a center-of-gravity position of a support leg of the leg included in the mobile device.

12. The walking control method according to claim 9, wherein the position of the actual mass point, the position of the ideal mass point, and the position of the virtual mass point at the start of walking of the mobile device are the same.

13. The walking control method according to claim 9, wherein, while the mobile device is moving, a trajectory of the actual mass point during movement is expressed by the following equation, and $$p_{hip} = c_{hip}p_{pend} + b_{hip} \qquad \text{[Equation. 8]}$$

$c_{hip}$ is a parameter for each state of single leg support during movement, and $b_{hip}$ is a parameter for each state of single leg support during movement.

14. The walking control method according to claim 9, wherein, while the mobile device is moving, a trajectory of the swing leg of the leg included in the mobile device is expressed by the following equation, and $$p_{swg} = c_{swg}R_{\gamma}p_{pend} + b_{swg} + c_{hip}p_{pend} + b_{hip} - p_{pend} \qquad \text{[Equation. 9]}$$

$c_{swg}$ is a parameter of a swing leg trajectory during movement, $R_{\gamma}$ is a rotation matrix represented by cos and sin, $b_{swg}$ is a parameter of the swing leg trajectory during movement, and $b_{hip}$ is a parameter for each state of single leg support during movement.

*     *     *     *     *